US011905740B2

(12) United States Patent
Kondratuk et al.

(10) Patent No.: US 11,905,740 B2
(45) Date of Patent: Feb. 20, 2024

(54) DEADBOLT ASSEMBLY FOR SIMULTANEOUSLY SECURING CO-MOUNTED DOORS TOGETHER AND ACTUATING AT LEAST ONE DEADBOLT

(71) Applicant: Larson Manufacturing Company of South Dakota, Inc., Brookings, SD (US)

(72) Inventors: Michael W. Kondratuk, Brookings, SD (US); Alan M. Dixon, Brookings, SD (US); Kole Kramer, Brookings, SD (US); Sara Wermers, Brookings, SD (US); Todd N. Stratmoen, Brookings, SD (US); Luke A. Thompson, Volga, SD (US); Bryan P. Zacher, Brookings, SD (US); Jammey A. Rawden, Volga, SD (US)

(73) Assignee: Larson Manufacturing Company of South Dakota, Inc., Brookings, SD (US)

( * ) Notice: Subject to any disclaimer, the term of this patent is extended or adjusted under 35 U.S.C. 154(b) by 390 days.

(21) Appl. No.: 17/061,169

(22) Filed: Oct. 1, 2020

(65) Prior Publication Data

US 2022/0081937 A1 Mar. 17, 2022

Related U.S. Application Data

(60) Provisional application No. 63/036,183, filed on Jun. 8, 2020, provisional application No. 62/910,783, filed (Continued)

(51) Int. Cl.

*E05B 63/14* (2006.01)
*E05B 55/00* (2006.01)

(Continued)

(52) U.S. Cl.

CPC .......... *E05B 63/143* (2013.01); *E05B 55/005* (2013.01); *E05B 63/0017* (2013.01); *E05B 63/0065* (2013.01); *E05C 7/02* (2013.01)

(58) Field of Classification Search

CPC ............... E05B 55/005; E05B 63/0017; E05B 63/0065; E05B 63/14; E05B 63/143;

(Continued)

(56) References Cited

U.S. PATENT DOCUMENTS 525,906 A * 9/1894 Johnson ................. E05B 85/22 292/172
1,140,524 A 5/1915 Mosler et al.

(Continued)

FOREIGN PATENT DOCUMENTS

CN 2186781 1/1995
CN 2206820 9/1995

(Continued)

*Primary Examiner* — Christopher J Boswell
(74) *Attorney, Agent, or Firm* — Kagan Binder, PLLC

(57) ABSTRACT

A deadbolt assembly for securing co-mounted doors together and activating at least one deadbolt may include at least a first retention component and a first actuator interface mounted to or defined by a first coupling assembly of a key-side assembly operatively mounted to one of the co-mounted doors, and at least a second retention component and a second actuator interface mounted to or defined by a second coupling assembly of a lever-side assembly operatively mounted to the other of the co-mounted doors, at least one of the key-side assembly and the lever-side assembly including a deadbolt assembly having a deadbolt configured to be responsive to actuation thereof to extend a deadbolt therefrom, wherein actuation of the deadbolt assembly also causes the first and second retention components to secure the first and second coupling assemblies to one another.

36 Claims, 29 Drawing Sheets

Related U.S. Application Data on Oct. 4, 2019, provisional application No. 62/909,171, filed on Oct. 1, 2019.

(51) Int. Cl.
*E05C 7/02* (2006.01)
*E05B 63/00* (2006.01)

(58) Field of Classification Search
CPC ...... E05B 63/16; E05B 65/00; E05B 65/0003; E05B 77/46; E05C 7/00; E05C 7/02; E05C 7/06; E05C 9/026; E05C 9/1841
See application file for complete search history.

(56) References Cited

U.S. PATENT DOCUMENTS

| | | | | |
|---|---|---|---|---|
| 1,686,819 | A | 10/1928 | Kirschbaum | |
| 1,920,813 | A | 8/1933 | Storms | |
| 2,177,617 | A | 10/1939 | Hinton | |
| 2,219,344 | A | 10/1940 | Taylor | |
| 2,537,896 | A | 1/1951 | Hinton et al. | |
| 2,736,401 | A | 2/1956 | Milone | |
| 2,911,095 | A | 11/1959 | Hutch | |
| 3,024,501 | A | 3/1962 | McPhail | |
| 3,024,837 | A | 3/1962 | McPhail | |
| 3,164,228 | A | 1/1965 | Segre | |
| 3,881,220 | A | 5/1975 | Kiraly | |
| 4,001,972 | A | 1/1977 | Hurwitz | |
| 4,094,099 | A | 6/1978 | Birch | |
| 4,208,837 | A | 6/1980 | Black, Sr. et al. | |
| 4,299,058 | A | 11/1981 | Spaulding | |
| 4,302,907 | A | 12/1981 | Jose et al. | |
| 4,389,817 | A | 6/1983 | Olberding | |
| 4,408,546 | A | 10/1983 | Schmidt | |
| 4,470,276 | A | 9/1984 | Bayless | |
| 4,660,873 | A | 4/1987 | Sholund | |
| 4,891,907 | A | 1/1990 | Rapaway | |
| 5,144,721 | A | 9/1992 | Schade | |
| 5,257,837 | A * | 11/1993 | Bishop | E05B 63/06 292/DIG. 60 |
| 5,474,345 | A | 12/1995 | Clark et al. | |
| 5,535,550 | A | 7/1996 | Yang | |
| 5,613,324 | A | 3/1997 | Theune | |
| 6,357,509 | B1 | 3/2002 | Lamazares | |
| 6,526,694 | B1 | 3/2003 | Cosgrove | |
| 6,807,833 | B1 * | 10/2004 | Huang | E05B 55/005 70/217 |
| 6,938,665 | B2 | 9/2005 | Lewis et al. | |
| 6,941,997 | B2 | 9/2005 | Butler | |
| 6,974,163 | B2 * | 12/2005 | Peng | E05B 55/005 292/DIG. 60 |
| D525,906 | S | 8/2006 | Gut | |
| 7,950,439 | B2 | 5/2011 | Anderson | |
| 9,045,214 | B2 | 6/2015 | Koch et al. | |
| 9,228,386 | B2 | 1/2016 | Thielmann et al. | |
| 9,273,505 | B1 | 3/2016 | Knittel | |
| 9,540,853 | B2 | 1/2017 | Pickar et al. | |
| 10,233,669 | B2 | 3/2019 | Huang et al. | |
| 10,808,438 | B2 | 10/2020 | Takase et al. | |
| 11,098,509 | B2 * | 8/2021 | Huang | E05B 55/005 |
| 2006/0225250 | A1 | 10/2006 | Yeremian | |
| 2014/0132142 | A1 | 5/2014 | Kim et al. | |
| 2014/0132143 | A1 | 5/2014 | Kim et al. | |
| 2014/0132146 | A1 | 5/2014 | Kim et al. | |
| 2014/0232250 | A1 | 8/2014 | Kim et al. | |
| 2014/0232251 | A1 | 8/2014 | Kim et al. | |
| 2014/0292001 | A1 | 10/2014 | Nunez et al. | |
| 2018/0328077 | A1 | 11/2018 | Huang et al. | |
| 2019/0153756 | A1 | 5/2019 | Huang et al. | |

FOREIGN PATENT DOCUMENTS

| | | | |
|---|---|---|---|
| CN | 202139954 | | 2/2012 |
| CN | 203640569 | | 6/2014 |
| CN | 108868376 | A | 11/2018 |
| DE | 465865 | | 9/1928 |
| KR | 20120063316 | A | 6/2012 |
| KR | 20160011864 | A | 2/2016 |
| TW | 106115225 | A | 5/2017 |
| TW | 107141798 | | 11/2018 |

* cited by examiner

DEADBOLT ASSEMBLY FOR SIMULTANEOUSLY SECURING CO-MOUNTED DOORS TOGETHER AND ACTUATING AT LEAST ONE DEADBOLT

CROSS-REFERENCE TO RELATED APPLICATIONS

This application claims the benefit of U.S. Provisional Patent Application No. 62/909,171, filed Oct. 1, 2019 and titled "DEADBOLT ASSEMBLY FOR SIMULTANEOUSLY SECURING CO-MOUNTED DOORS TOGETHER AND ACTUATING AT LEAST ONE DEADBOLT"; U.S. Provisional Patent Application No. 62/910,783, filed Oct. 4, 2019 and titled "DEADBOLT ASSEMBLY FOR SIMULTANEOUSLY SECURING CO-MOUNTED DOORS TOGETHER AND ACTUATING AT LEAST ONE DEADBOLT"; and U.S. Provisional Patent Application No. 63/036,183, filed Jun. 8, 2020 and titled "DEADBOLT ASSEMBLY FOR SIMULTANEOUSLY SECURING CO-MOUNTED DOORS TOGETHER AND ACTUATING AT LEAST ONE DEADBOLT" the entire contents of which are incorporated herein by reference in their entireties.

FIELD OF THE INVENTION

The present invention relates generally to door arrangements having two doors co-mounted to and within a single door frame of a building, and more specifically to deadbolt assemblies for simultaneously securing the co-mounted doors together and actuating at least one deadbolt to secure both of the doors to a door frame of the building.

BACKGROUND

Two doors may conventionally be co-mounted in a single doorway of a building, one example of which is a conventional exterior door and a conventional storm door co-mounted to and within a single door frame of a commercial or residential building. Deadbolt assemblies are also known, and are typically implemented on single doors to further secure such doors to a door frame.

SUMMARY

The present disclosure may comprise one or more of the features recited in the attached claims, and/or one or more of the following features and combinations thereof. In one aspect, a deadbolt assembly is provided for securing co-mounted doors together and activating at least one deadbolt. The deadbolt assembly may comprise at least a first retention component and a first actuator interface mounted to or defined by a first coupling assembly of a key-side assembly operatively mounted to one of the co-mounted doors, and at least a second retention component and a second actuator interface mounted to or defined by a second coupling assembly of a lever-side assembly operatively mounted to the other of the co-mounted doors, at least one of the key-side assembly and the lever-side assembly including a deadbolt assembly having a deadbolt configured to be responsive to actuation thereof to extend a deadbolt therefrom, wherein the first and second actuator interfaces engage one another as the first and second actuator interfaces contact each other, and wherein actuation of the deadbolt assembly also causes the first and second retention components to secure the first and second coupling assemblies to one another.

BRIEF DESCRIPTION OF THE DRAWINGS

This disclosure is illustrated by way of example and not by way of limitation in the accompanying figures. Where considered appropriate, reference labels have been repeated among the figures to indicate corresponding or analogous elements.

DETAILED DESCRIPTION OF THE DRAWINGS

Figure 1:
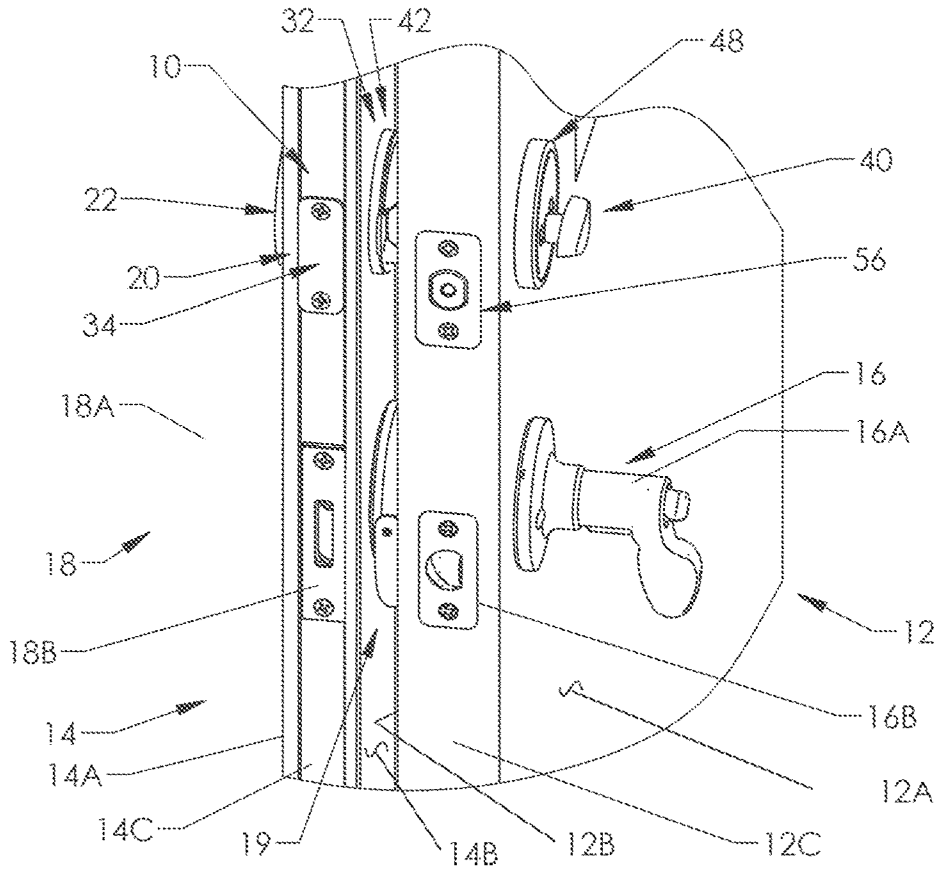
FIG. 1 is a perspective view of two co-mounted doors each including a respective portion of a deadbolt assembly configured to simultaneously secure the two doors together and actuate at least one deadbolt to secure the two doors to a door frame of a building.

While the concepts of the present disclosure are susceptible to various modifications and alternative forms, specific exemplary embodiments thereof have been shown by way of example in the drawing and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure or characteristic is described in connection with an embodiment, it is submitted that it is within the knowledge of one skilled in the art to effect such feature, structure or characteristic in connection with other embodiments whether or not explicitly described. Further still, it is contemplated that any single feature, structure or characteristic disclosed herein may be combined with any one or more other disclosed feature, structure or characteristic, whether or not explicitly described, and that no limitations on the types and/or number of such combinations should therefore be inferred.

This disclosure relates to various embodiments of a deadbolt assembly for simultaneously securing together two co-mounted doors and actuating at least one deadbolt to thereby simultaneously secure both of the doors to one another and to a door frame of a building to which the doors are co-mounted. As used herein, the term "co-mounted" refers to two conventional doors hingedly mounted along a common side or along different sides of each to a door frame or door jamb of a residential, commercial or other building, such that the doors may each open and close along a common side opposite that hingedly coupled to the door frame or such that the doors may open and close along different sides. As also used herein, the term "simultaneous" in reference to securing together two co-mounted doors and actuating at least one deadbolt should be understood not to mean that such securing together of the doors and actuating at least one deadbolt must necessarily occur at the same instant in time, but rather that such securing together of the doors and actuating at least one deadbolt necessarily result from a single actuation of the deadbolt assembly.

Referring now to FIG. 1, a portion of a co-mounted door arrangement is shown which includes two conventional doors 12, 14 hingedly mounted to a door frame (not shown) in a conventional manner. A door handle assembly 16 is mounted to the door 12, and another door handle assembly 18 is mounted to the door 14. The door handle assembly 16 includes a conventional handleset 16A operatively mounted to an inner face 12A of the door 12, another handleset assembly 19 mounted to an outer face 12B of the door 12, and a conventional latch assembly 16B operatively mounted to a side surface 12C of the door 12 defined between the inner and outer faces 12A, 12B thereof. The door handle assembly 18 likewise includes a conventional handleset 18A operatively mounted to an outer face 14A of the door 14, another handleset assembly (not shown in FIG. 1) mounted to an inner face 14B of the door 14, and a conventional latch assembly 18B operatively mounted to a side surface 14C of the door 14 defined between the inner and outer faces 14A, 14B thereof.

In one embodiment, the door handle assemblies 16, 18 are conventional handlesets each operable independently of the other in a conventional manner. In some alternate embodiments, the handlesets mounted to the facing surfaces 12B, 14B of the co-mounted doors 12, 14 may be configured to be field-coupled or otherwise mechanically coupled to one another so as to operate together to open and close the doors 12, 14. Examples of such door handle assemblies are described in co-pending U.S. Patent Publication No. 2020/0165846, which is owned by the applicant of the subject patent application, and which is also published as international patent application WO 2017/181072, and in co-pending U.S. provisional patent application Ser. No. 62/908,764, filed Oct. 1, 2019, which is owned by the applicant of the subject patent application; U.S. Provisional Application No. 62/910,823, filed Oct. 4, 2019, which is owned by the applicant of the subject application; and U.S. Provisional Patent Application No. 63/036,187, filed Jun. 8, 2020, which is owned by the applicant of the subject application, the disclosures of which are all incorporated herein by reference in their entireties.

In the illustrated embodiment, the door 12 is, for example, a so-called "prime" door which serves as a main entrance door to a building. The face 12A is an "inner" face of the door 12 in that it is the surface of the door 12 that faces the interior of the building, and the face 12B is the "outer" face of the door 12 as it is the surface of the door 12 that faces the exterior of the building. The door 14 is, for example, a so-called storm door mounted to the door frame externally to the door 12 such that the door 14 is exposed to the environment outside of the building and the door 12 is positioned between the door 14 and the interior of the building. The face 14A is the "outer" face of the door 14 in that it is the surface of the door 14 that faces the exterior of the building to which the doors 12, 14 are mounted, and the face 14B is the "inner" face of the door 14 in that it is the surface of the door 14 that faces the door 12. It will be understood, however, that the door arrangement just described is provided only by way of example, and that in alternate embodiments the door 14 may be the prime door and the door 12 may be the storm door. In other alternate embodiments, the "storm" door 14 (or 12) may instead be any other conventional door, examples of which include, but are not limited to, a security door, a screen door, a second prime door or the like. It will be further understood that whereas the attached figures depict one example mounting configuration of the doors 12, 14, i.e., left-handed mounting of the door hinges to the door frame and right-handed mounting of the door hardware when viewed from the exterior, the concepts described herein are directly applicable to either left-handed or right-handed mounting of the doors 12, 14 and associated hardware.

As also depicted in FIG. 1, an embodiment of a deadbolt assembly 10 is shown having a key-side assembly 20 mounted to the door 14 and a lever-side assembly 40 mounted to the door 12, wherein the two assemblies 20, 40 are configured to couple to one another as the doors 12, 14 are brought together as illustrated by example in FIG. 1. As briefly described above, the deadbolt assembly 10 is further configured to simultaneously secure the key-side assembly 20 and the lever-side assembly 40 to one another and actuate at least one deadbolt to thereby simultaneously secure both of the doors 12, 14 to one another and to a door frame of a building to which the doors are co-mounted.

Referring now to FIGS. 1-3B, the key-side assembly 20 includes a conventional keyset 22 operatively mounted to the outer face 14A of the door 14, a coupling assembly 32 operatively mounted to the inner face 14B of the door 14, and a so-called dummy deadbolt assembly 34 operatively mounted to a side surface 14C of the door 14 defined between the inner and outer faces 14A, 14B thereof. In the illustrated embodiment, the dummy deadbolt assembly 34 does not include a deadbolt but instead has a blank plate covering the latch plate. The keyset 22 and the coupling assembly 32 are operatively coupled to one another through a first bore (not shown) defined through the faces 14A, 14B of the door 14, and the dummy deadbolt 34, although inoperable in the illustrated embodiment, is coupled to the keyset 22 and to the coupling assembly 32 through a second bore (not shown) defined in the side surface 14C of the door 14 and intersecting the first bore, all in a conventional manner.

The keyset 22 of the key-side assembly 20 includes a chassis 24 having a conventional key cylinder 26 positioned therein, wherein the key cylinder 26 has a conventional keyway 26A extending therein that is rotatable relative to the chassis 24 in a conventional manner. The keyway 26A defines a keyway opening 26B therein that is sized and configured to receive therein a blade 28A of a conventional key 28 for actuating the keyway 26A. A decorative cover 30 is illustratively provided over the key cylinder 26 and at least a portion of the chassis 24. A spindle 36 is operatively coupled to the keyway 26A and extends through the chassis 24 and the dummy deadbolt 34 and into engagement with the coupling assembly 32 as will be described in greater detail below. The keyway 26A of the key cylinder 26 and the spindle 36 rotate together relative to the chassis 24. The chassis 24 extends into the first bore defined through the faces 14A, 14B of the door 14, and is fixed in position relative to the door 14.

In some embodiments, the keyway 26A includes a conventional clutch (described below) which controls rotation of the spindle 36 relative to rotational movement of the key 28 within the keyway 26A. Specifically, such a clutch provides for rotation of the spindle 36 with the key 28 when components of the clutch are engaged and provides a range of rotary movement of the key 28 relative to the spindle 36 when the clutch components are disengaged. In some such embodiments for example, the clutch is engaged when locking or unlocking the deadbolt assembly, e.g., by rotating the key 28 to the right 90 or 180 degrees, and is disengaged when returning the key 28 to its starting position at which the key 28 was inserted into the keyway 26A so that the deadbolt assembly will not be unlocked when returning the key 28 to its starting position In other alternate embodiments (also described below), a clutch may be alternatively or additionally implemented between the keyway 26A and the spindle 36 and in other locations between any of the rotary connected components.

In some embodiments, the key slot 28A is vertical at its starting position, with either the keyed surface or the non-keyed surface of the key 28 oriented vertically upward, and this starting position it typically referred to as top-dead-center (TDC). The various embodiments illustrated in the attached figures will generally refer to the starting position of the key 28 and keyway 26A as TDC, although it will be understood that the starting position of the key 28 and keyway 26A may alternatively be any angle relative to TDC.

The coupling assembly 32 illustratively includes a housing 33 having a floor region 32A coupled to a flared, annular region 32B which terminates at an annular rim 32C. The housing 33 is illustratively affixed through the bore defined through the faces 14A, 14B of the door 14 to the chassis 24 of the keyset 22 such that neither the chassis 24 nor the housing 33 rotates or otherwise moves with rotation of the keyway 26A or of the spindle 36. As most clearly shown in FIG. 3A, the floor 32A of the housing 33 defines an opening 32D therethrough, which is illustratively circular in shape, that is axially aligned with the spindle 36. An actuator interface 38 is coupled to the end of the spindle 36 such that at least a portion of the interface 38 extends into and through the opening 32D formed through the floor 32A of the housing 33. The interface 38 illustratively engages components of the lever-side assembly 40 when the key-side assembly 20 and the lever-side assembly 40 are brought into contact with one another (as the doors 12, 14 are both moved to their closed positions relative to the door frame to which they are mounted). The interface 38 illustratively interfaces with such components of the lever-side assembly 40 to lock and unlock the deadbolt in response to rotation of the key 28 within the keyway 26A, at least some of which is translated to rotational movement of the spindle 36 and the interface 38. As will be described in detail with respect to FIGS. 4A-10F, the interface 38 further illustratively includes, or is coupled to, at least a portion of a retention assembly configured to engage at least another portion of the retention assembly carried by the lever-side assembly 40 to secure the key-side assembly 20 to the lever-side assembly 40 during locking of the deadbolt, and to disengage from the portion(s) of the retention assembly carried by the lever-side assembly 40 during unlocking of the deadbolt to thereby allow the key-side assembly 20 and the lever-side assembly 40, and thus the doors 12, 14, to separate from one another.

As shown in FIG. 1, the lever-side assembly 40 includes a conventional leverset 48 operatively mounted to the inner face 12A of the door 12, a coupling assembly 42 operatively mounted to the outer face 12B of the door 12, and a conventional deadbolt assembly 56 (see FIG. 2 and FIG. 2A) operatively mounted to the side surface 12C of the door 12 defined between the inner and outer faces 12B, 12A thereof.

The leverset 48 and the coupling assembly 42 are operatively coupled to one another through a first bore (not shown) defined through the faces 12A, 12B of the door 12, and the deadbolt assembly 56 is operatively coupled to the leverset 48 and to the coupling assembly 42 through a second bore (not shown) defined in the side surface 12C of the door 12 and intersecting the first bore, all in a conventional manner. The leverset 48 illustratively includes a conventional lever, knob or button 52 rotatably coupled to a conventional chassis 50 which extends into the first bore defined through the faces 12A, 12B of the door 12. The chassis 50 is fixed in position relative to the door 12, and the lever 52 is rotatable relative to the chassis 50 in a conventional manner. The lever 52 is coupled to a spindle 54 such that the lever 52 and spindle 54 rotate together relative to the chassis 50.

Figure 2:
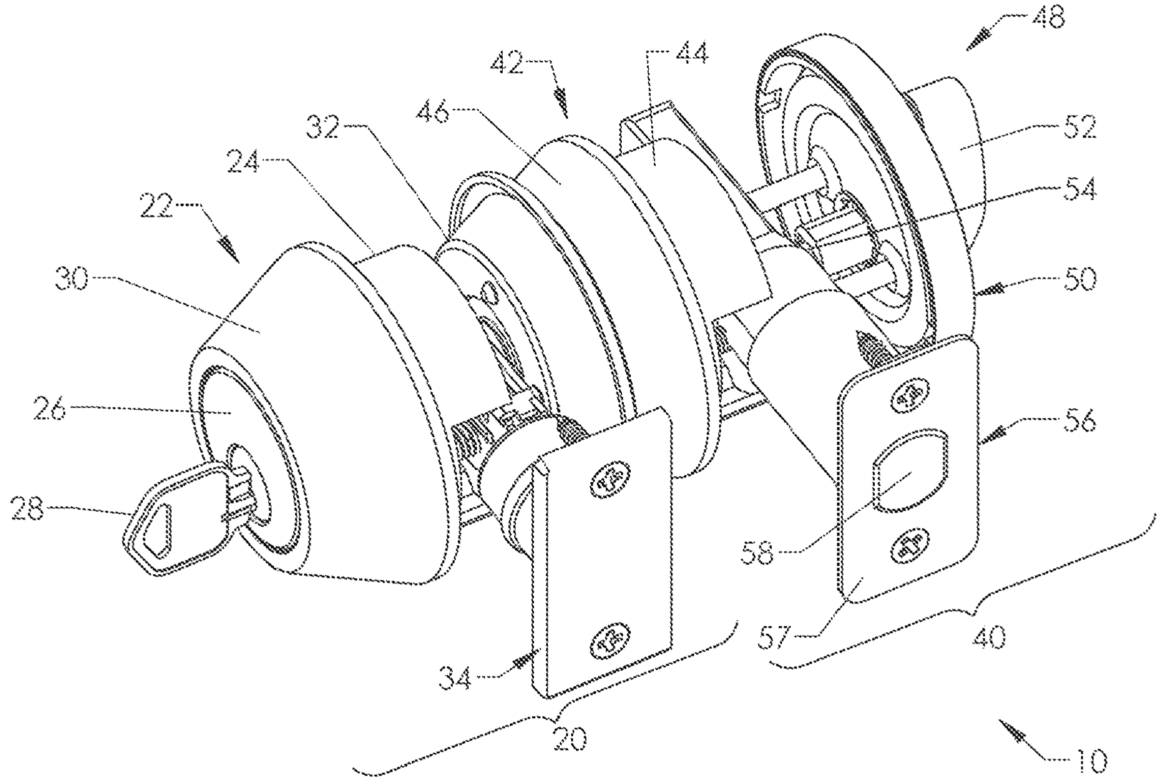
FIG. 2 is a perspective view of the various components of the deadbolt assembly of FIG. 1 coupled to one another as depicted in FIG. 1.
Figure 2A:
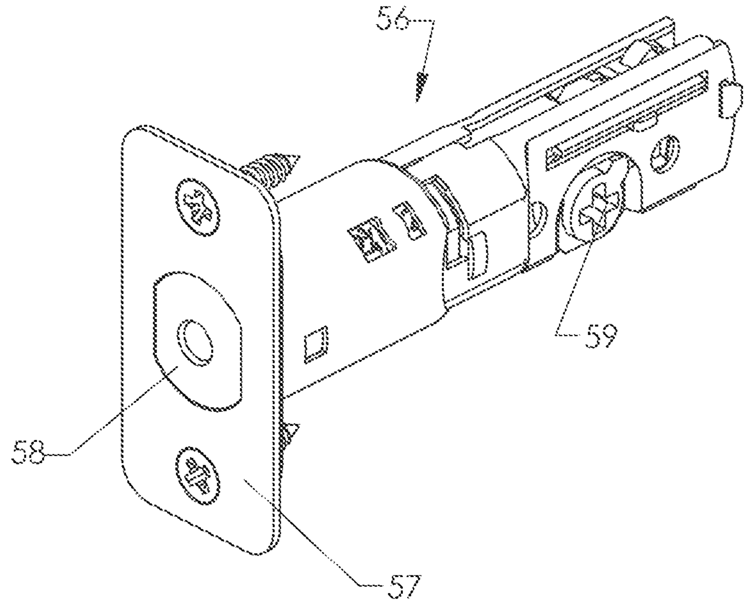
FIG. 2A is a perspective view of a deadbolt assembly separate from actuator components.
Figure 3A:
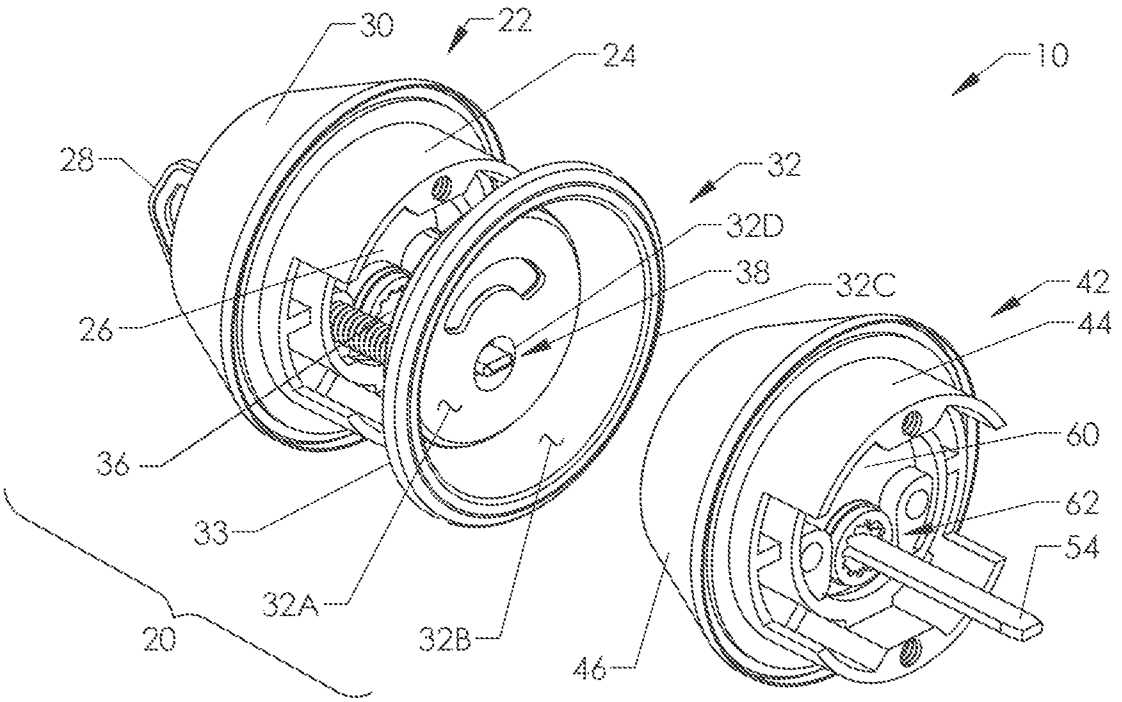
FIG. 3A is a perspective, partial assembly view of the deadbolt assembly of FIGS. 1 and 2 as viewed from the rear of the lever-side coupling assembly.

The deadbolt assembly 56 includes a latch plate 57 mounted to the side surface 12C of the door 12, and a conventional deadbolt 58 extends through an opening in the latch plate 57. The lever 52 is operatively coupled to the deadbolt assembly 56 via the spindle 54 as disposed within and through an opening 59 of a conventional rotational component of the deadbolt 58. The opening is shown with a cross or plus-sign shape to accommodate either a horizontally disposed or a vertically disposed spindle, as examples. The spindle 54 also extends beyond the deadbolt assembly 56 for engagement with the coupling assembly 42 as best shown in FIG. 3A. Rotation of the lever 52 causes the spindle 54 shaft to rotate which, in turn, causes the deadbolt assembly 56 to extend the deadbolt 58 from, and retract within, the latch plate 57. The doors 12, 14 can be opened (assuming that the door handle assemblies 16, 18 are not locked) when the lever 52 is rotated to retract the deadbolt 58 within the deadbolt assembly 56 as illustrated in FIGS. 1 and 2. The doors 12, 14 can be secured in their closed positions to the door frame of the building to which the doors 12, 14 are mounted when the lever 52 is rotated to cause the deadbolt 58 to extend outwardly away from the latch plate 57 so that it can be secured in a conventional manner to a strike plate (not shown) mounted to the door frame.

In some alternate embodiments, the deadbolt assembly 56 may include a conventional deadbolt and in such embodiments the deadbolt assembly 34 can also comprise an operable deadbolt provided also in a conventional manner to retract a deadbolt therein and extend the deadbolt therefrom like and along with the deadbolt 58. In other alternate embodiments, the "dummy" deadbolt assembly 34 may be omitted altogether. In still other alternate embodiments, the deadbolt assembly 56 may be coupled between the keyset 22 and the coupling assembly 32, and the "dummy" deadbolt assembly 34 may be coupled between the leverset 48 and the coupling assembly 42. In further alternate embodiments, the deadbolt assembly 56 may be coupled between the keyset 22 and the coupling assembly 32, and no deadbolt assembly may be coupled between the leverset 48 and the coupling assembly 42.

The coupling assembly 42 of the lever-side assembly 40 includes a chassis 44 into and through which the spindle 54 extends. A decorative cover 46 is illustratively provided over at least a portion of the chassis 44. In some embodiments, as illustrated by example in FIG. 3A, a clutch 62 may be operatively mounted to the chassis 44 and operate similarly as described above to allow the spindle 54 to rotate when disengaged and to prevent the spindle 54 from rotating when engaged (while allowing other rotatable components of the coupling assembly 42 coupled thereto to rotate). The chassis 44 extends into the first bore defined through the faces 12A, 12B of the door 12, and is fixed in position relative to the door 12 via engagement with the leverset 48 such that neither the chassis 44 nor the leverset 48 rotates or otherwise moves with rotation of the spindle 54.

Figure 3B:
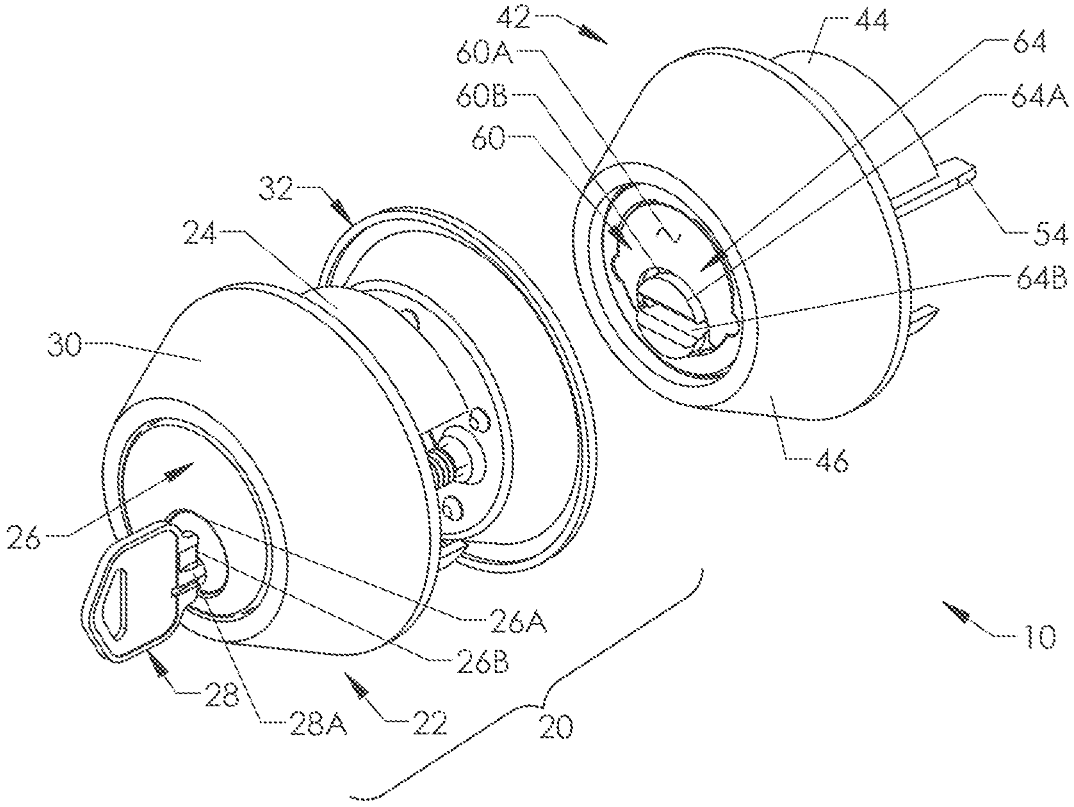
FIG. 3B is another perspective, partial assembly view of the deadbolt assembly of FIGS. 1 and 2 as viewed from the keyset.

As most clearly shown in FIG. 3B, the front wall 60A of the chassis 44 defines an opening 60B therethrough, which is illustratively circular in shape, that is axially aligned with the spindle 54. An actuator interface 64 is coupled to the end of the spindle 54 such that at least a portion of the interface 64 extends into and through the opening 60B formed through the front wall 60A of the chassis 44. The interface 64 illustratively engages the actuator interface 38 of the key-side assembly 20 when the key-side assembly 20 and the lever-side assembly 40 are brought into contact with one another (as the doors 12, 14 are both moved to their closed positions relative to the door frame to which they are mounted). In the illustrated embodiment, for example, the actuator interface 38 illustratively includes a rotatable disk 38A defining a planar key 38B (see, e.g., FIG. 4B) at the exposed end thereof, and the actuator interface 64 includes a rotatable disk 64A defining a slot 64B (see, e.g., FIGS. 3B and 4A) at the exposed end thereof, wherein the key 38B and the slot 64B are, positioned and oriented such that the key 38B is received within the slot 64B as the key-side assembly 20 and the lever-side assembly 40 are brought into contact with one another. In operation, the coupled interfaces 38, 64 illustratively operate together to lock and unlock the deadbolt in response to rotation of the key 28 within the keyway 26A, and/or in response to rotation of the lever 52. As will be described in detail with respect to FIGS. 4A-10F, the interface 64 further illustratively includes, or is coupled to, at least a portion of a retention assembly configured to engage at least another portion of the retention assembly included on, or coupled to, the interface 38 to secure the key-side assembly 20 to the lever-side assembly 40 during locking of the deadbolt, and to disengage from the portion(s) of the retention assembly included on, or coupled to, the interface 38 during unlocking of the deadbolt to thereby allow the key-side assembly 20 and the lever-side assembly 40, and thus the doors 12, 14, to separate from one another.

Preferably, the retention assembly can controllably create a mechanical interference in the axial direction of the deadbolt assembly 10 as defined by the axis of rotation of the rotary components. Such an axial interference would prevent movement of the key-side assembly and the lever-side assembly 40 from one another in the direction of the axis of rotation. More preferably, rotary motion initiated by an operator of at least one component within the deadbolt assembly 10 can cause a rotary response movement of a retention component, a radial movement of a retention component, an axial movement of a retention component, or any combination of such movements to create the mechanical interference. After creation of such a mechanical interference, a second operator initiated action can cause a second or a reverse rotary motion to remove the mechanical interference.

In the various embodiments of the retention assembly described below, it will be noted that some (FIGS. 4A-6D) are configured to operate with the spindle 54 connected directly from the actuator interface 64 to the lever 52 such that they rotate together. However, in the embodiments of FIGS. 7A-10F, such assemblies can be configured to operate with a clutch 62 coupled operatively between the spindle 54 and the actuator interface 64. This clutch 62 allows a range of rotation between the actuator interface 64 and the spindle 54 in certain conditions, as will be further described below.

The embodiments of FIGS. 4A-6D are illustrated without such a clutch at that location, but it is preferable to include a clutch device to also allow a range of rotary motion under certain circumstances within the assemblies, preferably at any rotary interface between the key cylinder and the actuator interface 38, and more preferably at an interface of the key cylinder and the spindle 36. The provision of a clutch device allowing a predetermined range of rotary motion at select conditions allows for a key to be removed from the key cylinder when brought to TDC. In the specific embodiments illustrated in FIGS. 4A-6D, for example, the components are configured such that, with the deadbolt 58 retracted within the latch assembly 50, rotation of the key 28 approximately 90 degrees clockwise from TDC causes the deadbolt 58 to fully extend from the latch plate 57, and counterclockwise rotation of the key 28 thereafter back to TDC does not cause the spindle 36, or any component operatively coupled thereto, to rotate therewith and, with the deadbolt 58 extended from the latch plate 57, rotation of the key 28 approximately 90 degrees counterclockwise from TDC causes the deadbolt 58 to fully retract back into the latch assembly, and clockwise rotation of the key 28 thereafter back to TDC does not cause the spindle 36, or any component operatively coupled thereto, to rotate therewith.

In the specific embodiments illustrated in FIGS. 7A-10F, in contrast, the components can be configured to operate over a greater than 90 degree range of rotary motion. such that, with the deadbolt 58 retracted within the latch assembly 50, rotation of the key 28 approximately 90 degrees clockwise from TDC causes the spindle 36, but not the spindle 54, to rotate therewith, whereas further rotation of the of the key 28 from approximately 90 degrees past TDC to approximately 180 degrees past TDC causes the spindles 36 and 54 to rotate such that the deadbolt 58 then fully extends from the latch plate 57, and counterclockwise rotation of the key 28 by 180 degrees thereafter back to TDC does not cause the spindle 36, or any component operatively coupled thereto, to rotate therewith. With the deadbolt 58 extended from the latch plate 57, rotation of the key 28 approximately 90 degrees counterclockwise from TDC causes the spindle 36, but not the spindle 54, to rotate therewith, whereas further rotation of the of the key 28 from approximately 90 degrees past TDC to approximately 180 degrees past TDC causes the spindles 36 and 54 to rotate such that the deadbolt 58 then fully retracts within the latch assembly 50, and clockwise rotation of the key 28 by 180 degrees thereafter back to TDC does not cause the spindle 36, or any component operatively coupled thereto, to rotate therewith. A technique that can be incorporated within this assembly can utilize the techniques discussed below with reference to FIGS. 19A-D, specifically of FIGS. 19C and 19D.

It will be understood such operation of the various embodiments as described in the previous paragraph is merely exemplary, and that any of the embodiments can alternatively be configured for alternate operation with or without the clutch 62, and that modifications required for any such alternate operation would be a mechanical step for a person skilled in the art.

Figure 4A:
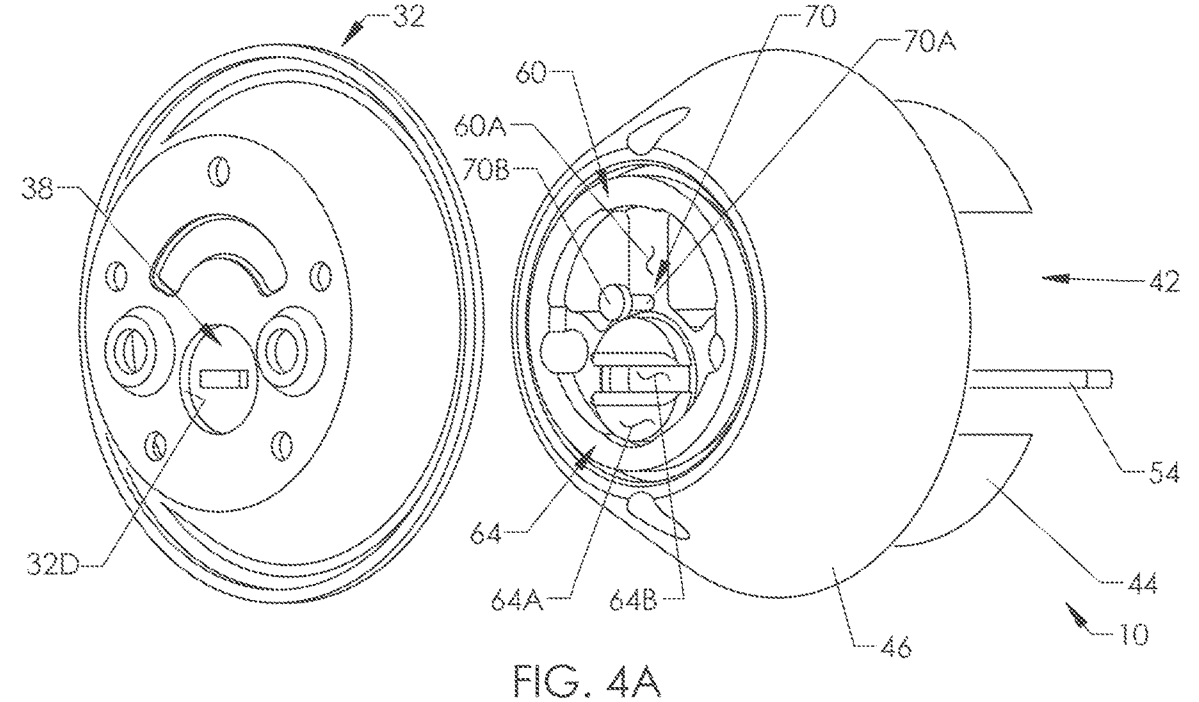
FIG. 4A is a perspective view of the coupling assemblies of the deadbolt assembly of FIGS. 1-3B including an embodiment of a retention assembly for securing the coupling assemblies together simultaneously with actuation of the deadbolt, as viewed from the rear of the key-side coupling assembly.
Figure 4B:
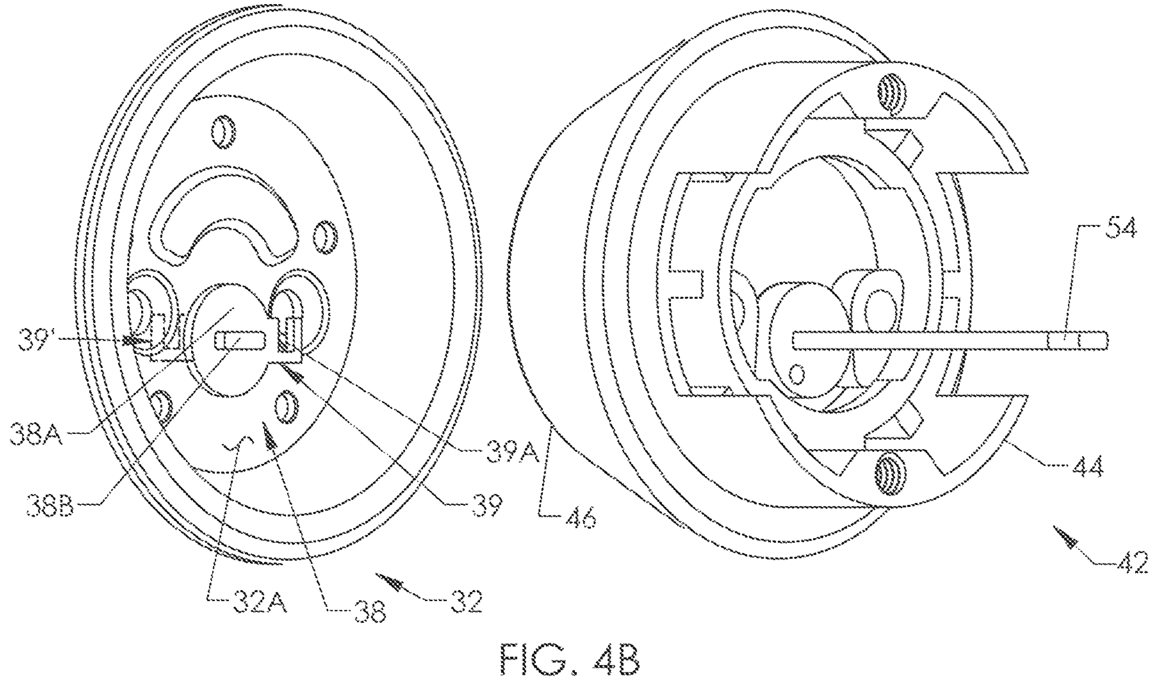
FIG. 4B is another perspective view of the deadbolt assembly of FIG. 4A as viewed from the rear of the lever-side coupling assembly.
Figure 4C:
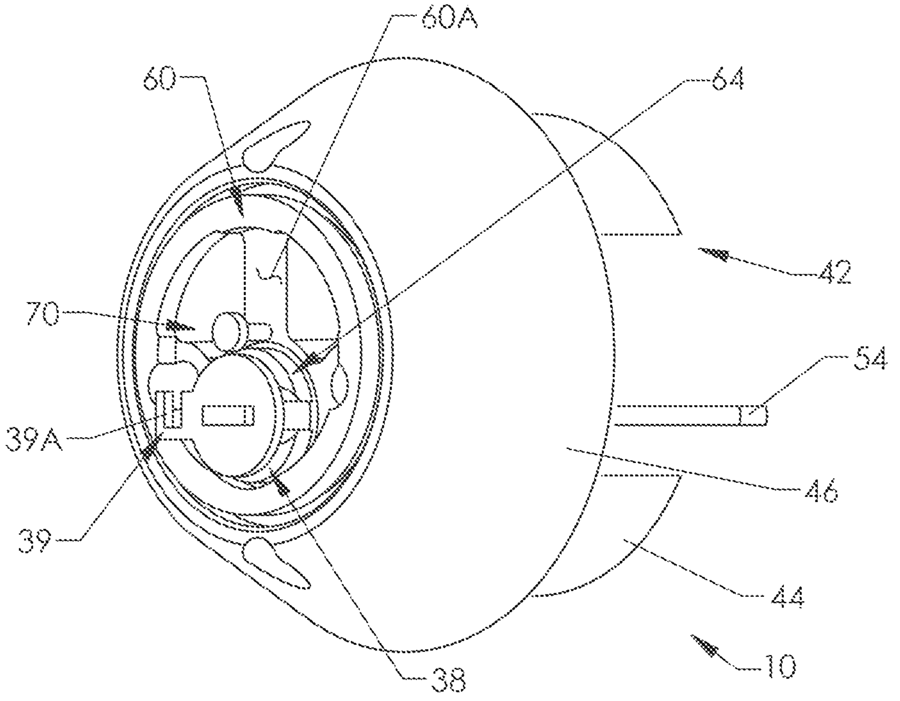
FIG. 4C is a perspective and partial assembly view similar to FIG. 4A with the key-side assembly omitted, illustrating coupling together of the retention assembly and deadbolt actuation components of the two coupling assemblies but prior to actuation of the retention assembly and deadbolt.
Figure 4D:
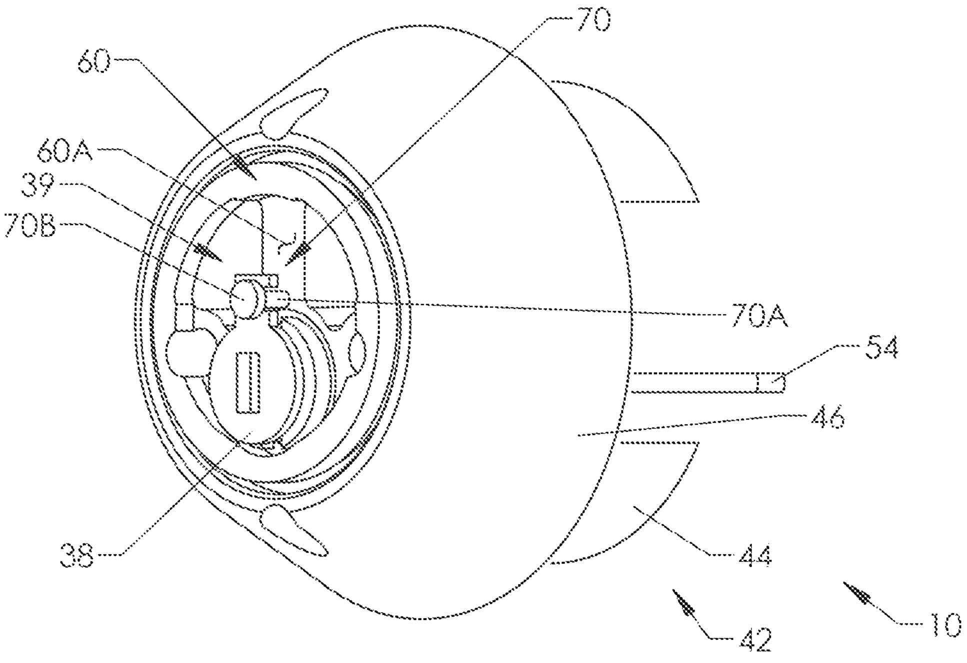
FIG. 4D is a perspective and partial assembly view similar to FIG. 4C illustrating the retention assembly and deadbolt actuation components of the two coupling assemblies after actuation of the retention assembly and deadbolt.\

Referring now to FIGS. 4A-4D, one embodiment is shown of a retention assembly for securing the coupling assemblies 32, 42 of the key-side assembly 20 and the lever-side assembly 40 together simultaneously with actuation of the deadbolt 58 as just described. As depicted in FIG. 4B, the component of the retention assembly carried by the coupling assembly 32 illustratively is implemented in the form of a slotted tab 39 extending laterally away from the disk 38A of the actuator interface 38 at approximately 90 degrees clockwise from TDC. In the illustrated embodiment, the tab 39 defines a vertically oriented slot 39A open at a top end thereof. As depicted in FIG. 4A, the component of the retention assembly carried by the coupling assembly 42 is implemented in the form of a coupling shaft 70 extending axially away from the front wall 60A of the chassis 44 above the actuator interface 64. More specifically, the coupling shaft 70 illustratively includes a cylindrical shaft 70A having one end coupled to the front wall 60A of the chassis 44, and an opposite end to which a head 70B is formed, wherein the outer diameter of the shaft 70A is less than the span of the slot 39A defined in the slotted tab 39 but the outer diameter of the head 70B is greater than the span of the slot 39A. Thus, as depicted in FIGS. 4C and 4D wherein the actuator interface 38 of the of the coupling assembly 32 is shown separated from the coupling assembly 32 and as it interacts with the actuator interface 64, as the actuator interface 38 is rotated approximately 90 degrees clockwise by operation of the key 28 or by operation of the lever 52 and transferred to the actuator interface 38 by the actuator interface 64 as described above, the tab 39 likewise rotates clockwise such that the slot 39A captures the shaft 70A and is thus trapped between the head 70B and the front wall 60A of the chassis 60. The retention assembly, made up of the tab 39 (integral with or coupled to the disk 38A) and the coupling shaft 70, is thus engaged along with the extension of the deadbolt 58 from the latch plate 57, such that the key-side assembly 20 is secured to the lever-side assembly 40 with locking of the deadbolt 58 to the door frame, as depicted in FIG. 4D. The interaction of the tab 39 and the shaft 70 creates a mechanical interference in the axial direction of the axis of the rotary components of the deadbolt assembly. As the chassis 44 is fixed with the door 12 that is dead-bolted in a closed position, the retention assembly maintains the door 14 to the door 12, both thus locked together in closed positions. As described above, rotation of the key 28 or of the lever 52 counterclockwise back to TDC does not cause the deadbolt 58 to unlock or the tab 39 to disengage from the coupling shaft 70. Rather, simultaneous unlocking and disengagement is accomplished, as also described above, by rotating the key 28 or the lever 52 counterclockwise approximately 90 degrees from TDC.

Referring once more to FIG. 4B, it will be noted that the tab 39 may be formed on the opposite side of the disk 38A or another tab 39' may be formed on the opposite side of the disk 38A to accommodate different-handed mounting of the deadbolt assembly hardware. In alternate embodiments in which greater rotation of the key 28 or lever 52, e.g., 180 degrees from TDC, is required to lock the deadbolt 58, the tab 39 may be relocated to extend upwardly away from the top of the disk 38A.

Figure 5A:
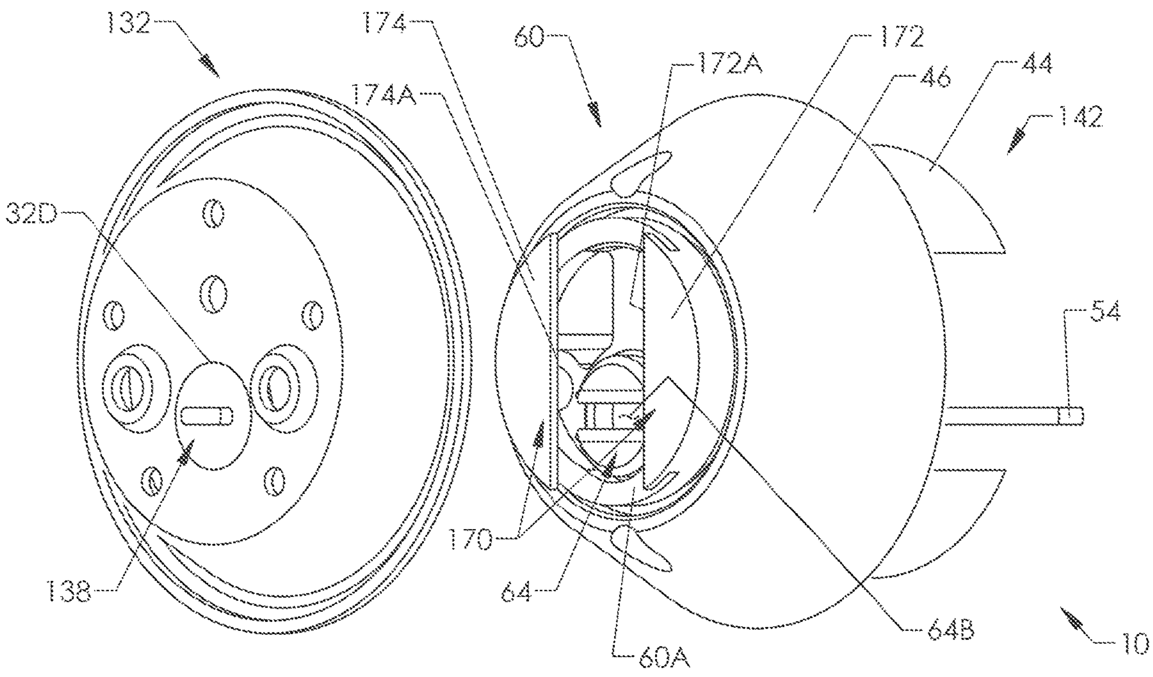
FIG. 5A is a perspective view of the coupling assemblies of the deadbolt assembly of FIGS. 1-3B including another embodiment of a retention assembly for securing the coupling assemblies together simultaneously with actuation of the deadbolt, as viewed from the rear of the key-side coupling assembly.
Figure 5B:
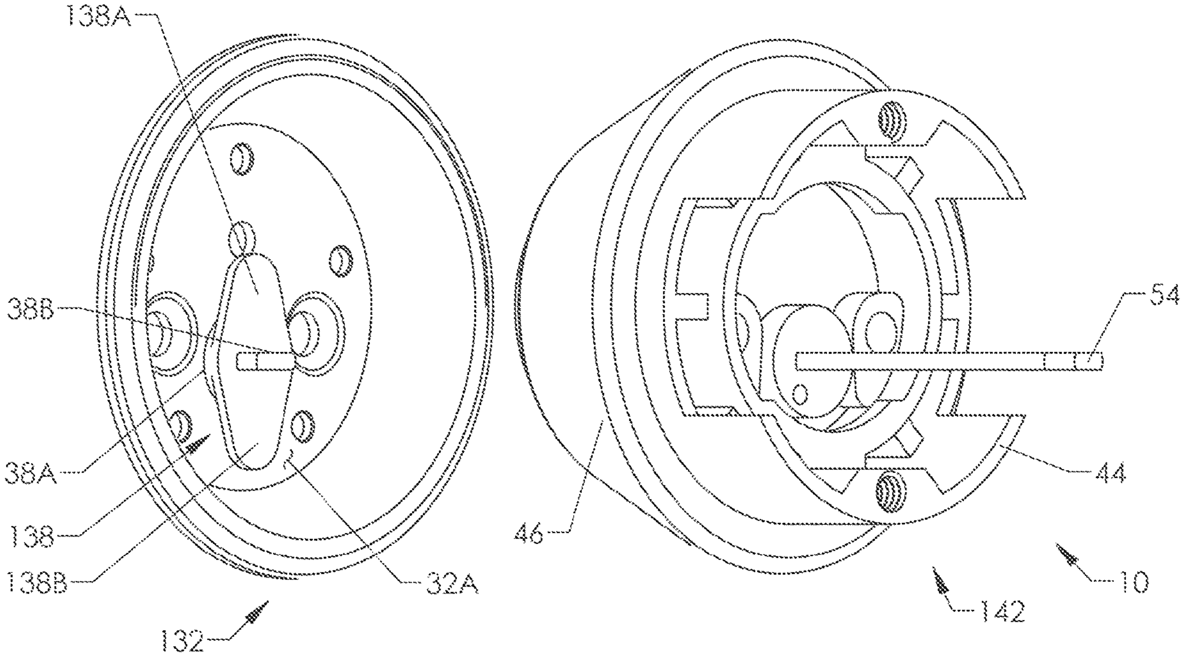
FIG. 5B is another perspective view of the deadbolt assembly of FIG. 5A as viewed from the rear of the lever-side coupling assembly.
Figure 5C:
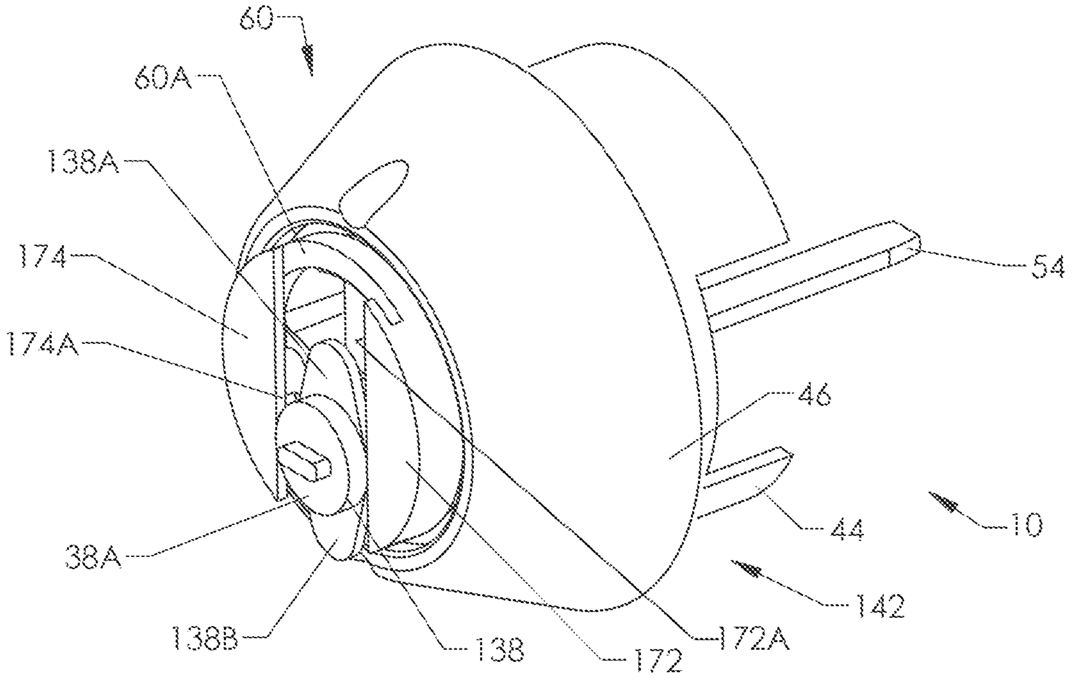
FIG. 5C is a perspective and partial assembly view similar to FIG. 5A with the key-side assembly omitted, illustrating coupling together of the retention assembly and deadbolt actuation components of the two coupling assemblies but prior to actuation of the retention assembly and deadbolt.
Figure 5D:
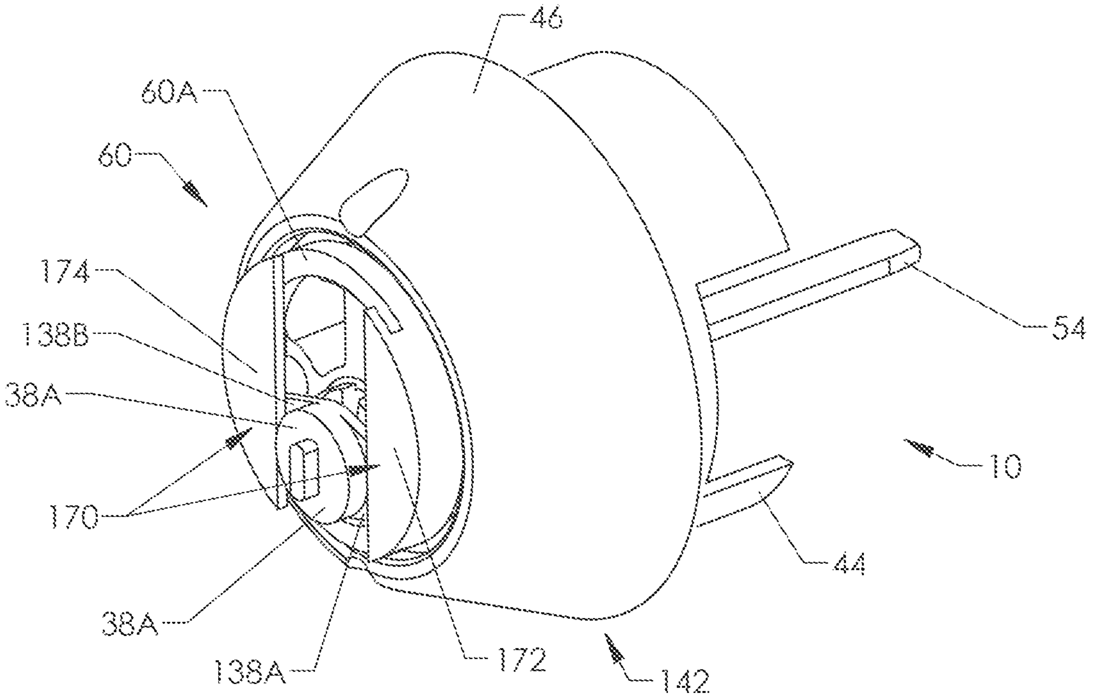
FIG. 5D is a perspective and partial assembly view similar to FIG. 5C illustrating the retention assembly and deadbolt actuation components of the two coupling assemblies after actuation of the retention assembly and deadbolt.

Referring now to FIGS. 5A-5D, another embodiment is shown of a retention assembly for securing coupling assemblies 132, 142 of the key-side assembly 20 and the lever-side assembly 40 together simultaneously with actuation of the deadbolt 58 in a similar manner as just described. As depicted in FIG. 5B, the component of the retention assembly carried by the coupling assembly 132 illustratively is implemented in the form of a retention tab 138 coupled to or integral with the disk 38A of the actuator interface 38. In the illustrated embodiment, the retention tab 138 defines a planar upper wing 138A extending upwardly from the disk 38A and a planar lower wing 138B extending downwardly from the disk 38A, and the key 38B extends axially away from the exposed planar surface of the wings 138A, 138B centrally therebetween. As depicted in FIG. 5A, the component of the retention assembly carried by the coupling assembly 142 is illustratively implemented in the form of a pair of retention walls 172, 174 connected with the chassis 44 with each extending over and spaced axially apart from the front wall 60A of the chassis 44. In particular, the retention wall 172 is defined along one side of the front wall 60A and defines a vertically disposed edge 172A facing a vertically disposed edge 174A of the retention wall 174 defined along an opposite side of the front wall 60A, such that the edge 172A is spaced laterally apart from the edge 174A and such that the actuator interface 64 is preferably positioned centrally between the edges 172A, 174A. The retention walls 172, 174 and the retention tab 138 are illustratively sized relative to one another such that the retention tab 138, with the wings 138A, 138B disposed vertically, passes between the retention walls 172, 174 as the key 38B of the actuator interface 38 is coupled to the slot 64B of the actuator interface 64, as depicted in FIG. 5C. FIGS. 5C and 5D show the actuator interface 38 of the coupling assembly 132 separated from the coupling assembly 132 and as it interacts with the actuator interface 64. As the actuator interface 138 is rotated approximately 90 degrees clockwise by operation of the key 28 or by operation of the lever 52 and transferred to the actuator interface 38 by the actuator interface 64 as described above, the tab 138 likewise rotates clockwise such that the lower wing 138B is captured between the front wall 60A of the chassis 44 and the retention wall 174 and the upper wing 138A is captured between the front wall 60A of the chassis 44 and the retention wall 172, as depicted in FIG. 5D. The retention assembly, made up of the tab 138 (integral with or coupled to the disk 38A) and the retention walls 172, 174, is thus engaged along with the extension of the deadbolt 58 from the latch plate 57, such that the key-side assembly 20 is secured to the lever-side assembly 40 with locking of the deadbolt 58 to the door frame and a mechanical interference is created in the axial direction. As the chassis 44 is fixed with the door 12 that is dead-bolted in a closed position, the retention assembly maintains the door 14 to the door 12, both thus locked together in closed positions. As described above, rotation of the key 28 or of the lever 52 counterclockwise back to TDC does not cause the deadbolt 58 to unlock or the wings 138A, 138B to disengage from the retention walls 172, 174. Rather, simultaneous unlocking and disengagement is accomplished, as also described above, by rotating the key 28 or the lever 52 counterclockwise approximately 90 degrees from TDC.

It is noted that the wings 138A, 138B of the retention tab 138 are preferably identical to one another as are the retention walls 172, 174 so as to accommodate different-handed mounting of the deadbolt assembly hardware. In alternate embodiments in which greater rotation of the key 28 or lever 52, e.g., 180 degrees from TDC, is required to lock the deadbolt 58, the wings 138A, 138B and/or the retention walls 172, 174 may be reconfigured to accommodate such rotation.

Figure 6A:
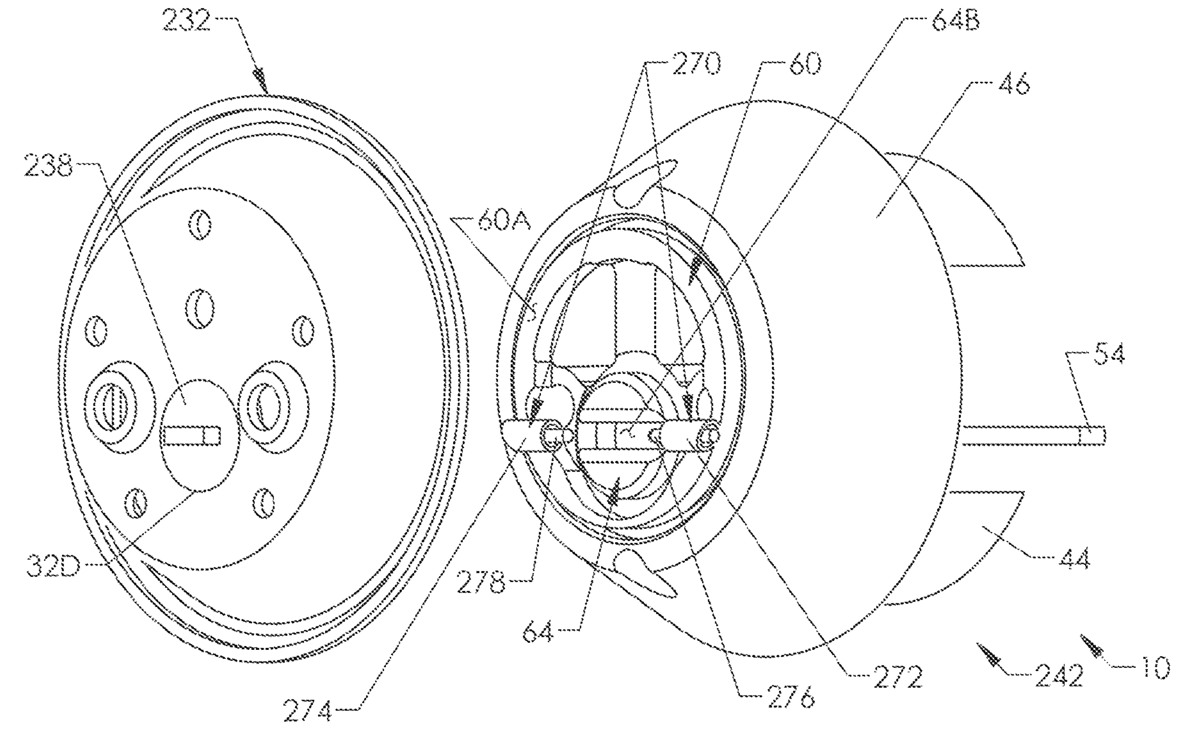
FIG. 6A is a perspective view of the coupling assemblies of the deadbolt assembly of FIGS. 1-3B including yet another embodiment of a retention assembly for securing the coupling assemblies together simultaneously with actuation of the deadbolt, as viewed from the rear of the key-side coupling assembly.
Figure 6B:
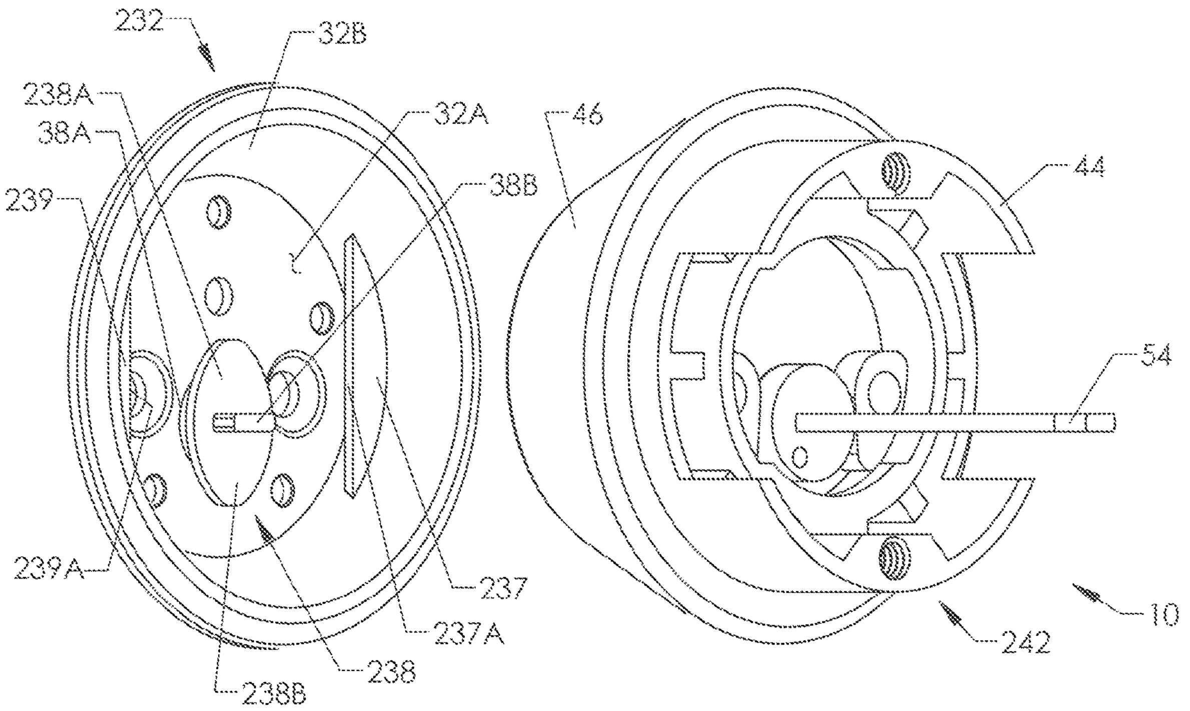
FIG. 6B is another perspective view of the deadbolt assembly of FIG. 6A as viewed from the rear of the lever-side coupling assembly.

Referring now to FIGS. 6A-6D, yet another embodiment is shown of a retention assembly for securing the coupling assemblies 232, 242 of the key-side assembly 20 and the lever-side assembly 40 together simultaneously with actuation of the deadbolt 58 in a similar manner as described above. As depicted in FIG. 6B, the component of the retention assembly carried by the coupling assembly 232 illustratively is implemented in the form of a retention tab 238 coupled to or integral with the disk 38A of the actuator interface 38. In the illustrated embodiment, the retention tab 238 defines a planar upper wing 238A extending upwardly from the disk 38A and a planar lower wing 238B extending downwardly from the disk 38A, and the key 38B extends axially away from the exposed planar surface of the wings 238A, 238B centrally therebetween. As depicted best in FIG. 6B, an additional component of the retention assembly carried by the coupling assembly 232 can preferably include a pair of retention walls 239, 237 each fixed in position with the wall 32B of the coupling assembly 232 and extending over and spaced axially apart from the rear wall 32A of the coupling assembly 232. The retention wall 237 is defined along one side of the rear wall 32A and defines a vertically disposed edge 237A facing a vertically disposed edge 239A of the retention wall 239 defined along an opposite side of the rear wall 32A, such that the edge 237A is spaced laterally apart from the edge 239A and such that the retention tab 238 is preferably positioned centrally between the edges 237A, 239A.

Figure 6C:
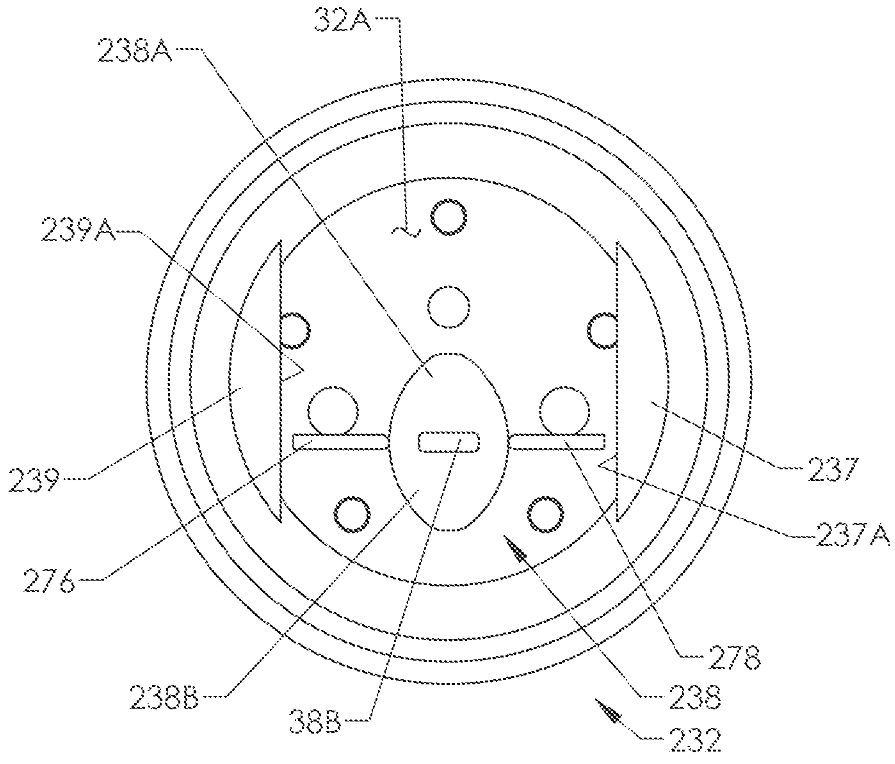
FIG. 6C is a rear and partial assembly view of the key-side assembly illustrating coupling together of the retention assembly and deadbolt actuation components of the two coupling assemblies of FIGS. 6A and 6B but prior to actuation of the retention assembly and deadbolt.
Figure 6D:
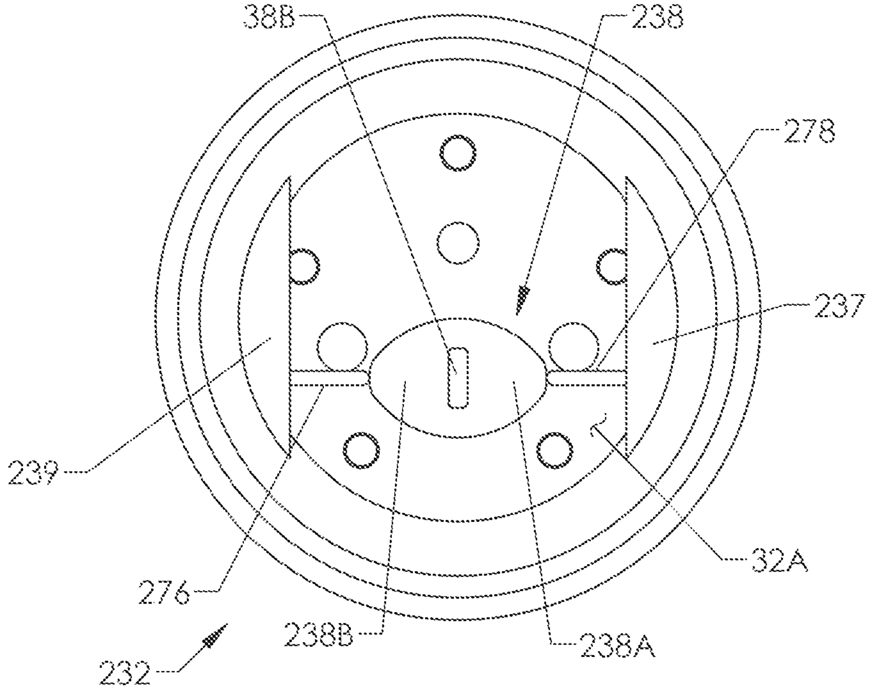
FIG. 6D is a rear and partial assembly view similar to FIG. 6C illustrating the retention assembly and deadbolt actuation components of the two coupling assemblies after actuation of the retention assembly and deadbolt.

As depicted in FIG. 6A, the component of the retention assembly carried by the coupling assembly 242 is illustratively implemented in the form of a pair of biased pin structures 270 positioned on either side of the actuator interface 64 and extending laterally along the front wall 60A of the chassis 44. In particular, the biased pin structures 270 illustratively include a pair of tubes 272, 274 coupled to the front wall 60A and positioned on either side of the actuator interface 64, with each tube 272, 274 defining a lateral passageway centrally therethrough. A biased pin 276 is received within the tube 272, and another biased pin 278 is received within the tube 274. As generally depicted in FIG. 6A, the pins 276, 278 are illustratively biased toward one another. The tab 238, the retention walls 237, 239 and the biased pin structures 270 are illustratively sized relative to one another such that the retention tab 238, with the wings 238A, 238B disposed vertically, passes between the opposed ends of the biased pins 276, 278 as the key 38B of the actuator interface 38 is coupled to the slot 64B of the actuator interface 64, as depicted in FIG. 6C. FIGS. 6C and 6D show the coupling assembly 232 from a perspective within the coupling assembly 242 but with the pins 276, 278 shown separated from the coupling assembly 242 and as they interact with retention tab 238 and walls 237 and 239. As the retention tab 238 is rotated approximately 90 degrees clockwise by operation of the key 28 or by operation of the lever 52 and transferred to the retention tab 238 by the actuator interface 64 as described above, the retention tab 238 likewise rotates clockwise such that the lower wing 238B contacts one end of the pin 276 and overcomes the bias of the pin 276 in the direction of the pin 278 to force the opposite end of the pin 276 between the rear wall 32A of the housing 232 and the retention wall 239, and such that the upper wing 238A contacts one end of the other pin 278 and overcomes the bias of the pin 278 in the direction of the pin 276 to force the opposite end of the pin 278 between the rear wall 32A of the housing 232 and the retention wall 237. As a result, the pins 276, 278 are captured between the rear wall 32A of the coupling assembly 232 and the retention walls 239, 237 respectively to create a mechanical interference in the axial direction. The retention assembly, made up of the tab 238 (integral with or coupled to the disk 38A), the retention walls 237, 239 and the biased pins 270, is thus engaged simultaneously with extension of the deadbolt 58 from the latch plate 57, such that the key-side assembly 20 is secured to the lever-side assembly 40 simultaneously with locking of the deadbolt 58 to the door frame. As the chassis 44 is fixed with the door 12 that is dead-bolted in a closed position, the retention assembly maintains the door 14 to the door 12, both thus locked together in closed positions. As described above, rotation of the key 28 or of the lever 52 counterclockwise back to TDC does not cause the deadbolt 58 to unlock or the pins 276, 278 to disengage from the retention walls 239, 237 respectively. Rather, simultaneous unlocking and disengagement is accomplished, as also described above, by rotating the key 28 or the lever 52 counterclockwise approximately 90 degrees from TDC.

It will be noted that the wings 238A, 238B of the tab 238 are identical to one another as are the retention walls 237, 239 and the pins 276, 278 so as to accommodate different-handed mounting of the deadbolt assembly hardware. In alternate embodiments in which greater rotation of the key 28 or lever 52, e.g., 180 degrees from TDC, is required to lock the deadbolt 58, the wings 238A, 238B of the retention tab 238, the retention walls 237, 239 and/or the pins 276, 278 may be reconfigured to accommodate such rotation. It is also contemplated that a similar structure can be provided as described above and shown in FIGS. 6A-6D, but with only a single pin 276, for example. A single interference element would suffice. Other structure behind which one or more pins could be controllable positioned include one or more holes, or other structure defining one or more edges behind which such a pin could be controllably positioned.

Figure 7A:
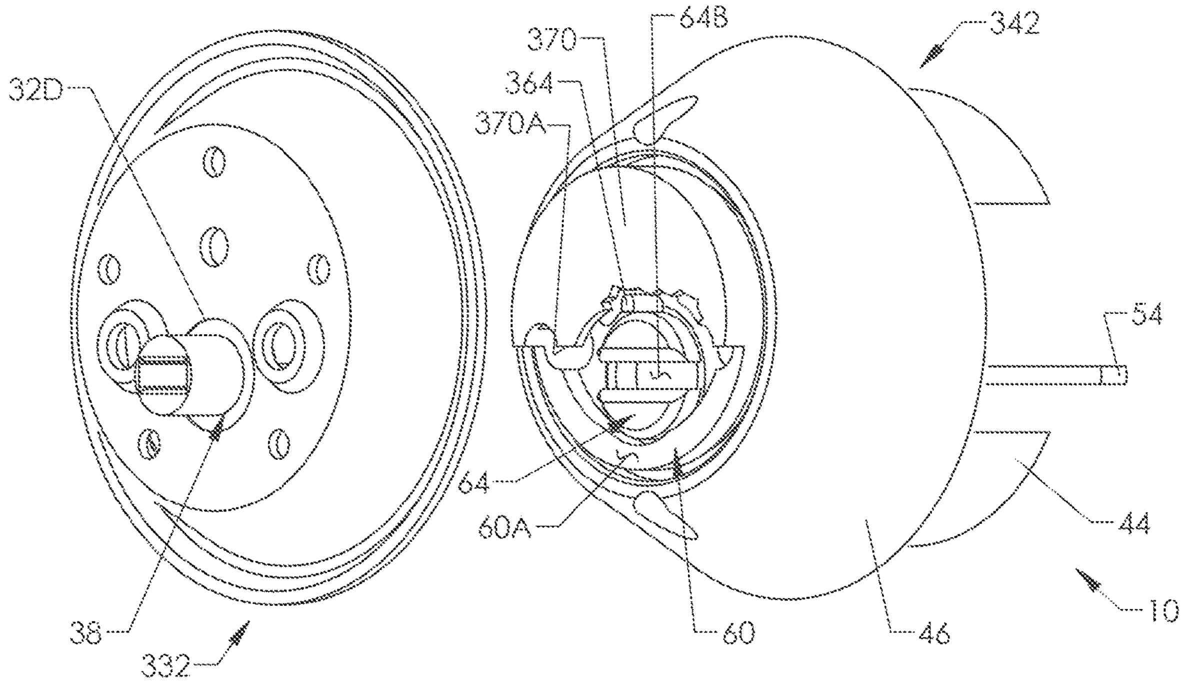
FIG. 7A is a perspective view of the coupling assemblies of the deadbolt assembly of FIGS. 1-3B including still another embodiment of a retention assembly for securing the coupling assemblies together simultaneously with actuation of the deadbolt, as viewed from the rear of the key-side coupling assembly.
Figure 7B:
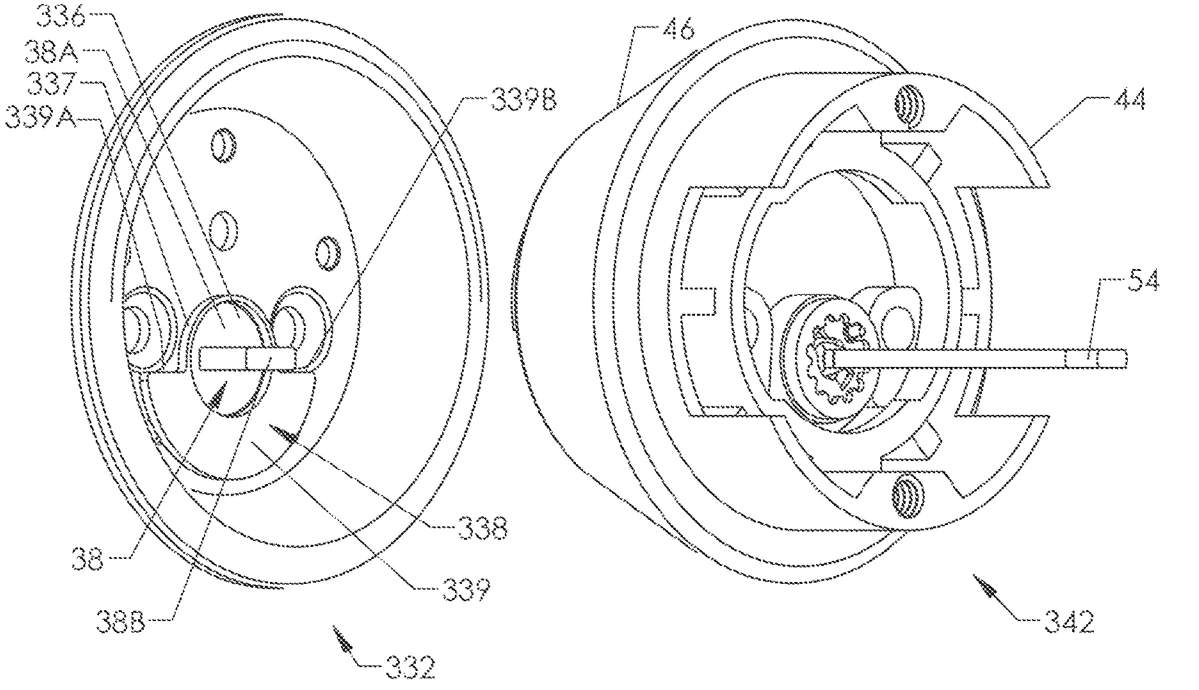
FIG. 7B is another perspective view of the deadbolt assembly of FIG. 7A as viewed from the rear of the lever-side coupling assembly.

Referring now to FIGS. 7A-7D, still another embodiment is shown of a retention assembly for securing the coupling assemblies 332, 342 of the key-side assembly 20 and the lever-side assembly 40 together simultaneously with actuation of the deadbolt 58 in a similar manner as described. As depicted in FIG. 7B, the component of the retention assembly carried by the coupling assembly 332 illustratively is implemented in the form of a retention disk 338 that is a separate component from the disk-like actuator interface 38. In the illustrated embodiment, the actuator interface 38 extends through the opening 32D as described above, and is operable as described above to engage the actuator interface 64 to control operation of the deadbolt 58. The front face of the rear wall 32 of the coupling assembly 332 illustratively defines an annular track 336 about the actuator interface 38 and about which an annular ring 337 of the retention disk 338 rotates. A planar, annular sweep 339 extends radially outward from the ring 337, and extends about the ring 337 from one edge 339A to an opposite edge 339B. Illustratively, the sweep 339 preferably spans approximately 180 degrees from edge 339A to edge 339B, although in alternate embodiments the span may be greater or less than 180 degrees. In any case, the actuator interface 38 and the retention disk 338 are each rotatable relative to the housing 332 independently of one another.

Figure 7C:
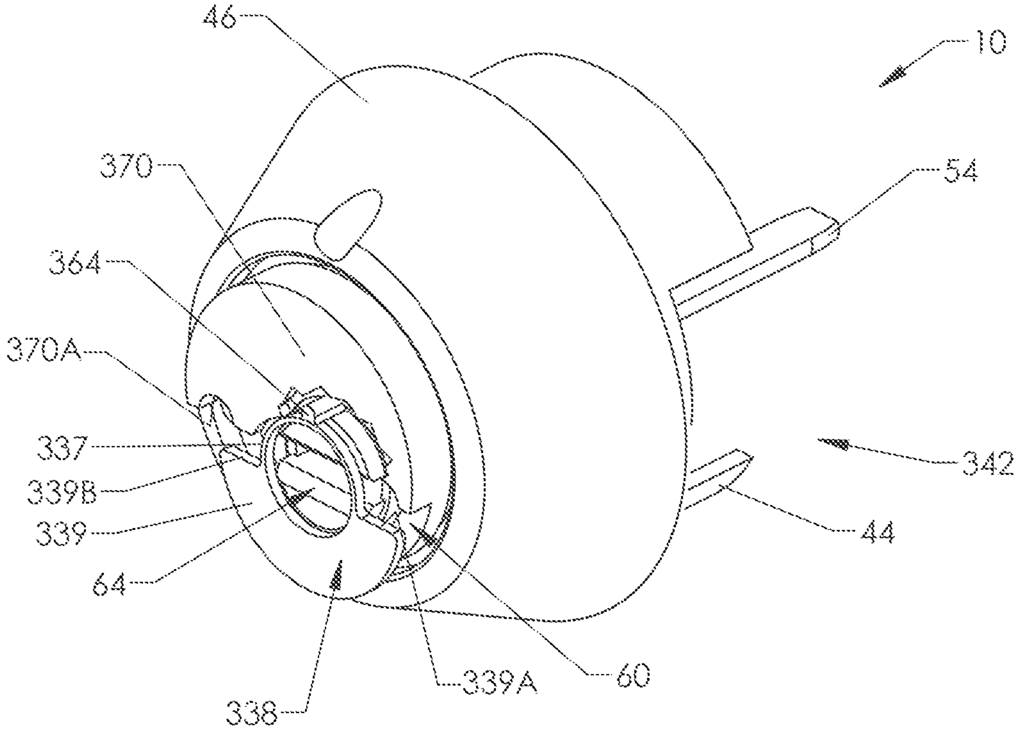
FIG. 7C is a perspective and partial assembly view similar to FIG. 7A with the key-side assembly omitted, illustrating coupling together of the retention assembly and deadbolt actuation components of the two coupling assemblies but prior to actuation of the retention assembly and deadbolt.

As depicted in FIG. 7A, the component of the retention assembly carried by the coupling assembly 342 is illustratively implemented in the form of a retention wall 370 that is connected with and extending over and spaced axially apart from the front wall 60A of the chassis 44. The retention wall 370 is illustratively sized to cover approximately the upper half of the front wall 60A of the chassis 44, with an edge 370A (see FIG. 7D) of the wall 370 extending generally laterally across the front wall 60A above the actuator interface 64, i.e., such that the actuator interface 64 is exposed below the edge 370A of the retention wall 370. An actuator pin 364 extends axially away from the actuator interface 64, and in the illustrated embodiment the actuator pin 364 is located approximately at top dead center (TDC) of the interface 64, which position as in FIGS. 7A and 7C is behind the retention wall 370 with the pin being visible as a portion of the wall 370 is removed to show the pin 364 in a TDC position.

In the illustrated embodiment, as is illustratively the case with the remaining embodiments to be described, the coupling assembly 342 includes the clutch 62 coupled to the chassis 44 and operatively coupled to the spindle 54. In this and the remaining embodiments, the clutch 62 is illustratively operable to engage the spindle 54 as the spindle is rotated clockwise from TDC to approximately 90 degrees such that rotation of the spindle 54 from TDC to approximately 90 degrees in the clockwise direction does not cause the latch assembly 50 to extend the deadbolt 58 outwardly away from the latch plate 37. The clutch 62 is further illustratively operable to engage with the spindle 54 as the spindle is further rotated clockwise from approximately 90 degrees to approximately 180 degrees such that rotation of the spindle 54 from approximately 90 degrees in the clockwise direction to approximately 180 degrees in the clockwise direction causes the deadbolt assembly 56 to extend the deadbolt 58 outwardly away from the latch plate 37. In this and the remaining embodiments, with the deadbolt 58 retracted within the deadbolt assembly 56, rotation of the key 28 approximately 180 degrees in the clockwise direction or rotation of the lever 52 approximately 180 degrees in the counterclockwise direction is required to lock the deadbolt 58 and, with the deadbolt 58 fully extended from the latch plate 57, rotation of the key 28 approximately 180 degrees in the counterclockwise direction or rotation of the lever 52 approximately 180 degrees in the clockwise direction is required to unlock the deadbolt 58. It will be understood that while this and the remaining embodiments are designed specifically for such operation, this and/or any of the remaining embodiments may be modified to operate as described with respect to the embodiments illustrated in FIGS. 4A-6D, and that any such modifications will be a mechanical step for persons skilled in the art.

Figure 7D:
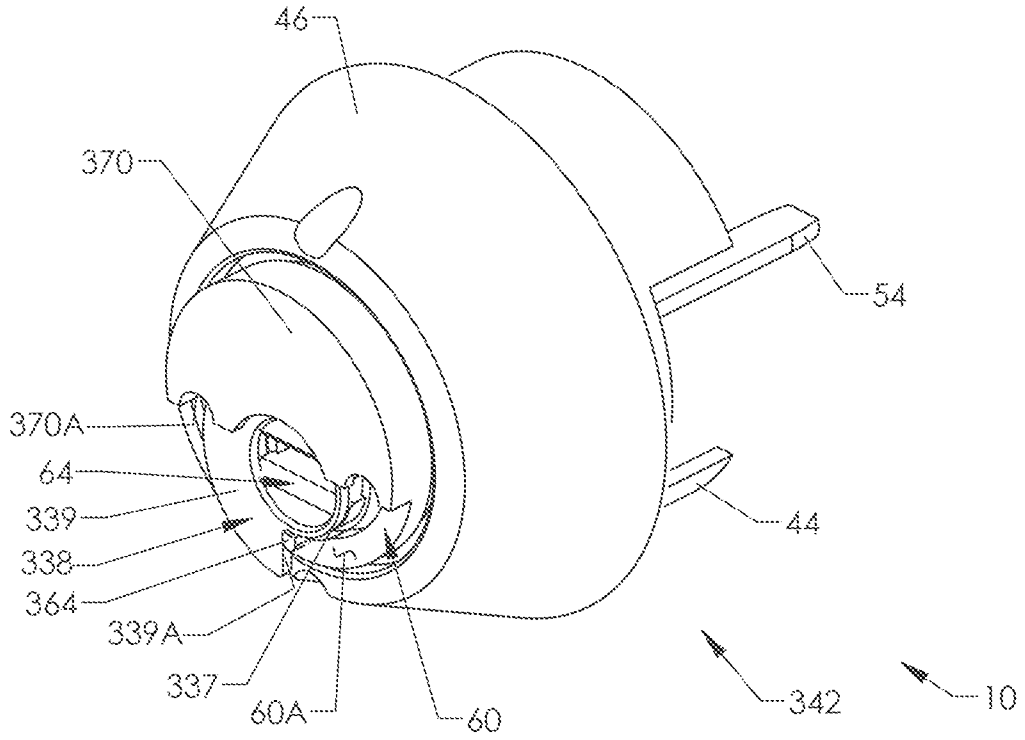
FIG. 7D is a perspective and partial assembly view similar to FIG. 7C illustrating the retention assembly and deadbolt actuation components of the two coupling assemblies after actuation of the retention assembly and deadbolt.

Returning now to FIGS. 7A-7D, wherein FIGS. 7C and 7D depict retention disk 338 separated from coupling assembly 332 and interacting with pin 364 and wall 370, the retention disk 338 and the retention wall 370 are illustratively sized relative to one another such that the sweep 339, including both edges 339A, 339B thereof, are positioned below the edge 370A of the retention wall 370 as the key 38B of the actuator interface 38 is coupled to the slot 64B of the actuator interface 64, as depicted in FIG. 7C. As the actuator interface 38 is rotated approximately 90 degrees clockwise by operation of the key 28 or by operation of the lever 52 and transferred to the actuator interface 38 by the actuator interface 64 as described above, the interface 64 likewise rotates clockwise which does not cause the spindle 54 to rotate but which does cause the actuator pin 364 to move from approximately TDC to approximately 90 degrees from TDC, which adjacent to or in contact with the edge 339A of the sweep 339. Further rotation in the same rotary direction of the interfaces 38 and 64 forces the actuator pin 364 against the edge 339A of the sweep 339 which causes the sweep 339 to rotate in the same rotary direction such that at least a portion of the sweep 339 adjacent to the opposite edge 339B rotates behind the edge 370A of the retention wall 370 and is captured between the front wall 60A of the chassis 44 and the retention wall 370, as depicted in FIG. 7D to create a mechanical interference in the axial direction. The retention assembly, made up of the retention disk 338, the retention wall 370 and the actuator pin 364, is thus engaged along with the extension of the deadbolt 58 from the latch plate 57, such that the key-side assembly 20 is secured to the lever-side assembly 40 with locking of the deadbolt 58 to the door frame. As the chassis 44 is fixed with the door 12 that is dead-bolted in a closed position, the retention assembly maintains the door 14 to the door 12, both thus locked together in closed positions. As described above, rotation of the key 28 or of the lever 52 counterclockwise back to TDC does not cause the retention disk 338 to rotate out and away from the retention wall 370. Rather, simultaneous unlocking and disengagement is accomplished, as also described above, by rotating the key 28 or the lever 52 counterclockwise approximately 180 degrees from TDC.

Figure 8A:
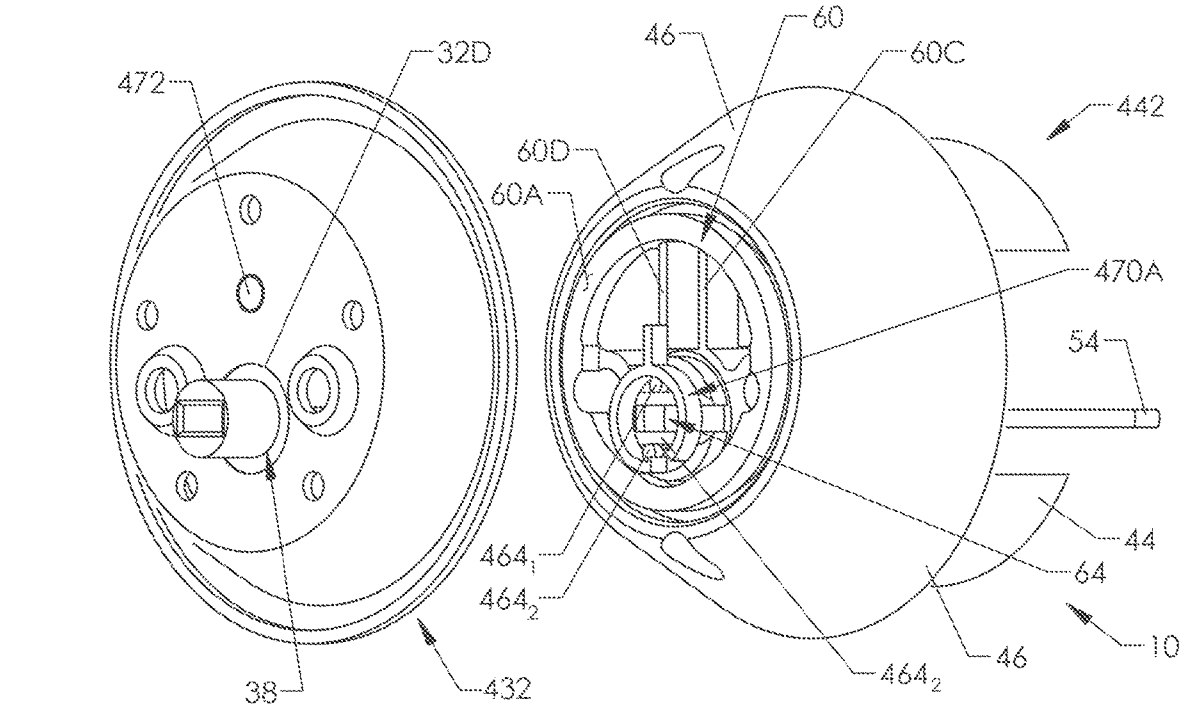
FIG. 8A is a perspective view of the coupling assemblies of the deadbolt assembly of FIGS. 1-3B including a further embodiment of a retention assembly for securing the coupling assemblies together simultaneously with actuation of the deadbolt, as viewed from the rear of the key-side coupling assembly.
Figure 8B:
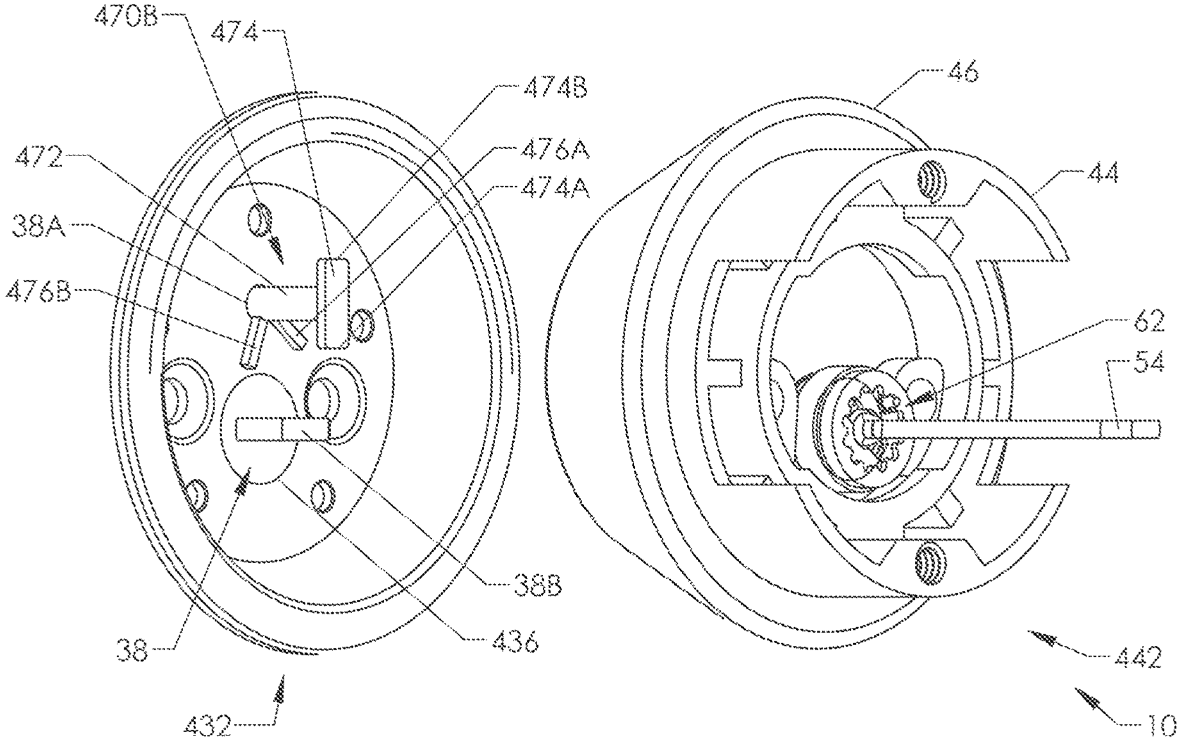
FIG. 8B is another perspective view of the deadbolt assembly of FIG. 8A as viewed from the rear of the lever-side coupling assembly.

Referring now to FIGS. 8A-8D, a further embodiment is shown of a retention assembly for securing the coupling assemblies 432, 442 of the key-side assembly 20 and the lever-side assembly 40 together simultaneously with actuation of the deadbolt 58 as just described. As depicted in FIGS. 8A-8D, the component of the retention assembly carried by the coupling assembly 432 illustratively is implemented in the form of a combination of a rotatable actuator 470A and a rotatable engagement member 470B both separate from the actuator interface 38. In the illustrated embodiment, the actuator interface 38 extends through the opening 32D as described above, and is operable as described above to engage the actuator interface 64 to control operation of the deadbolt 58. The front face of the rear wall 32 of the coupling assembly 432 illustratively defines the annular track 436 about the actuator interface 38 and about which an open-ended annular ring 480 of the rotatable actuator 470A rotates. The annular ring 480 and actuator 470A are illustrated in FIG. 8A as positioned on coupling assembly 442, although they are rotationally supported on the annular track 436 surrounding the interface 38. An actuator bar 482 extends upwardly from the ring 480 generally opposite a gap 484 defined between the open ends of the ring 480. Inwardly-directed stop members 486A, 486B extend from an inner surface of the ring 480 at or adjacent to respective ends of the open-ended ring 480. The rotatable engagement member 470B includes an elongated post or shaft 472 having one end received within an opening defined in the rear wall 32A of the coupling assembly 432 such that the post 472 is rotatable relative to the coupling assembly 432. Adjacent the one end of the post 472, a pair of actuator legs 476A, 476B extend radially away from the post 472, wherein the legs are radially displaced from one another by an acute angle. In one embodiment the angle is about 80 degrees, although in other embodiments the angle may be greater or less than 80 degrees. In any case, an engagement sweep 474 is defined at an opposite end of the post 472, wherein the sweep 474 is illustratively approximately rectangular in shape having opposed short ends 474A, 474B. In any case, the actuator interface 38, the actuator 470A and the engagement member 470B are all independent of one another with each being rotatable relative to the housing 432 independently of one another.

Figure 8C:
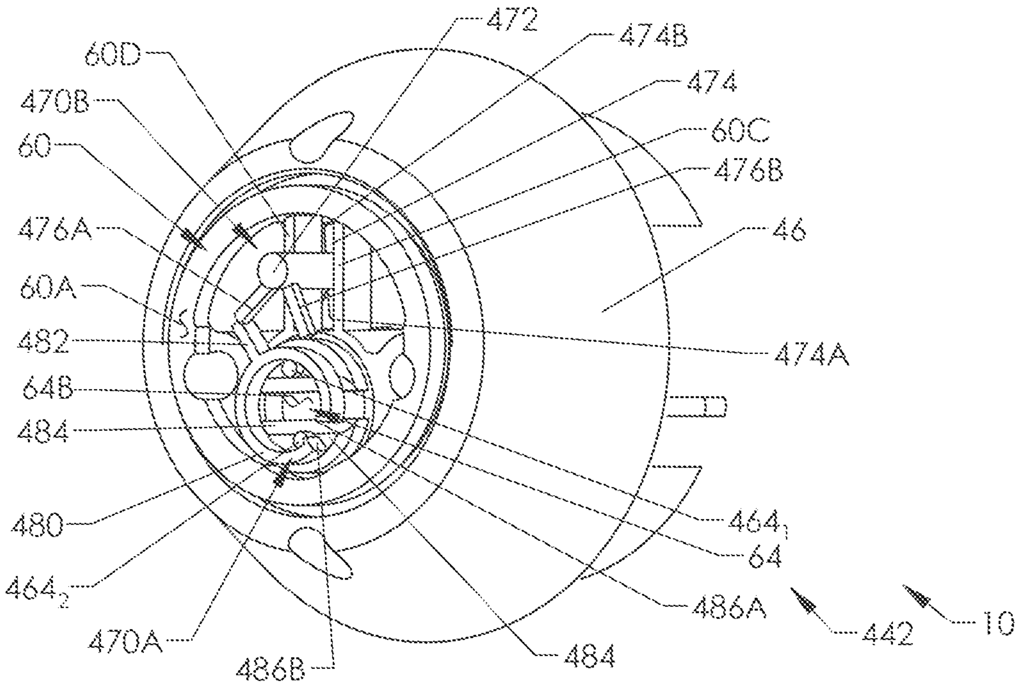
FIG. 8C is a perspective and partial assembly view similar to FIG. 8A with the key-side assembly omitted, illustrating coupling together of the retention assembly and deadbolt actuation components of the two coupling assemblies but prior to actuation of the retention assembly and deadbolt.
Figure 8D:
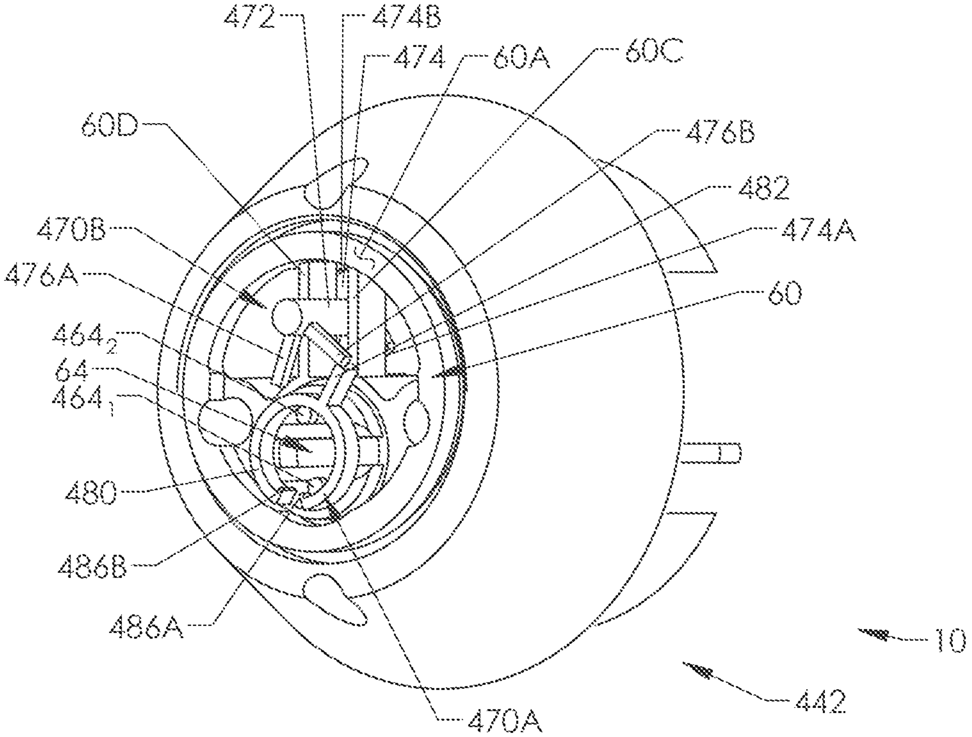
FIG. 8D is a perspective and partial assembly view similar to FIG. 8C illustrating the retention assembly and deadbolt actuation components of the two coupling assemblies after actuation of the retention assembly and deadbolt.

As depicted in FIGS. 8A, 8C and 8D, the component of the retention assembly carried by the coupling assembly 442 is illustratively implemented in the form of a pair of spaced-apart retention columns 60C, 60D formed in and by the front wall 60A of the chassis 44. The columns 60C, 60D are illustratively spaced apart by a distance that is just greater than the width between the long edges of the rectangular sweep 474, and the opening formed between the columns 60C, 60D is less than the length between the short edges 474A, 474B of the rectangular sweep 474 such that the sweep 474, when oriented with its long walls running vertically, can pass through the space defined between the columns 60C, 60D. At least one actuator pin 464$_1$ extends axially away from the actuator interface 64, and in the illustrated embodiment the actuator pin 464$_1$ is located approximately at top dead center (TDC) of the interface 64. In some embodiments, another actuator pin 464$_2$ may extend axially away from the actuator interface 64, and in the illustrated embodiment the actuator pin 464$_2$ is located at or adjacent to the stop member 486B (see, e.g., FIG. 8C).

FIGS. 8C and 8D depict rotatable engagement member 470B and rectangular sweep 474 separated from coupling assembly 432 and interacting with pin 464$_1$ (and 464$_2$), rotatable actuator member 470A, and columns 60C, 60D. In assembly, the actuator bar 482 of the rotatable actuator 470A is positioned between the legs 476A, 476B of the rotatable engagement member 470B and rectangular sweep 474 is inserted into and through the opening between the columns 60C, 60D as the key 38B of the actuator interface 38 is coupled to the slot 64B of the actuator interface 64, as depicted in FIG. 8C. As the actuator interface 38 is rotated approximately 90 degrees clockwise by operation of the key 28 or by operation of the lever 52 and transferred to the actuator interface 38 by the actuator interface 64 as described above, the interface 64 likewise rotates clockwise which does not cause the spindle 54 to rotate but which does cause the actuator pin 464$_1$ to move from approximately TDC to approximately 90 degrees from TDC, which is adjacent to or in contact with the edge stop member 486A of the ring 480. In embodiments which include the actuator pin 464$_2$, the rotation just described locates the actuator pin 464$_2$ substantially across from the pin 464$_1$, or at about 90 degrees clockwise of BDC. Further clockwise rotation of the interfaces 38 and 64 forces the actuator pin 464$_1$ against the stop member 486$_1$ of the ring 480 which causes the ring 480 to rotate in the clockwise direction such that the actuator bar 482 is rotatably forced against the leg 476B of the rotatable engagement member 470B thereby causing the rotatable engagement member to rotate in the counterclockwise direction such that a portion of the rectangular sweep 474 adjacent to the edge 474A thereof is trapped behind the column 60C and a portion of the rectangular sweep 474 adjacent to the edge 474B thereof is trapped behind the column 60D, as depicted in FIG. 8D to create a mechanical interference in the axial direction. The retention assembly, made up of the rotatable actuator 470A, the rotatable engagement member 470B and the actuator pin 464$_1$, is thus engaged simultaneously with extension of the deadbolt 58 from the latch plate 57, such that the key-side assembly 20 is secured to the lever-side assembly 40 simultaneously with locking of the deadbolt 58 to the door frame. As described above, rotation of the key 28 or of the lever 52 counterclockwise back to TDC does not cause the sweep 474 to rotate such that it may be axially drawn out and away from between the columns 60C, 60D. Rather, simultaneous unlocking and disengagement is accomplished, as also described above, by rotating the key 28 or the lever 52 counterclockwise. In embodiments which do not include the actuator pin 464$_2$, the key 28 or lever 52 must be rotated approximately 360 degrees in order to engage the stop member 486B and force the ring 480 to rotate sufficiently to cause the actuator bar 482 against the leg 476A to drive the engagement member 470B sufficiently counterclockwise to position the sweep 474 such that it may be axially drawn out of and away from between the columns 60C, 60D. In embodiments which do include the actuator pin 464$_2$, the key 28 or lever 52 need only be rotated approximately 180 degrees in order to achieve the same result.

Figure 9A:
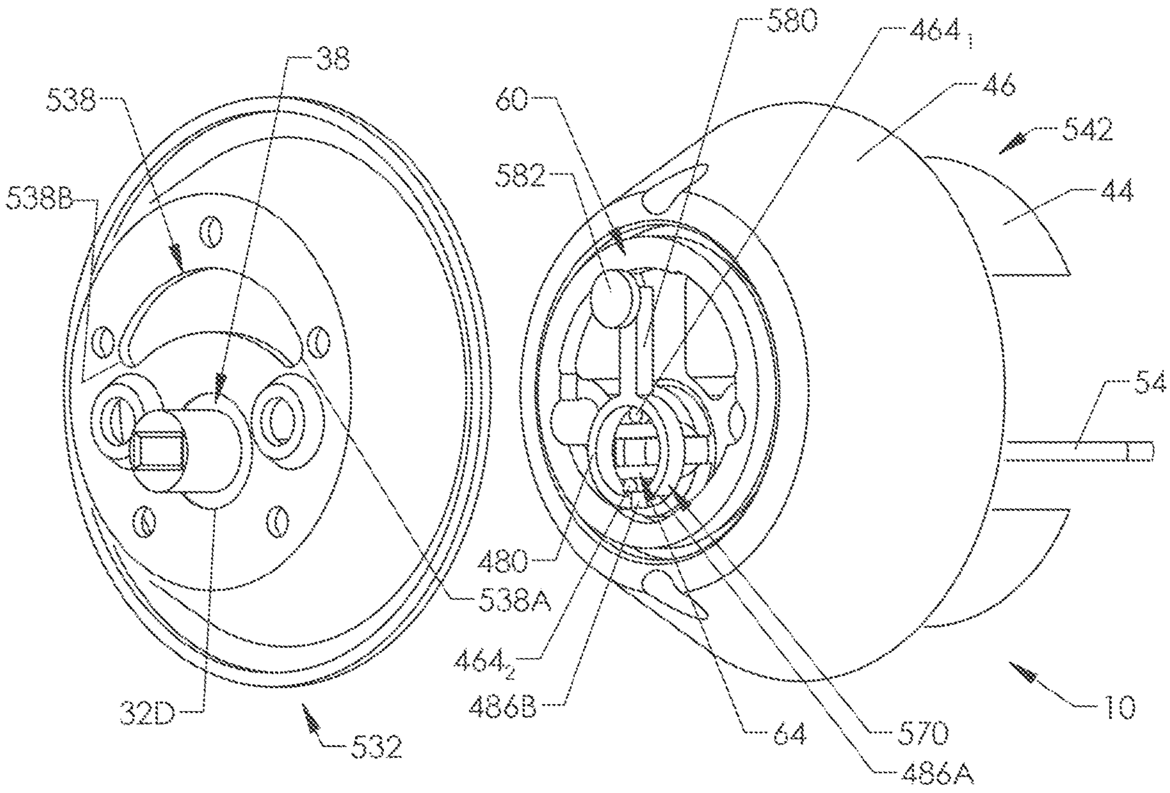
FIG. 9A is a perspective view of the coupling assemblies of the deadbolt assembly of FIGS. 1-3B including yet a further embodiment of a retention assembly for securing the coupling assemblies together simultaneously with actuation of the deadbolt, as viewed from the rear of the key-side coupling assembly.
Figure 9B:
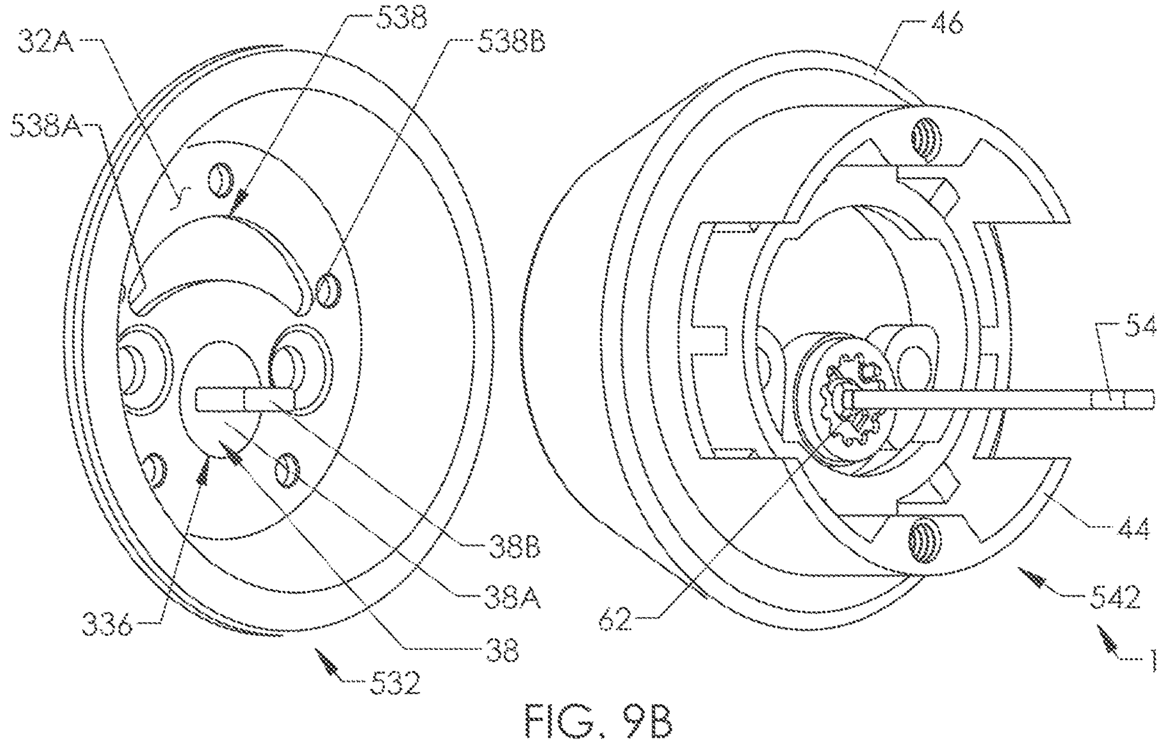
FIG. 9B is another perspective view of the deadbolt assembly of FIG. 9A as viewed from the rear of the lever-side coupling assembly.

Referring now to FIGS. 9A-9D, yet a further embodiment is shown of a retention assembly for securing the coupling assemblies 532, 542 of the key-side assembly 20 and the lever-side assembly 40 together simultaneously with actuation of the deadbolt 58 in a similar manner as described above. As depicted in FIGS. 9A and 9B, the component of the retention assembly carried by the coupling assembly 532 illustratively is implemented in the form of a combination of a rotatable actuator 570 and a channel 538 defined through the rear wall 32A of the coupling assembly 532, both of which are separate from the actuator interface 38. In the illustrated embodiment, the actuator interface 38 extends through the opening 32D as described above, and is operable as described above to engage the actuator interface 64 to control operation of the deadbolt 58. The front face of the rear wall 32 of the coupling assembly 532 illustratively defines the annular track 336 about the actuator interface 38 and about which an open-ended annular ring 480 of the rotatable actuator 570 rotates. The annular ring 480 and actuator 570 are illustrated in FIG. 9A as positioned on coupling assembly 542, although they are rotationally supported on the annular track 336 surrounding the interface 38. In the embodiment illustrated in FIGS. 9A-9D, the annular ring 480 is illustratively as described above with respect to FIGS. 8A-8D. In the embodiment of FIGS. 9A-9D, an elongated post 580 extends upwardly from the ring 480, and a head 582 is formed at the free end thereof. The head 582 is illustratively formed in the shape of an annular disk that is axially offset forward of the front edge of the post 580.

The channel 538 is formed through the rear wall 32A of the housing 532 above the actuator interface 38. The channel 538 illustratively has a width that is greater in the center and tapers down to a reduced width at each end 538A, 538B thereof. The disk-shaped head 582 illustratively has a diameter sized to be received through the central area of the channel 538, but that will be retained within the channel 538 adjacent to either end 538A, 538B. As in the embodiment depicted in FIGS. 8A-8D, at least one actuator pin $\mathbf{464}_1$ extends axially away from the actuator interface 64, and in the illustrated embodiment the actuator pin $\mathbf{464}_1$ is located approximately at top dead center (TDC) of the interface 64. In some embodiments, another actuator pin $\mathbf{464}_2$ may extend axially away from the actuator interface 64, and in the illustrated embodiment the actuator pin $\mathbf{464}_2$ is located at or adjacent to the stop member 486B (see, e.g., FIG. 9A).

Figure 9C:
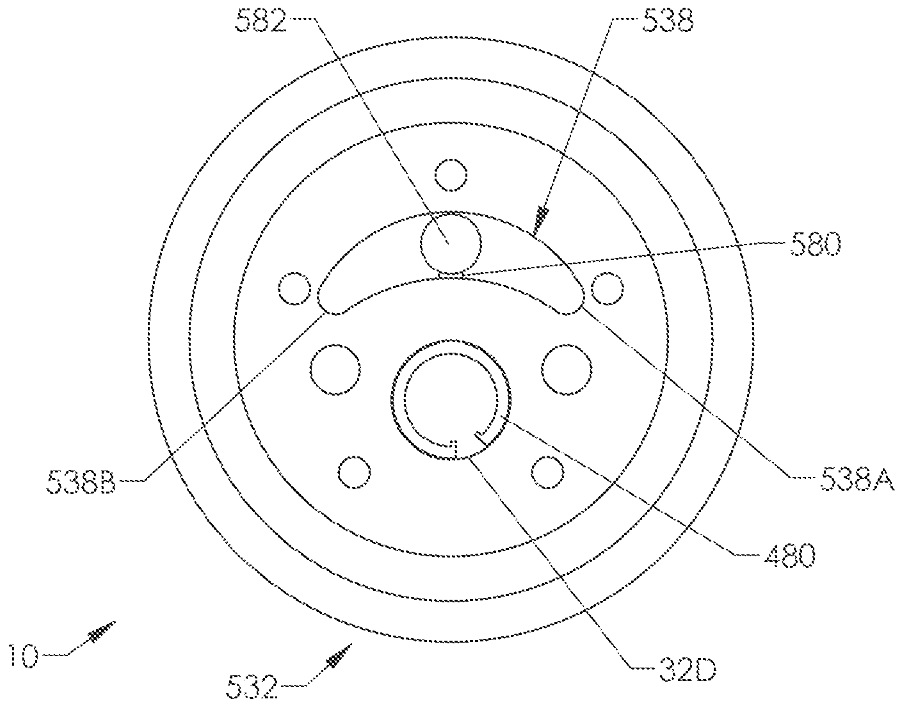
FIG. 9C is a rear and partial assembly view of the key-side assembly illustrating coupling together of the retention assembly and deadbolt actuation components of the two coupling assemblies of FIGS. 9A and 9B but prior to actuation of the retention assembly and deadbolt.
Figure 9D:
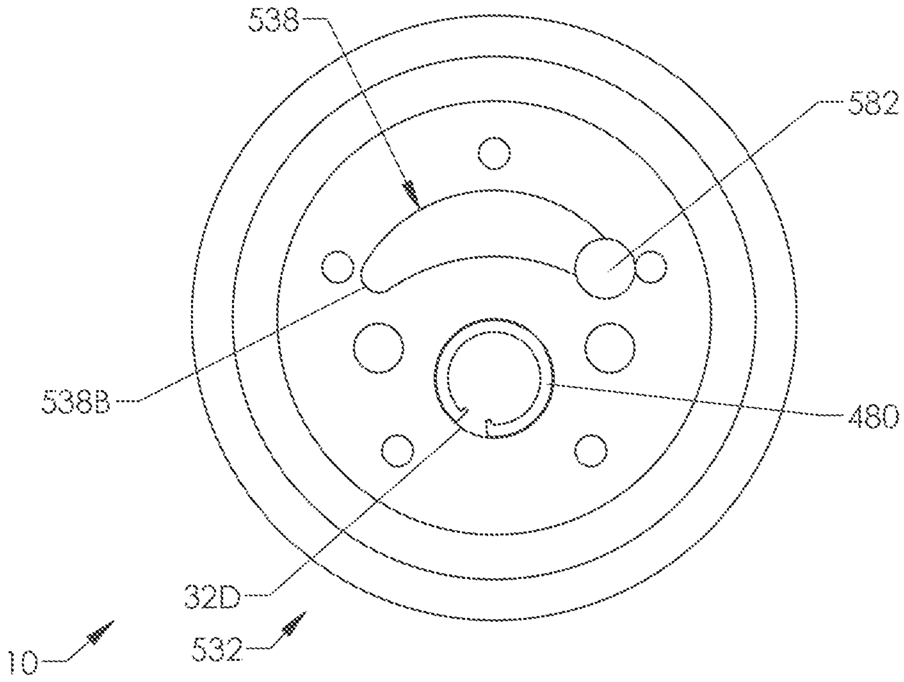
FIG. 9D is a rear and partial assembly view similar to FIG. 9C illustrating the retention assembly components of the two coupling assemblies after actuation of the retention assembly and deadbolt.

The disk-shaped head 582 of the rotatable actuator 570 is positioned within the central portion of the channel 538 as the key 38B of the actuator interface 38 is coupled to the slot 64A of the actuator interface 64, as depicted in FIG. 9C, which along with FIG. 9D depict rotatable actuator 570 separated from its interface with coupling assembly 542 while rotatably positioned to the annular track 336 and interacting with channel 538 in coupling assembly 532. As the actuator interface 38 is rotated approximately 90 degrees clockwise by operation of the key 28 or by operation of the lever 52 and transferred to the actuator interface 38 by the actuator interface 64 as described above, the interface 64 likewise rotates clockwise which does not cause the spindle 54 to rotate but which does cause the actuator pin $\mathbf{464}_1$ to move from approximately TDC to approximately 90 degrees from BDC, which is adjacent to or in contact with the edge stop member 486A of the ring 480 as described above. In embodiments which include the actuator pin $\mathbf{464}_2$, the rotation just described locates the actuator pin $\mathbf{464}_2$ substantially across from the pin $\mathbf{464}_1$, or at about 90 degrees clockwise of BDC. Further clockwise rotation of the interfaces 38 and 64 forces the actuator pin $\mathbf{464}_1$ against the stop member 486A of the ring 480 which causes the ring 480 to rotate in the clockwise direction such that the disk-shaped head 582 is rotatably forced toward and eventually against the end 538A of the channel 538 thereby trapping the head 582 within the channel 538, as depicted in FIG. 9D to create a mechanical interference in the axial direction. The retention assembly, made up of the rotatable actuator 570, the channel 538 and the actuator pin $\mathbf{464}_1$, is thus engaged simultaneously with extension of the deadbolt 58 from the latch plate 57, such that the key-side assembly 20 is secured to the lever-side assembly 40 simultaneously with locking of the deadbolt 58 to the door frame. As described above, rotation of the key 28 or of the lever 52 counterclockwise back to TDC does not cause the rotatable actuator 570 to rotate the disk-shaped head 582 such that it may be axially drawn out and away from the central portion of the channel 538. Rather, simultaneous unlocking and disengagement is accomplished, as also described above, by rotating the key 28 or the lever 52 counterclockwise. In embodiments which do not include the actuator pin $\mathbf{464}_2$, the key 28 or lever 52 must be rotated approximately 360 degrees in order to engage the stop member 486B and force the rotatable actuator 570 to rotate sufficiently to rotate the disk-shaped head 582 to a position such it may be axially drawn out and away from the central portion of the channel 538. In embodiments which do include the actuator pin $\mathbf{464}_2$, the key 28 or lever 52 need only be rotated approximately 180 degrees in order to achieve the same result.

Figure 10A:
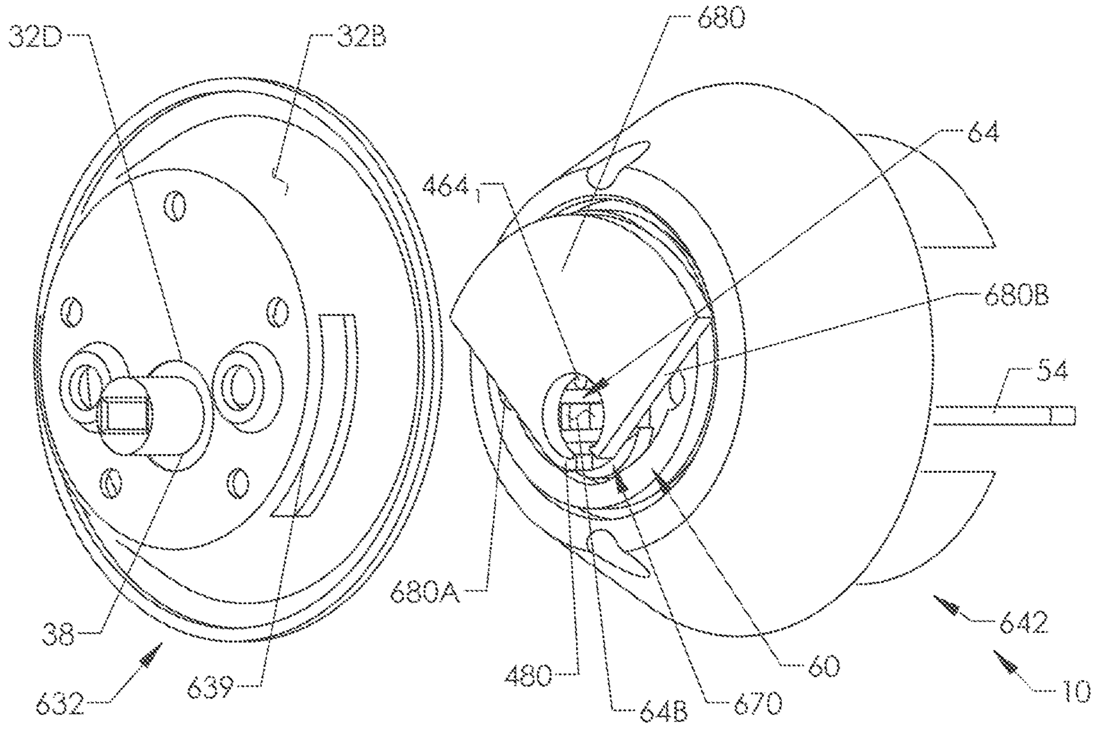
FIG. 10A is a perspective view of the coupling assemblies of the deadbolt assembly of FIGS. 1-3B including still a further embodiment of a retention assembly for securing the coupling assemblies together simultaneously with actuation of the deadbolt, as viewed from the rear of the key-side coupling assembly.
Figure 10B:
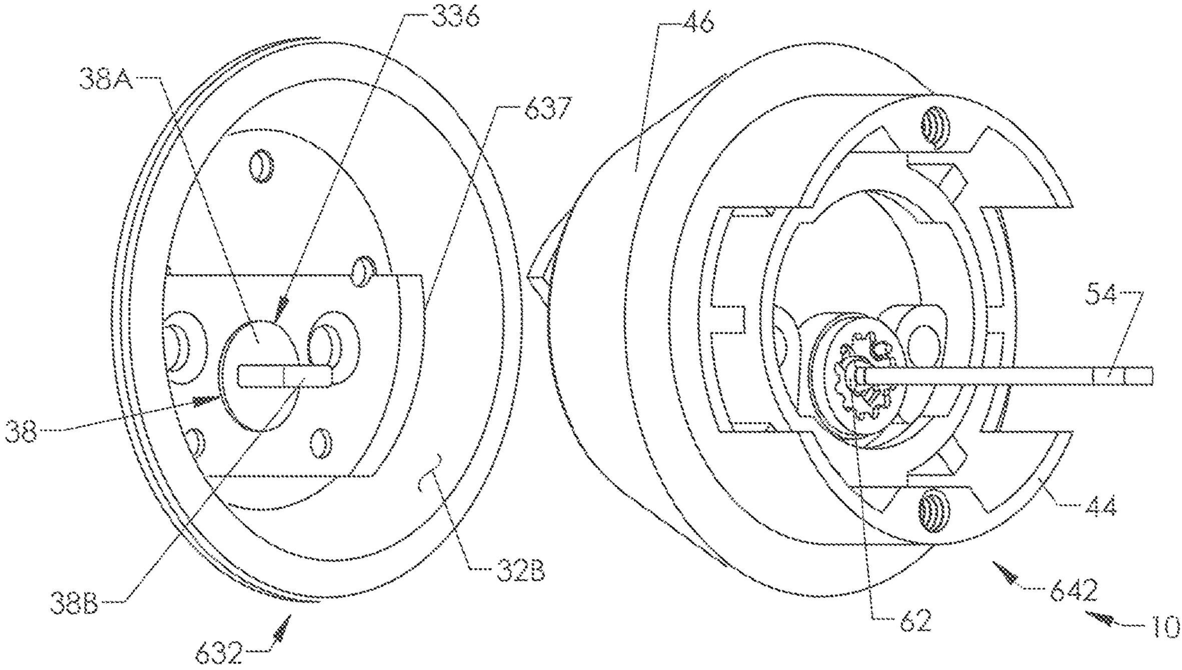
FIG. 10B is another perspective view of the deadbolt assembly of FIG. 10A as viewed from the rear of the lever-side coupling assembly.

Referring now to FIGS. 10A-10F, still a further embodiment is shown of a retention assembly for securing the coupling assemblies 632, 642 of the key-side assembly 20 and the lever-side assembly 40 together simultaneously with actuation of the deadbolt 58 in a similar manner as described above. As depicted in FIGS. 10A and 10B, the component of the retention assembly carried by the coupling assembly 632 illustratively is implemented in the form of a combination of a rotatable actuator 670 and a pair of opposing channels 637, 639 defined through the side wall 32B of the housing 632, both of which are separate from the actuator interface 38. In the illustrated embodiment, the actuator interface 38 extends through the opening 32D as described above, and is operable as described above to engage the actuator interface 64 to control operation of the deadbolt 58. The front face of the rear wall 32 of the housing 532 illustratively defines the annular track 336 about the actuator interface 38 and about which an open-ended annular ring 480 of the rotatable actuator 670 rotates. In the embodiment illustrated in FIGS. 10A-10F, the annular ring 480 is illustratively as described above with respect to FIGS. 8A-8D. In the embodiment of FIGS. 10A-10F, a planar, annular sweep 680 extends upwardly and radially away from the ring 480, and extends about the ring 480 from one edge 680A to an opposite edge 680B thereof. Illustratively, the sweep 680 spans approximately 120 degrees from edge 680A to edge 680B, although in alternate embodiments the span may be greater or less than 120 degrees. In any case, the actuator interface 38 and the rotatable actuator 670 are each rotatable relative to the housing 632 independently of one another. The planar sweep 680 and the channels 637, 639 are illustratively sized and configured such that at least respective portions of the sweep 680 adjacent to the sides 680A, 680B and bottom edge thereof can enter and extend through the channels 637, 639. As in the embodiments depicted in FIGS. 8A-9D, at least one actuator pin $\mathbf{464}_1$ extends axially away from the actuator interface 64, and in the illustrated embodiment the actuator pin $\mathbf{464}_1$ is located approximately at top dead center (TDC) of the interface 64. In some embodiments, another actuator pin may extend axially away from the actuator interface 64, which may be located as illustrated in FIGS. 8A-9D and described above, although such an actuator pin $\mathbf{464}_2$ is not illustrated in FIGS. 10A-10F.

Figure 10C:
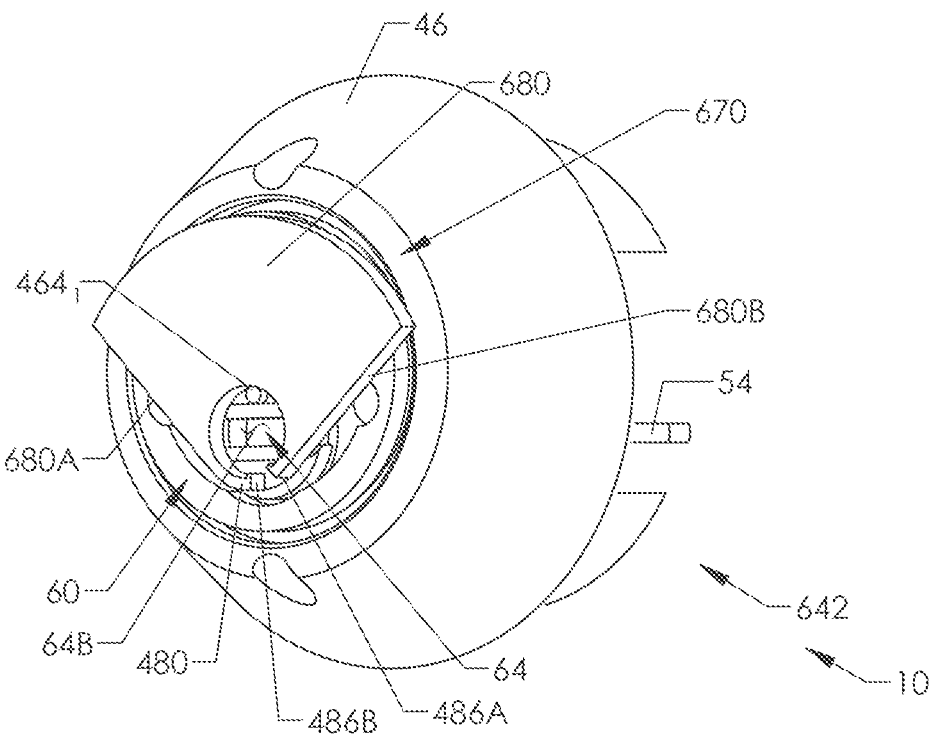
FIG. 10C is a perspective and partial assembly view similar to FIG. 10A with the key-side assembly omitted, illustrating coupling together of the retention assembly and deadbolt actuation components of the two coupling assemblies but prior to actuation of the retention assembly and deadbolt.
Figure 10D:
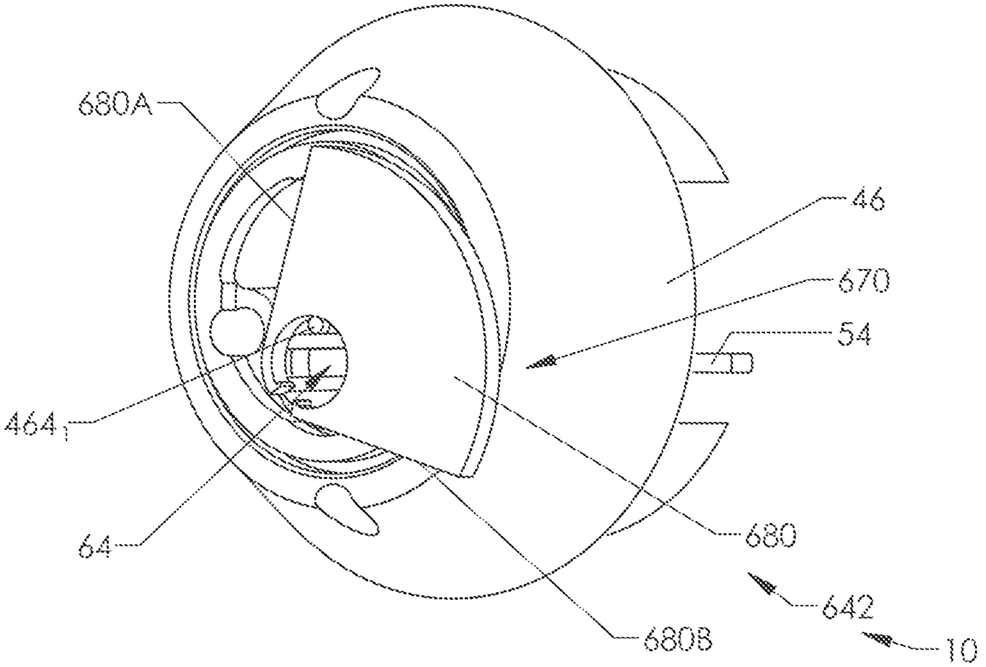
FIG. 10D is a perspective and partial assembly view similar to FIG. 8C illustrating the retention assembly and deadbolt actuation components of the two coupling assemblies after actuation of the retention assembly and deadbolt.
Figure 10E:
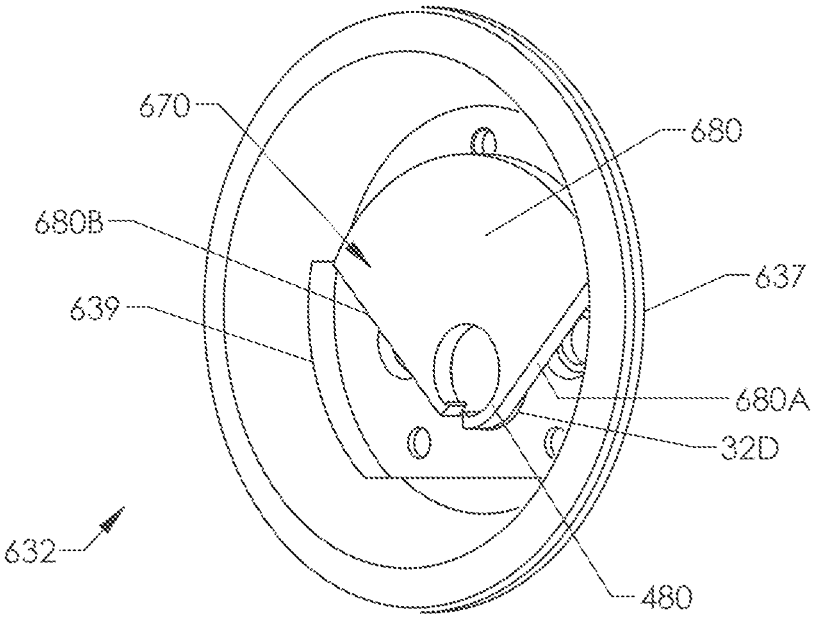
FIG. 10E is a perspective and partial assembly view of the key-side assembly illustrating coupling together of the retention assembly and deadbolt actuation components of the two coupling assemblies of FIGS. 10A-10D but prior to actuation of the retention assembly and deadbolt.
Figure 10F:
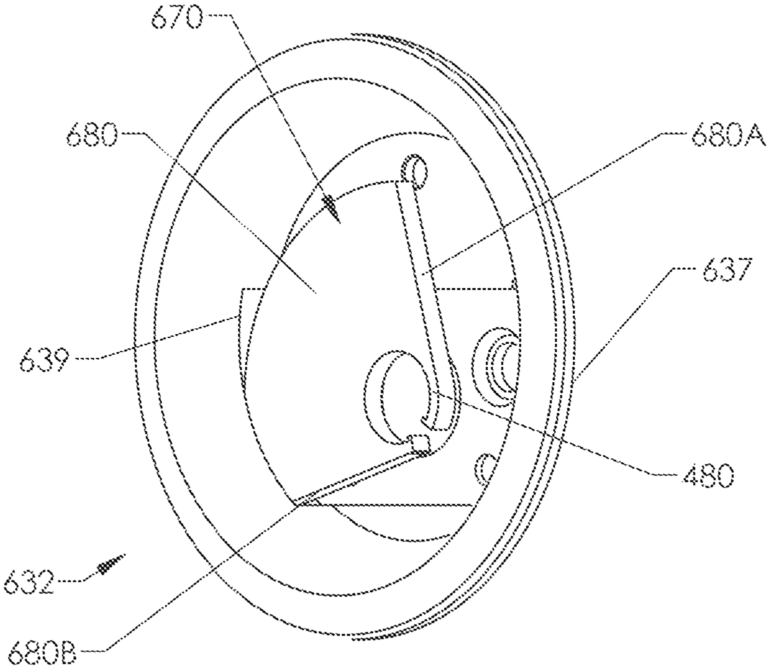
FIG. 10F is a perspective and partial assembly view similar to FIG. 10E illustrating the key-side coupling assembly and the retention assembly after actuation of the retention assembly and deadbolt.

The sweep 680 of the rotatable actuator 670 is positioned completely within the coupling assembly 632 as the key 38B of the actuator interface 38 is coupled to the slot 64B of the actuator interface 64, as depicted in FIGS. 10C and 10E. As the actuator interface 38 is rotated approximately 90 degrees clockwise by operation of the key 28 or by operation of the lever 52 and transferred to the actuator interface 38 by the actuator interface 64 as described above, the interface 64 likewise rotates clockwise which does not cause the spindle 54 to rotate but which does cause the actuator pin $\mathbf{464}_1$ to move from approximately TDC to approximately 90 degrees from BDC, which is adjacent to or in contact with the edge stop member 486A of the ring 480 as described above. In embodiments which include the actuator pin $\mathbf{464}_2$, the rotation just described locates the actuator pin $\mathbf{464}_2$ substantially across from the pin $\mathbf{464}_1$, or at about 90 degrees clockwise of BDC. Further clockwise rotation of the interfaces 38 and 64 forces the actuator pin $\mathbf{464}_1$ against the stop member 486A of the ring 480 which causes the ring 480 to rotate in the clockwise direction such that the sweep 680 is rotatably forced toward and eventually into the slot or channel 639 thereby trapping at least a portion of the sweep 680 therein, as depicted in FIGS. 10D and 10F to create a mechanical interference in the axial direction. The retention assembly, made up of the rotatable actuator 670, the channels 637, 639 and the actuator pin $\mathbf{464}_1$, is thus engaged simultaneously with extension of the deadbolt 58 from the latch plate 57, such that the key-side assembly 20 is secured to the lever-side assembly 40 simultaneously with locking of the deadbolt 58 to the door frame. As described above, rotation of the key 28 or of the lever 52 counterclockwise back to TDC does not cause the rotatable actuator 670 to rotate sufficiently to draw the sweep 680 out of the channel 639. Rather, simultaneous unlocking and disengagement is accomplished, as also described above, by rotating the key 28 or the lever 52 counterclockwise. In embodiments which do not include the actuator pin $\mathbf{464}_2$, the key 28 or lever 52 must be rotated approximately 360 degrees in order to draw the sweep 680 out of the channel 639. In embodiments which do include the actuator pin $\mathbf{464}_2$, the key 28 or lever 52 need only be rotated approximately 180 degrees in order to achieve the same result.

The embodiments illustrated in the attached figures have been described herein as operatively coupling the various embodiments of the key-side assembly 20 to the lever-side assembly 40 via a rotatable planar or flat key or tab 38B on the key-side assembly 20 inserted into a complementarily-configured rotatable slot 64B on the lever-side assembly 40. It will be understood that in some alternate embodiments the rotatable key or tab 38B may be on the lever-side assembly 40 and the complementarily-configured slot 64B may be on the key-side assembly 20.

In still other embodiments, the key or tab 38B of an actuator interface 38 may be replaced with a profiled key 38C that extends through the opening 32D and sufficiently farther so as to exhibit key configured elements, such as an arrangement of dimples, surface grooves, and/or a profiled key edge. The key 38C, and in particular the key configured elements, are to be inserted within a correspondingly-configured key cylinder 64C as a replacement of the slot 64B of an actuator interface 64. The profiled key 38C may be variously configured, e.g., from a relatively simple configuration to a relatively complicated configuration in the form of a combination of key configured features, and the correspondingly-configured key cylinder 64C may likewise be variously configured to match that of the profiled key 38C. In any case, the profiled key and correspondingly-configured key cylinder can be configured such that the profiled key is inserted into a keyway of the correspondingly-configured key cylinders as the coupling assembly pairs 32/42 as shown. It is contemplated that any of the above described coupling assembly pairs (132/142, 232/242, 332/342, 432/442, 532/542, 632/642) can be modified to further include such a key/key cylinder actuator interface 38C/64C for the slotted actuator interface 38/64, wherein the key 38C and cylinder 64C can be brought into contact with one another (i.e., as the doors 12, 14 are brought together as illustrated by example in FIG. 1). In one embodiment, the profiled key and the keyway of the correspondingly-configured key cylinder can be configured such that the key is releasable from the key cylinder regardless of whether the profiled key or the lever 52 is rotated to a position which causes the deadbolt 58 to extend out of the latch plate 57 (i.e., to lock the deadbolt 58) or is rotated to a position which causes the deadbolt 58 to retract within the deadbolt assembly 56. In this case, any of the retention assemblies described above can be provided along with the key/cylinder actuators 38C/64C. In an alternate embodiment, the profiled key 38C and the keyway 64D of the correspondingly-configured key cylinder 64C are configured such that when the profiled key 38C or the lever 52 is rotated is rotated in a direction which causes the deadbolt 58 to extend out of the latch plate 57 (i.e., to lock the deadbolt 58), the profiled key 38C can be captured, i.e., trapped and held, by and within the keyway 64D of the correspondingly-configured key cylinder 64C in a conventional manner to further secure the assemblies 20, 40 to one another under locked conditions of the deadbolt 58. Rotating the profiled key 38C or the lever 52 in the opposite direction so as to cause the deadbolt 58 to retract within the deadbolt assembly 56 will rotate the keyway 64D of the correspondingly-configured key cylinder 64C to a position which will allow release of the profiled key 38C therefrom as the assemblies 20, 40 are separated from one another. In any such embodiments, it will be understood that the profiled key 38C may by carried by the key-side assembly 20 and the correspondingly-configured cylinder 64C may be carried by the lever-side assembly 40 or vice versa. The key 38C as locked within the keyway 64D of the cylinder 64C in the manner of a conventional key/locking cylinder can thus comprise the components of a retention assembly, which retention components also create a mechanical interference in the axial direction.

Yet another example of a locking system for securing co-mounted doors together and to be utilized as part of a deadbolt connection between a door 12 and a door 14 is illustrated in FIGS. 11-17. A deadbolt assembly 710 is illustrated in perspective and as an exploded view in FIG. 11 along with the longitudinal cross-sections of FIGS. 12 and 13. Similar to embodiments described above, a key side assembly 720 is secured to a door 14 and a lever side assembly 740 is secured to a door 12, for example.

Figure 11:
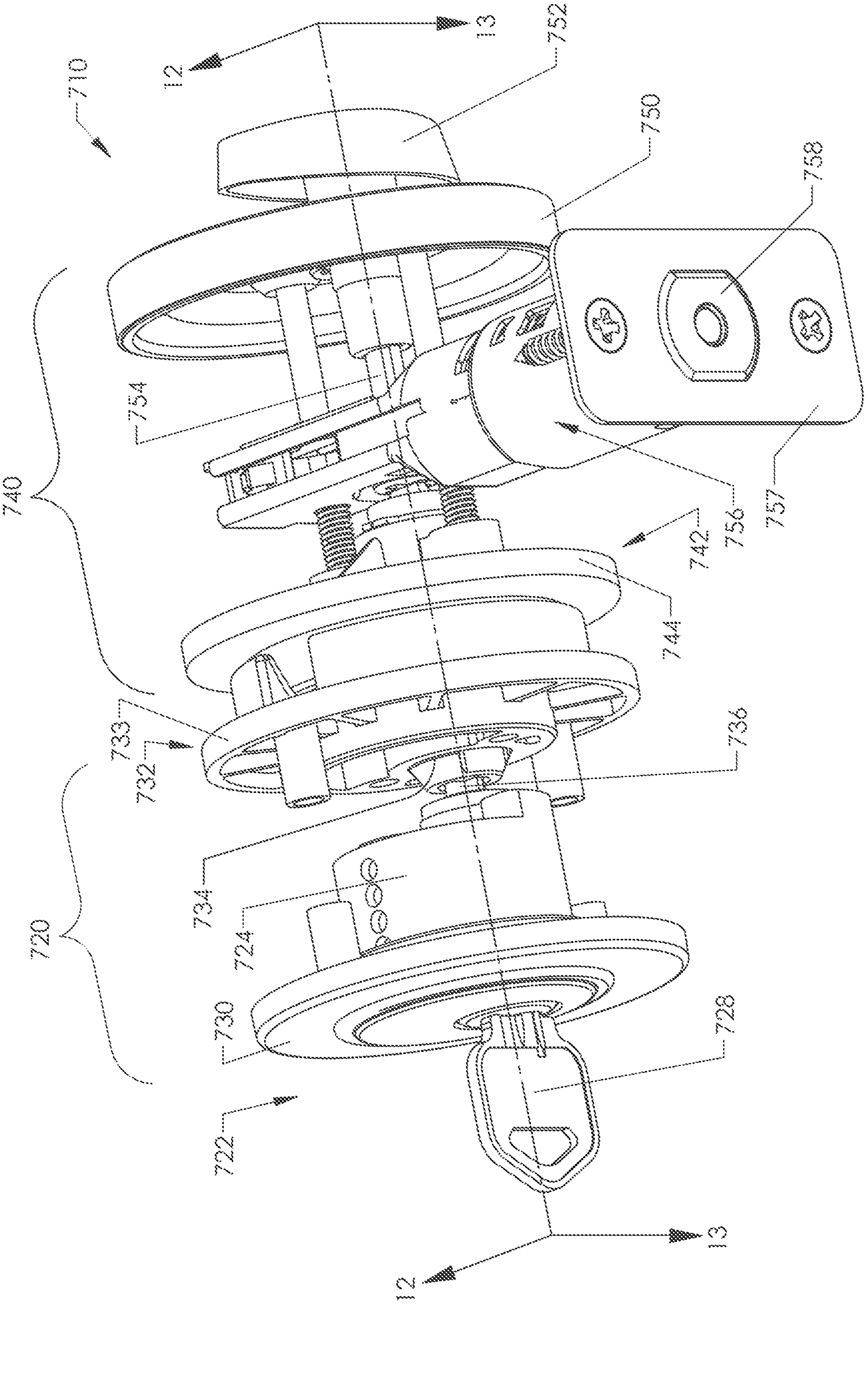
FIG. 11 is another perspective view of key side and lever side assemblies having yet another embodiment of a retention assembly for securing the key side and lever side assemblies together simultaneously with actuation of the deadbolt as viewed from the front of the key side assembly.
Figure 11A:
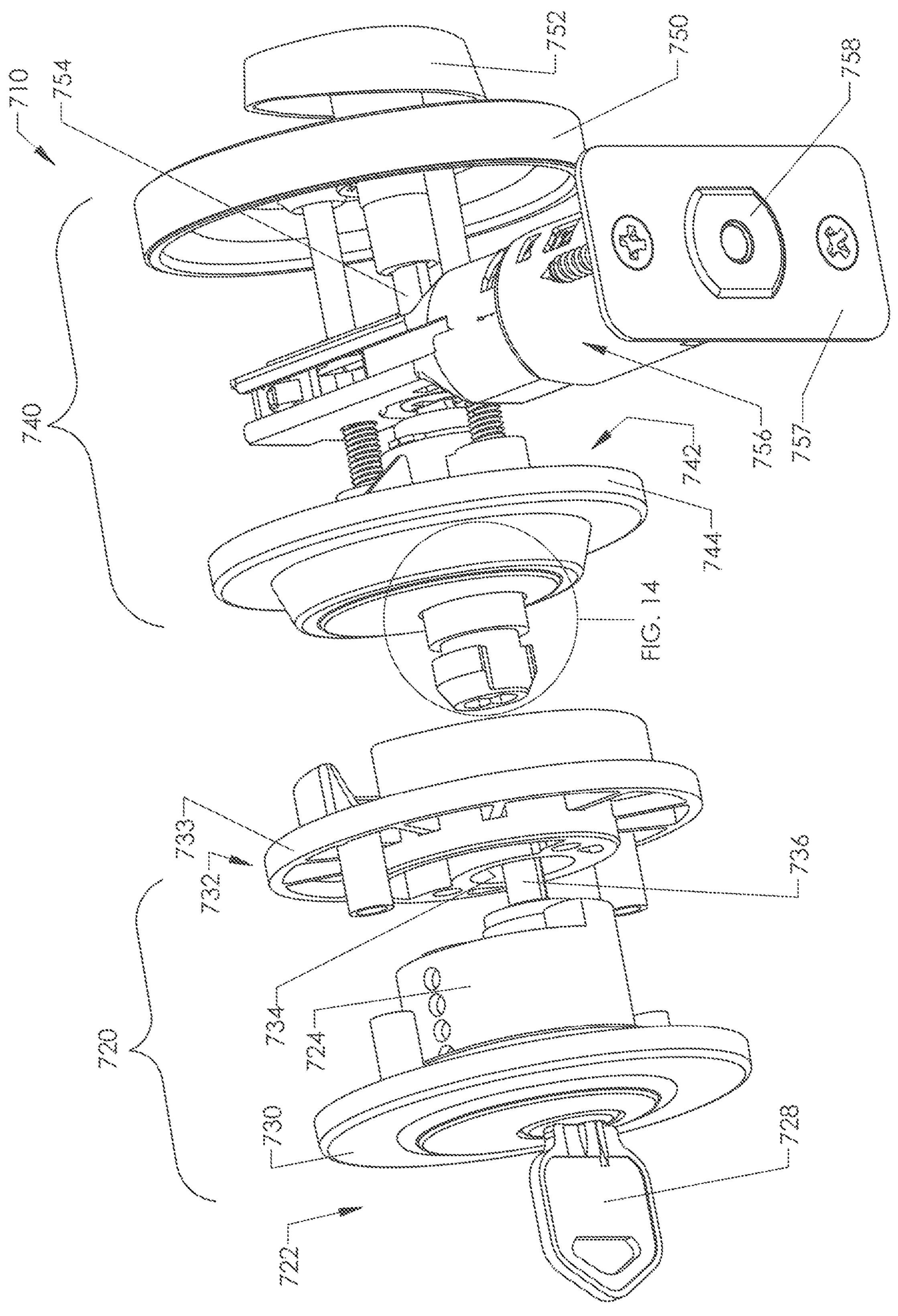
FIG. 11A is a view similar to FIG. 11 but with a separation of the key-side coupling assembly from the lever-side coupling assembly.
Figure 12:
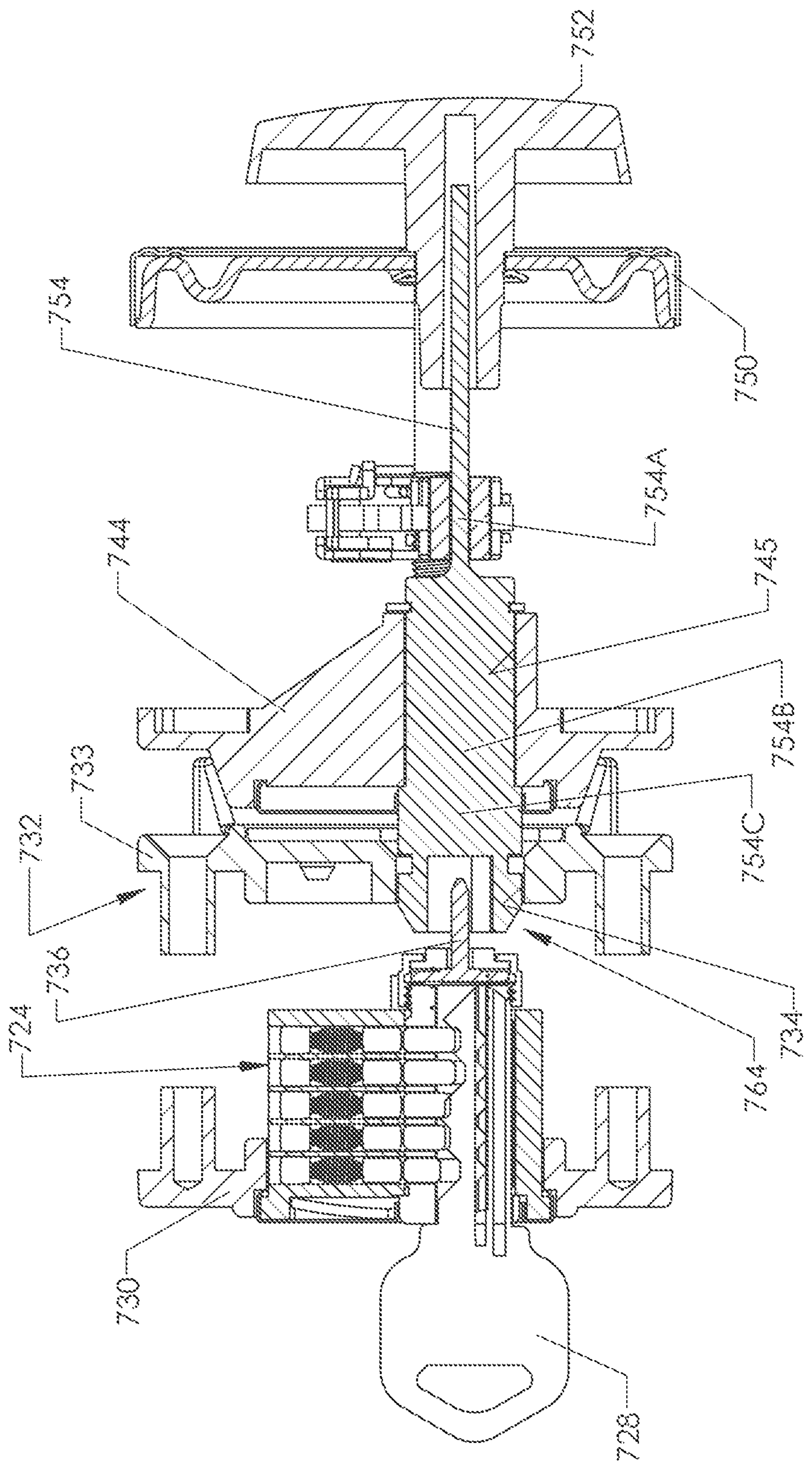
FIG. 12 is longitudinal cross section taken vertically through the key side and lever side assemblies of FIG. 11.
Figure 13:
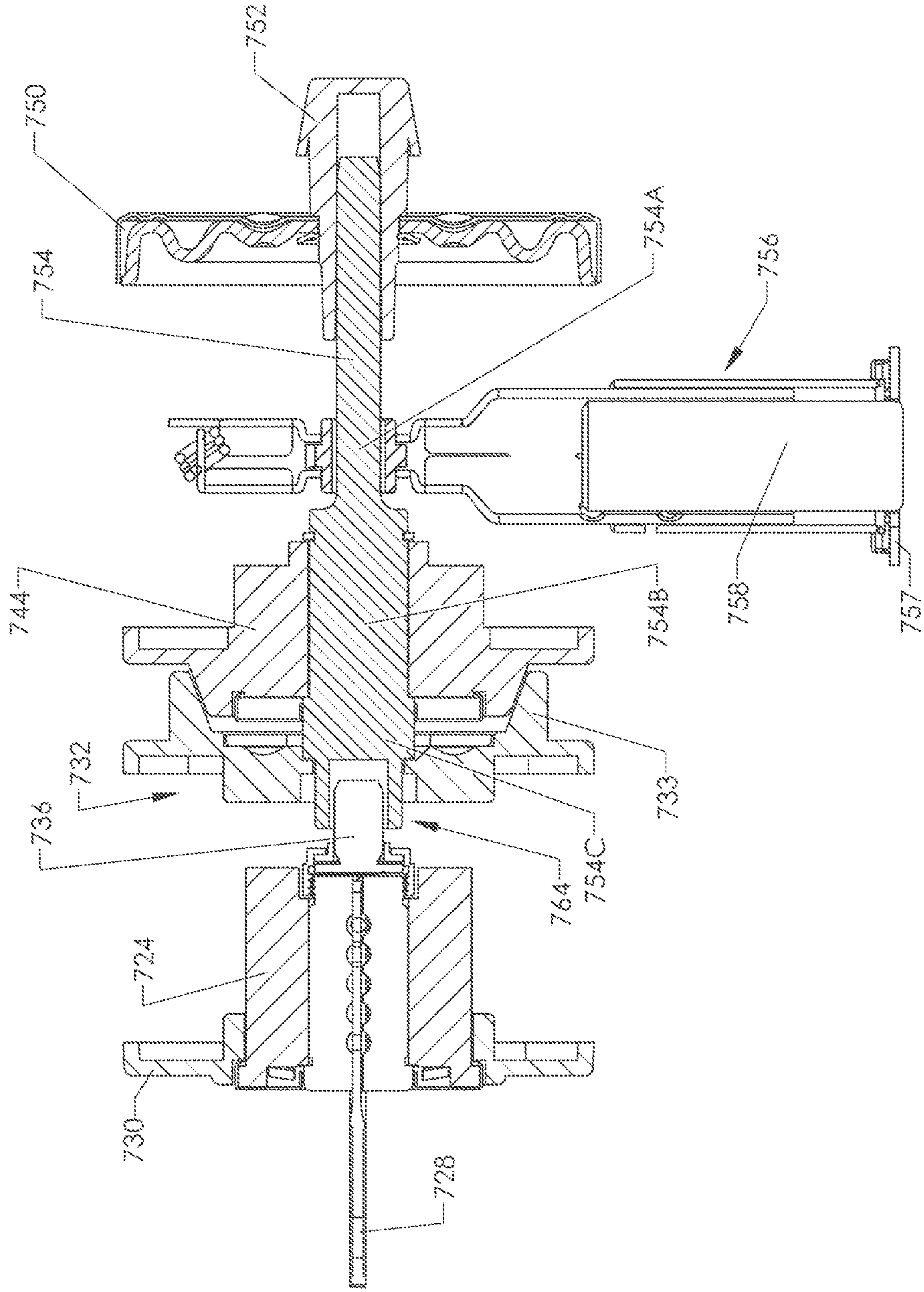
FIG. 13 is a longitudinal cross section taken horizontally through the key side and lever side assemblies of FIG. 11.

In this embodiment, a deadbolt assembly 756 as illustrated with the key side assembly 720 on one side (the left side as viewed in FIG. 11) and the lever side assembly 740 on the other side (the right side as viewed in FIG. 11). The deadbolt assembly 756 is set up for deadbolt movement to the right from a front view of the key side assembly 720. This is similar to the setup shown in FIG. 2 and FIG. 2A and described above in which the deadbolt 58 extends to the right from a front view of the key side assembly 20. It is understood that a similar view with the deadbolt extending to the left would illustrate an alternative door arrangement with door hinges on an opposite side of the door(s).

A conventional keyset 722 is provided to an exterior face of a door 14 and comprises a cover 730 and a chassis 724. The chassis 724 is provided to be inserted through a bore of the door 14. Within the chassis 724, conventional lock tumblers are provided that interact with a key 728. When the key is inserted, the key can turn a key side spindle 736. As above, typical keysets allow a ninety degree turn of the key in either direction from the TDC position (a top dead center position described above), which can be used to rotate the spindle 736 either to lock or unlock a deadbolt 758 described below from outside of the co-mounted doors. The arrangement preferably allows the key to return to TDC after the deadbolt 758 is moved for engagement or disengagement as further described below without moving the deadbolt 758 during the return operation.

On the inside face of the door 14, a key side actuator interface 732 is provided by a key side coupling component 733. The coupling component 733 is to be fixed with the chassis 724, as positioned on the other side of the door 14 than coupling component 733, and is thus also non-rotatable relative to the spindle 736. The chassis 724 and coupling component 733 can be fixed by screws also passing through the door as well known and the coupling component 733 provides a through-hole 734 in alignment with the spindle 736. The coupling component will be described in greater detail below so as to provide a first actuator interface, the key side actuator interface 732, on the interior side of the door 14 to engage with a second actuator interface on the exterior side of the lever side assembly 740 as follows.

The lever side assembly 740, as shown, comprises an inside chassis 750 that is to be fixed to an inside face of the door 12 and having a through-hole that accommodates a rotational knob or lever 752 that is rotationally connected with a lever side spindle 754. The spindle 754 preferably includes a flat portion 754A that passes through a similar opening of a deadbolt assembly 756 for converting rotary movement of the spindle 754 into back and forth movement of the deadbolt 758 so as to selectively extend from a deadbolt latch plate 757 as well known.

The spindle 754 preferably also includes a cylindrical portion 754B that passes through a through-hole 745 of a coupling chassis 744 that is to be fixed with the inside chassis 750 and thus the door 12, such as by screws also passing through the door 12 as known. The through-hole 745 of the coupling chassis 744 is preferably aligned with the spindle 754 of the lever side assembly 740 and the spindle 736 of the key side assembly 720. Preferably, the through-hole 745 and outer surface of the spindle portion 754B are shaped similarly for rotational support of the spindle 754, but they may be of dissimilar shape so long as the spindle 754 can rotate.

A further slightly enlarged actuator portion 754C of the spindle preferably extends from the portion 754B. The enlargement provides for a step surface to contact a surface surrounding the through-hole 745 of the coupling chassis 744 on its external side to act as a thrust bearing for the spindle 754. Moreover, the actuator portion 754C provides a second actuator interface 764 that is configured for interaction with the first actuator interface 732.

Figure 14:
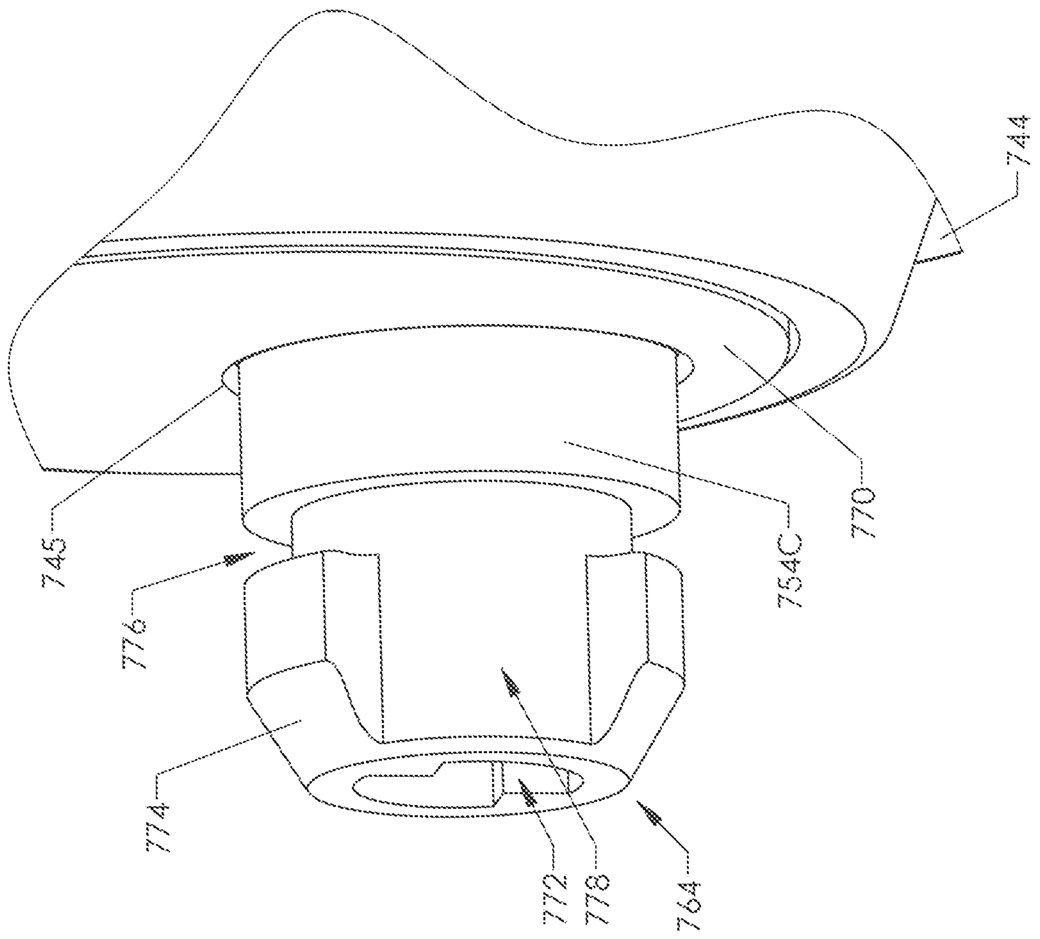
FIG. 14 is an enlarged partial perspective view of an actuator portion of a lever side spindle used to create an actuator interface of a retention assembly.

Turning now to FIG. 14, the coupling chassis 744 is shown with the actuator portion 754C extending from the through-hole 745 to create the actuator interface 764. A decorative cover 770 is shown in FIG. 14 on the external face of the coupling chassis 744 to provide an external surface surrounding the actuator interface 764. At the end of the actuator portion 754C, an axial opening 772 provides for insertion and controlled engagement of a distal end of the key side spindle 736, which as above is preferably flat. The shape of the axial opening 772 permits the above described key and spindle movement after engaging or disengaging the deadbolt 758 back to TDC.

Figure 16:
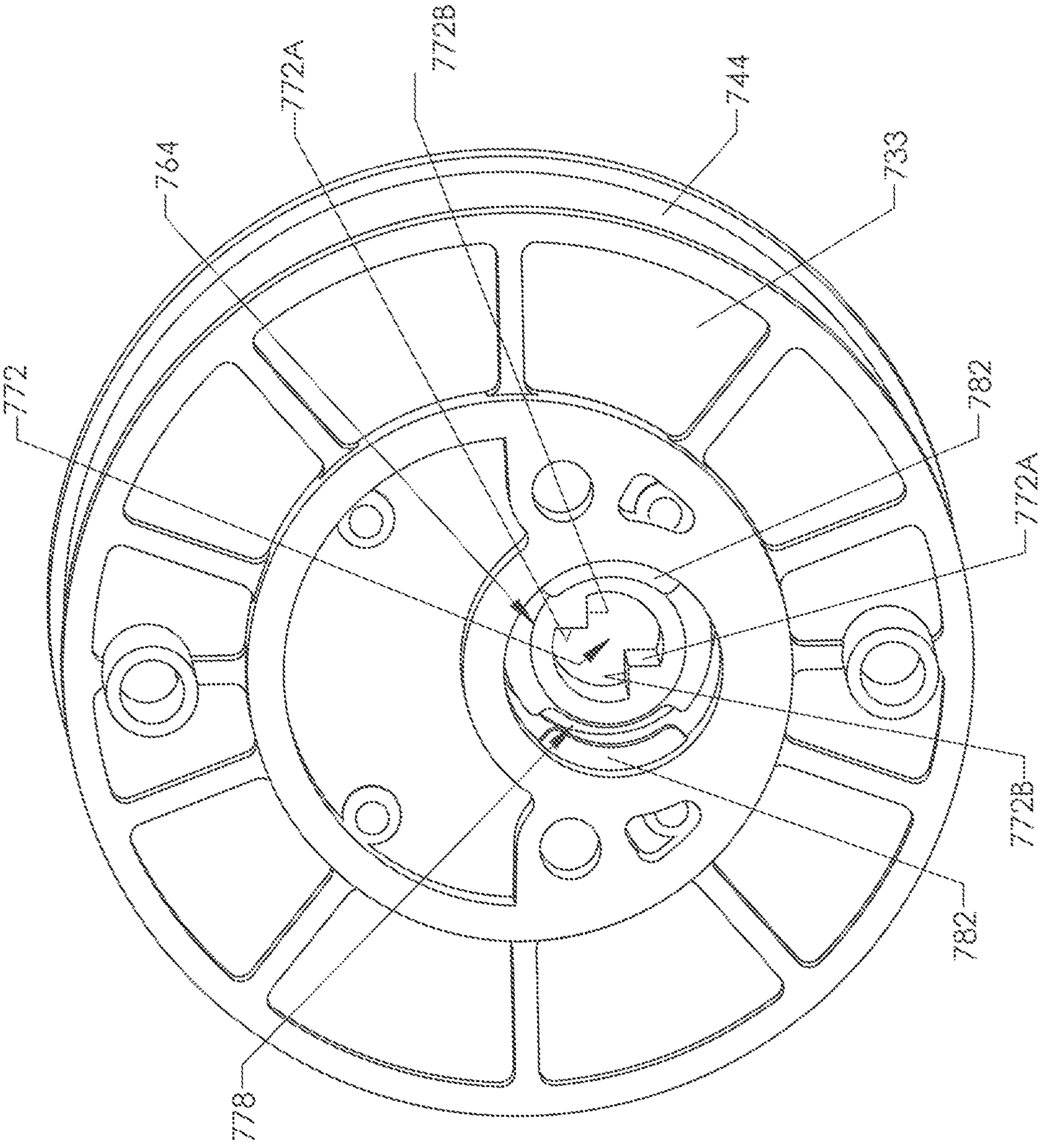
FIG. 16 is an enlarged partial perspective view of the two actuator interfaces relatively approaching one another axially for eventually assuming an axial interlocking position.

From the key side perspective and from the position of the actuator portion 754C shown in FIG. 16, for example, the flat distal end of the key side spindle 736 at TDC would be engaged with the horizontal portions 772B that define a portion of the shape of the opening 772. The configuration of the opening 772, as illustrated, corresponds to the position it would assume after the lever side spindle 754 has been rotated counter-clockwise (as viewed in FIG. 16) by the key to retract the deadbolt 758 and the key returned to TDC without further movement of the deadbolt 758. The flat distal end of the key side spindle 736 would have been in engagement with the horizontal portions 772B to cause the counter-clockwise rotation of the spindle 754. Clockwise movement from the position of FIG. 16 (as viewed in FIG. 16) would rotate the spindle 754 by 90 degrees by engagement of the key side spindle 736 with the vertical portions 772A and then key would be returnable back to TDC without changing the position of the deadbolt 758.

As also shown in FIG. 14, the distal end of the actuator portion 754C is preferably provided with a frustoconical portion for alignment during engagement with the coupling component 733 of the key side assembly 720 described below. According to the illustrated embodiment, a circumferential groove 776 is provided at a distance spaced from the distal end of the actuator portion 754C. Also, a pair of axially extending slots 778 (both shown in diametrically opposed positions in FIG. 17) provide axial access to the groove 776. As will be better understood below, the groove 776 need not be entirely circumferential, but instead could only partially extend in the circumferential direction around the spindle actuator portion 754C.

Figure 15:
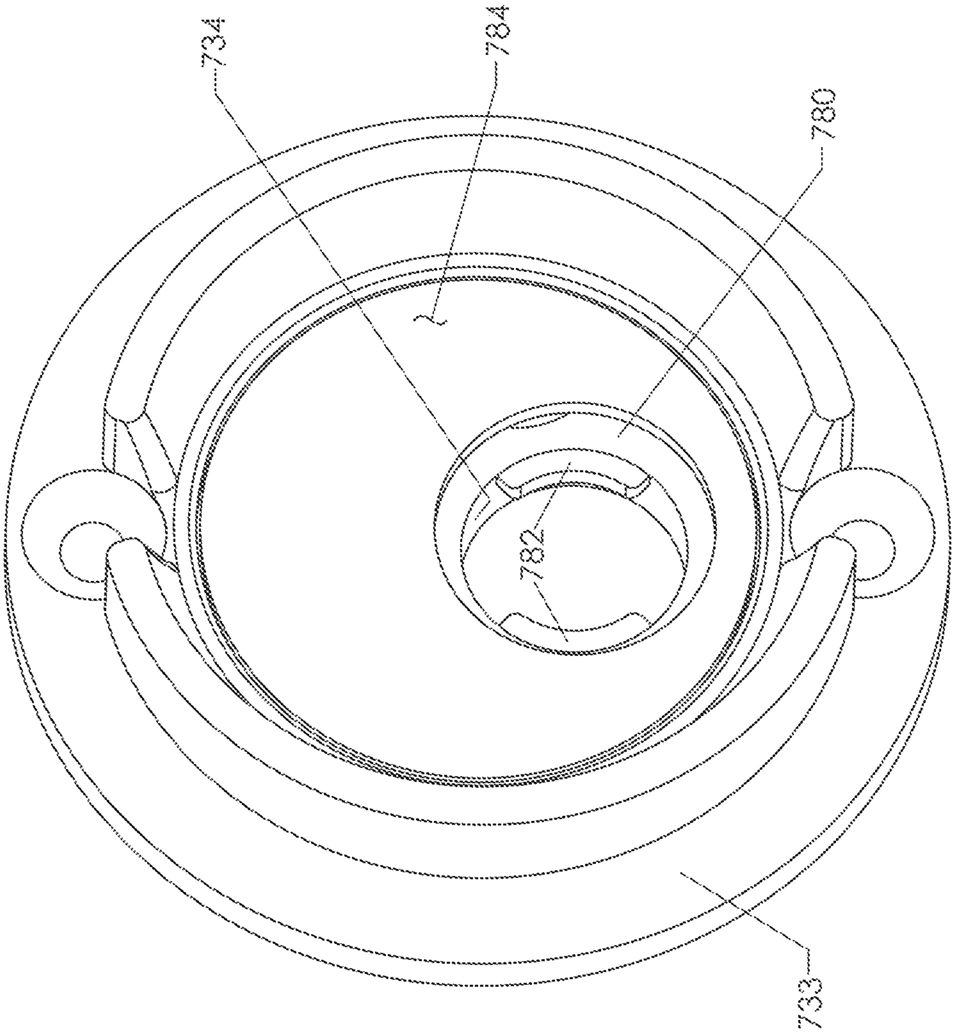
FIG. 15 is an enlarged partial perspective view of a coupling component of the key side assembly that includes features to create another actuator interface of the retention assembly.

FIG. 15 illustrates a preferred design for an engagement side of the coupling component 733 of the key side assembly 720. The through-hole 734 provides axial access for the actuator portion 754C of spindle 754 to pass through the coupling component 733 for receiving the distal end of the key side spindle 736, as described above. The coupling component preferably comprises a complimentary frustoconical surface portion 780 surrounding the through-hole 734 for alignment of the coupling component 733 and the actuator portion 754C when the door 14 and door 12 are moved toward one another and ultimately adjacent one another to be potentially locked together by the single further action of actuating the deadbolt 758.

Extending radially inward from the through-hole 734, in the illustrated embodiment, are a pair of tabs 782 provided at diametrically opposed positions. In the case of when the door 14 and door 12 are moved toward one another to the adjacent positions with the deadbolt unlocked, the tabs 782 preferably align with the slots 778 of the actuator portion 754C (this orientation of the assembly is illustrated in the cross sections of FIGS. 12 and 13). When the doors together assume the adjacent position (meaning the actuator portion 754C is fully inserted through the coupling component 733, the tabs will have preferably axially reached the groove 776.

The groove 776 will allow the actuator portion 754C and thus the spindle 754 to rotate either clockwise or counter-clockwise while the tabs 782 remain in the groove 776. Once the tabs are relatively axially positioned in the groove 776 and the spindle is rotated to position the tabs 782 at least slightly offset from the slots 778 (in this example as the slots 778 move rotationally relative to the stationary tabs 782), an interference will be provided by the groove 776 preventing the coupling component 733 from moving axially. This results in the door 14 being interlocked with the door 12.

The coupling component 733 may further include a cover layer 784 as shown in FIG. 15 to be viewable on the inside of the door 14. This cover layer 784 may comprise decorative material and/or a compressible material. A compressible material could compress slightly during interlocking, for example.

Figure 17:
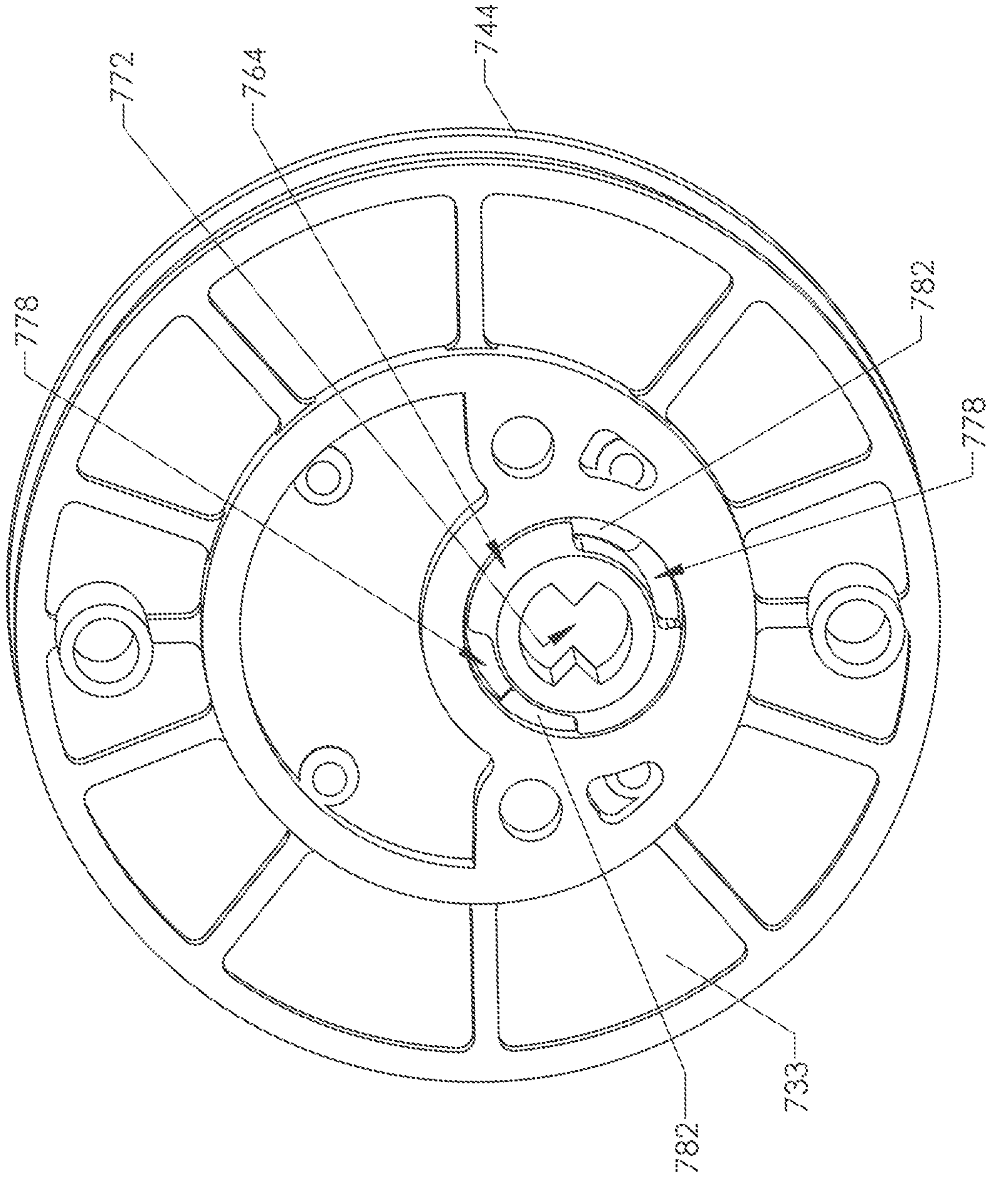
FIG. 17 is an enlarged partial perspective view of the two actuator interfaces axially aligned and one actuator interface rotated relative to the other for interlocking together.

FIG. 16 illustrates the fixed coupling component 733 of the door 14 as it is approached by the rotatable distal actuator portion 754C with the actuator portion 754C positioned to insert through the through-hole 734. In this illustration, the tabs 782 are rotationally aligned with the slots 778 as the slots 778 are rotationally positioned by the spindle 754 relative to the tabs 782 fixed in position. FIG. 17 illustrates the tabs 782 axially positioned within the groove 776 and with the spindle 754 rotated clockwise (as viewed in FIG. 17) by just a few degrees as a result of partial extension of the deadbolt 758, but enough such that the tabs 782 are prevented from axial movement by them being positioned rotationally offset from the axial slots 778. Preferably, the tabs 782 will be relatively fully offset from the axial slots 778 when the deadbolt 758 is extended to its locked position with both actions occurring under the control of the spindle 754.

It is understood that any number of tabs 782 may be provided with at least one for creating an interference position relative to at least one axial access slot 778 to at least a portion of a circumferential groove 776. The tabs 782 and slots 778 are preferably aligned to allow axial movement to one another when the deadbolt is unlocked so that the doors can be positioned adjacent to one another for interlocking if desired. A pair of tabs and slots can be diametrically opposed as illustrated or otherwise.

It is noted that the surfaces of the tabs 782 that engage with the surfaces defining the groove 776 just adjacent the slots 778 can be chamfered or sloped so as to create a camming action between the components during rotation of the spindle 754 for pulling the door 14 toward the door slightly for a more secure interlock. Such chamfered or sloped surfaces also allow for easier interlocking when the doors may be slightly still offset from one another axially and can act to allow rotation and pulling together. Such movement can be also be accommodated by a compressible material for the cover layer 784 described above. Any number of other engaging surfaces of the coupling component 733 and the actuator portion 754C may comprise singly or complimentary surfaces shaped to assist it alignment or to facilitate easier or better interlocking.

Other similar interlocking assemblies that comprise a first actuator interface 732 and a second actuator interface 764 are contemplated. Tabs could extend radially from a component of or part of the actuator portion 754C either radially inward or outward to engage with a surface behind a wall portion(s) provided as part of the coupling component 733. Such a wall portion could be provided by the back surface of the coupling component 733 or by other connected structure or independently provided stationary structure. Or, tabs extending radially from the actuator portion 754C could move axially through similarly arranged axial slots provided along surfaces of the through-hole 734 to engage upon rotation with such stationary structure or a circumferential groove, or portion thereof also provided along a surface of the through-hole 734. These embodiments could operate as a reversal of the parts with similar relative movement to one another. Another example would be modifying the actuator portion 754C to include one or more flat axial zones leading to a groove so that the actuator portion 754C could be inserted through a similar shaped through-hole to extend partially beyond a wall of the coupling component 733 then rotated so that the wall portion would assume an interference position within the groove similar to the tabs 782. The actuator portion 754C can be any shape other than circular in transverse cross section that can be inserted through a complimentary shaped through-hole 734 after which rotation as permitted by a groove or other spacing to that radial portions thereof can create a mechanical interference between the components. Other interlocking assemblies are contemplated that provide a first actuator interface 732 and a second actuator interface that allow for axially positioning the them to one another followed by an interference created by rotation of the spindle 754 for the purpose of activating the deadbolt 758 and interlocking the doors together.

Within the above disclosure, mention is made to a clutch device 62 that can be incorporated at certain locations between rotatable components. As above, the purpose of such a clutch device is to provide a range of rotary motion whereby one component can move relative to the other over the range of rotary motion under controlled circumstances. Specifically, when a key-side assembly is coupled with a lever-side assembly, it is desirable to allow a key to extend the deadbolt 58 from a TDC position of the key by rotary motion in one rotational direction, such as clockwise from the key side perspective. After extending the deadbolt 58, the key can be preferably returned to TDC without affecting the position of the deadbolt 58. Likewise from the same TDC position, the key is preferably able to cause retraction of the deadbolt 58 from the extended position by turning the key counter-clockwise after which the key can be returned to the TDC position without affecting the position of the deadbolt 58. This controlled range of rotary motion is allowed by the clutch device. Examples of such devices to allow rotary motion as above are described below with reference to FIGS. 18 and 19.

Figure 18A:
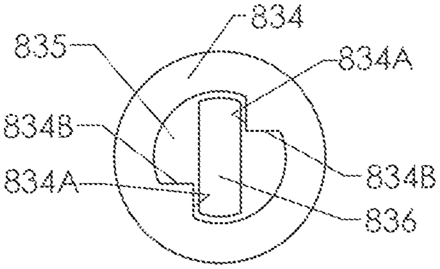
FIG. 18A is schematic illustration of a clutch device that can be incorporated at various locations between two rotatable components to provide a range of rotary motion whereby one component can move relative to the other over the range of rotary motion under controlled circumstances.
Figure 18B:
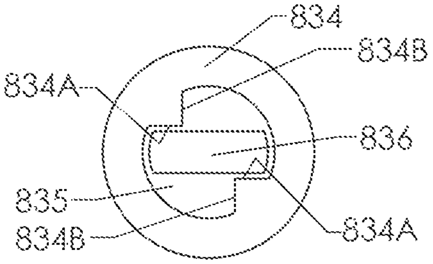
FIG. 18B is similar to FIG. 18A but with a spindle component causing rotation of another rotary component by 90 degrees.

FIG. 18A is schematic illustration of a clutch device that can be incorporated at various locations between two rotatable components to provide a range of rotary motion whereby one component can move relative to the other over the range of rotary motion under controlled circumstances. A spindle 836 as a first rotary component is shown positioned within an opening 835 of a second rotary component 834. Rotation of the spindle 836 engages the edges thereof with portions 834A of the second rotary component 834 to rotate the second rotary component 834 along with the spindle 836 in the clockwise direction to the position in FIG. 18B. The spindle can then return to the vertical position thereof with its edges adjacent to portion 834B. At this point, the key would be back at TDC and could be removed without the deadbolt being retracted. Looking again at FIG. 18A, if the spindle 836 was rotated counter-clockwise, no rotary motion of the second component 834 would result for the first 90 degrees until the spindle edges engage with portions 834B. The key could return to the TDC positon from the 90 degree counter-clockwise position, for potential removal of the key, such as may occur following the retraction of the deadbolt 58. Examples of the use of this type of clutch device are shown in FIGS. 16 and 17 described above.

Figure 19A:
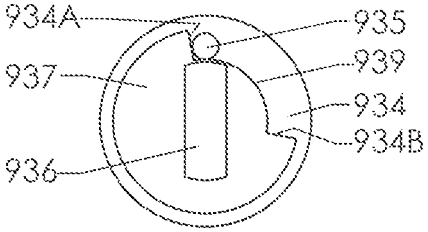
FIG. 19A is another schematic embodiment of a technique to allow a controlled rotary range of motion.

FIGS. 19A and B illustrate a similar concept for providing a range of rotary motion. A spindle 936 can include a disk 937 fixed at an end thereof having a recessed arc 939 portion equal to the range of motion desired. A second rotary component can comprise a disk 934 (of any shape) that is rotationally supported and having a pin 935 extending axially and fit within the recessed arc 939. An edge 934A defining the recessed arc can move the second component 934 clockwise to the position of FIG. 19B, while allowing each of the return motions and other motions described above with respect to FIGS. 18A and B. The recessed arc 939 in this case accommodates a 90 degree range of motion potential for certain rotary movements as described above. Such a clutch device could be incorporated within the locations described above and as shown in FIGS. 7B, 8B, 9B, and 10B.

Figure 19B:
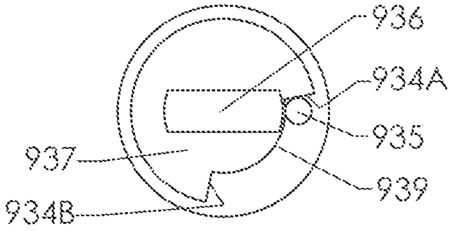
FIG. 19B is similar to FIG. 19A with a spindle and disk portion rotated by 90 degrees and that causes a similar rotation of a pin of another rotatable component.
Figure 19C:
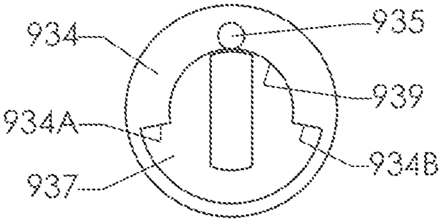
FIG. 19C is a similar view as FIG. 19A but illustrating a greater rotary range of motion using a similar technique.
Figure 19D:
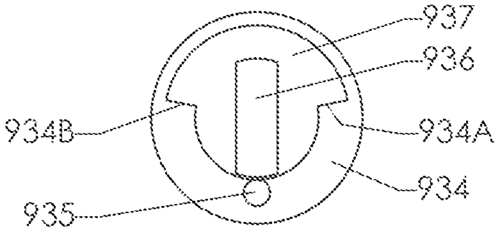
FIG. 19D is a similar view as FIG. 19C with a greater rotary range of motion using a similar technique.

FIGS. 19C and 19D illustrate a similar concept as that in FIGS. 19A and 19B, but with the recessed arc 939 accommodating a 180 degree range of motion potential for certain rotary movements as described above. Such a clutch device could be incorporated within the locations described above and as shown in FIGS. 7B, 8B, 9B, and 10B.

Figure 20A:
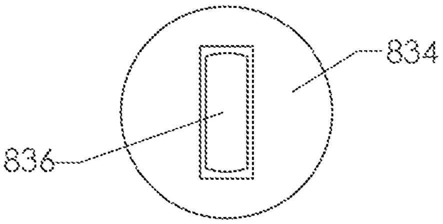
FIG. 20A shows a version similar to FIG. 18A but without a range of motion.
Figure 20B:
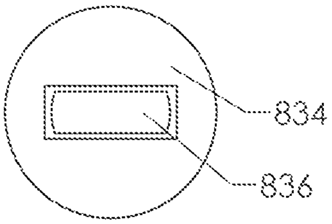
FIG. 20B shows rotation of the components of FIG. 20A.
Figure 21A:
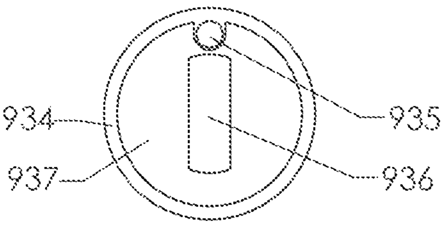
FIG. 21A shows a version similar to FIG. 19A but without a range of motion.
Figure 21B:
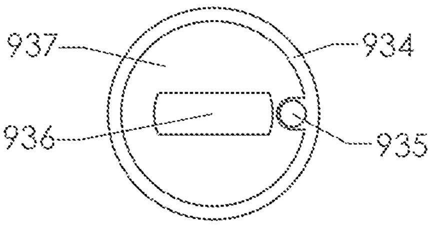
FIG. 21B shows rotation of the components of FIG. 21A.

FIGS. 20A and 20B show the concepts of FIGS. 18A and B without any range of rotary motion. The spindle 836 would simply fit in a similarly shaped opening 835 for always connected rotary motion of the spindle and the second component 834 together. FIGS. 21A and B similarly modify the range of motion connection of FIGS. 19A and B to remove the range of motion between the components 936 and 935.

Figure 22:
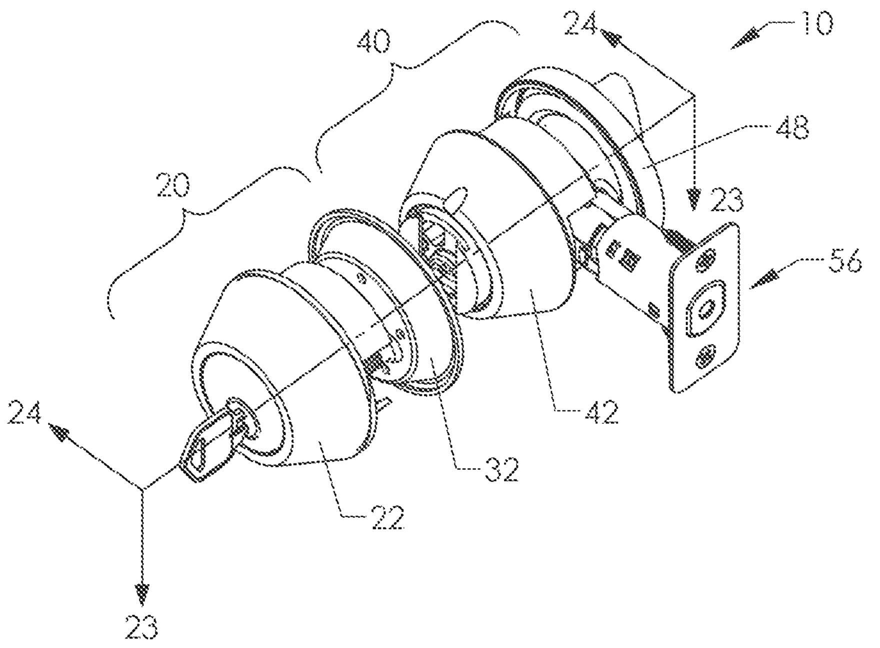
FIG. 22 is a perspective view of deadbolt assembly of the present invention illustrating locations of rotary connection that can incorporate a clutch device for allowing a desired controlled range of rotary motion.
Figure 23:
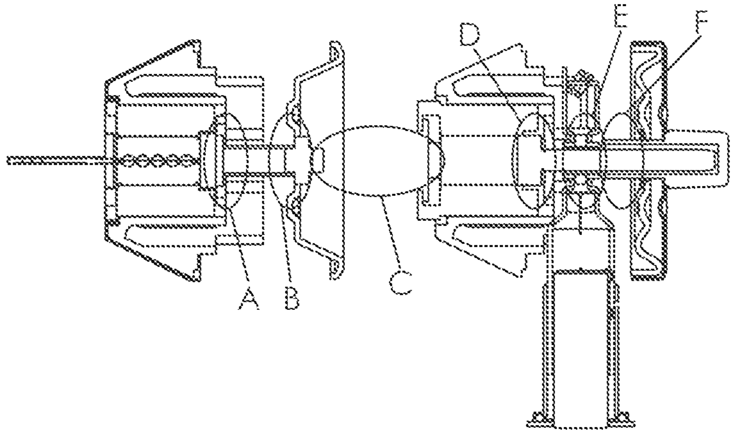
FIG. 23 is a horizontal cross-sectional view of FIG. 22 showing locations of rotary connection suitable for providing a controlled range of rotary motion.
Figure 24:
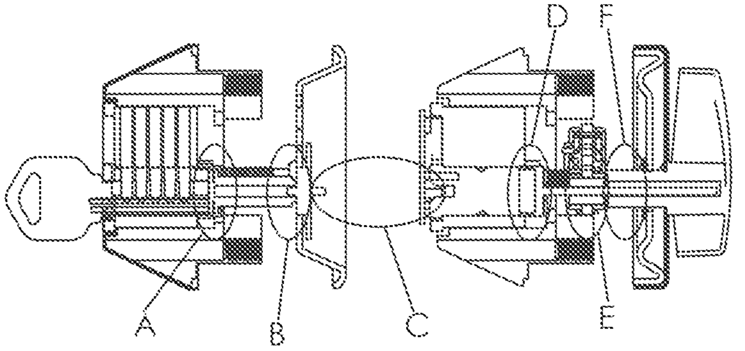
FIG. 24 is a vertical cross-sectional view of FIG. 22 showing locations of rotary connection suitable for providing a controlled range of rotary motion.
Figure 25:
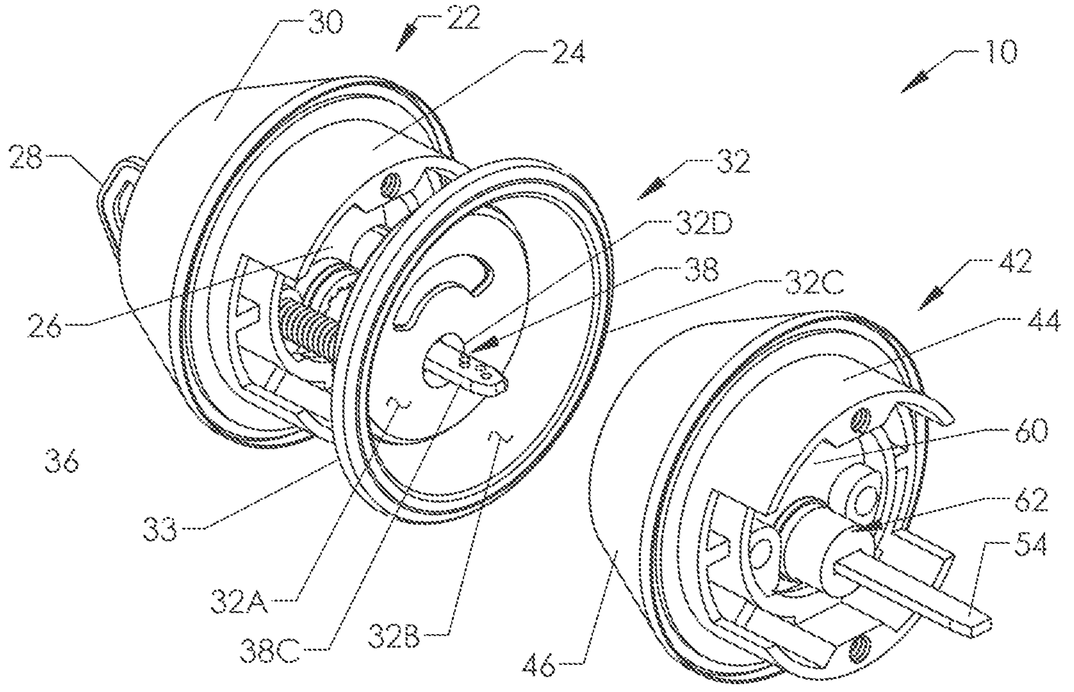
FIG. 25 is a perspective, partial assembly view of the deadbolt assembly similar to FIG. 3A as viewed from the rear of the lever-side coupling assembly and that shows an alternative actuator interface key.
Figure 26:
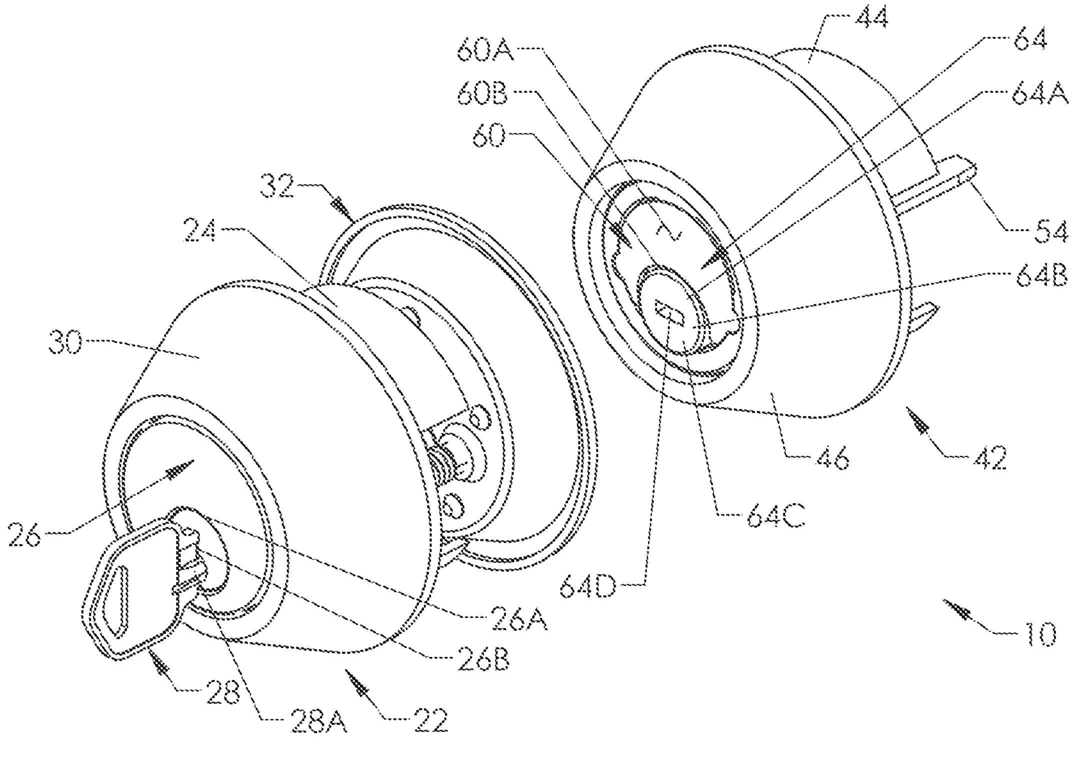
FIG. 26 is another perspective, partial assembly view of the deadbolt assembly of FIG. 25 as viewed from the keyset that shows an alternative actuator interface key lock cylinder.

It is further contemplated that such a range of motion can be controllable provided between any two rotary component within the entire deadbolt assembly or at any interface of one rotary component with another. FIGS. 22, 23, and 24 show such locations and interfaces within the system of the present invention.

FIG. 22 shows the deadbolt assembly 10 having the key-side assembly 20 and the lever-side assembly 40. The keyset 22 and first coupling assembly 32 are provided to a first door and the second coupling assembly 42 and leverset 48 are provided to a second door. A deadbolt assembly 56 is shown as part of the combination second coupling assembly 42 and leverset 48. As above, interaction between the first and second coupling assemblies 32 and 42 by a retention assembly can create a mechanical interference in the axial direction of the rotary components of the deadbolt assembly 10.

As above, it is contemplated that the clutch device or any device that provides a range of motion between any first and second rotary components that interface with one another can be provided for selective rotary motion of one component relative to the other in certain situations as described above. Ovals A, B, C, D, E, and F are included in the illustrations of FIGS. 23 and 24, which FIGS. 23 and 24 are cross-sections taken along the lines indicated in FIG. 22. Each oval A, B, C, D, E, and F shows a location where it is specifically contemplated to provide structure as in FIGS. 18 and 19 for allowing a controlled range of motion between rotary interfaced components under certain conditions.

Specifically at oval A, a potential location is the interface between the key cylinder within the keyset 22 and an end of spindle 36. At oval B, another location is the interface of the spindle 36 and the rear side of the actuator interface 38. Oval C shows a location of another suitable interface between the actuator interface 38 and the actuator interface 64. Another suitable location is shown at oval D at the interface of a rear end of the interface 64 and the spindle 54. Oval E indicates that such a range of motion provision could be provided at the interface of the spindle that extends toward the actuator interface 64 and the deadbolt assembly 56. Such an arrangement could require different spindles provided either side of the deadbolt assembly. Also at Oval E, a range of motion can be provided at the interface of a spindle as it extends through the deadbolt assembly 58. Also, at Oval E, a further interface location can be provided between the other side of the deadbolt assembly 58 and the leverset spindle 54. At oval F, another location can be at the interface between the spindle 54 and the lever 52 of the leverset. Arrangements such as shown in FIGS. 18 and 19 can be incorporated in any of these locations to provide a desired degree of rotary motion between any of these interfaced components for certain rotary motions as discussed above. Preferably, such freedom of rotary motion is provided to accommodate key movements described above so that a key can be returned to a TDC position after extending or retracting a deadbolt 58 so that the key can be removed from the keyset 22.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

What is claimed is:

1. A deadbolt assembly for securing co-mounted doors together and activating at least one deadbolt, the assembly comprising:

a first-side assembly to be mounted to a first door of the co-mounted doors, the first-side assembly including a first coupling assembly to be mounted to a side of the first door facing a second door of the co-mounted doors, the first coupling assembly including a first rotatable component that is rotatable about an axis of rotation and a first retention component;

a second-side assembly to be mounted to the second door including a second coupling assembly to be mounted to the second door facing the first coupling assembly so as to interact with one another upon bringing the first and second coupling assemblies toward and proximate to one another, the second coupling assembly including a second rotatable component that is rotatable about the axis of rotation and a second retention component;

at least one of the first-side assembly and the second-side assembly further including the deadbolt that is operatively connected with at least one of the first and second rotatable components such that rotation of the first or second rotatable component can extend and retract a deadbolt, wherein the first and second rotatable components are operatively connectable with one another and the first and second retention components create an interference in an axial direction of the axis of rotation of the first and second rotatable components upon bringing the first and second coupling assemblies proximate to one another along with rotation of at least one of the first and second rotatable components so as to restrict movement of the first and second coupling assemblies away from one another while the interference is created.

2. The deadbolt assembly of claim 1, wherein rotation of at least one of the first and second rotatable components causes at least one of a rotation of at least one of the first and second retention components, an axial movement of at least one of the first and second retention components, and a radial movement of at least one of the first and second retention components.

3. The deadbolt assembly of claim 2, wherein movement of at least one of the first and second retention components causes an engagement with the other of the first and second retention components to create the interference in the axial direction.

4. The deadbolt assembly of claim 1, wherein a first actuator interface is provided at an end of the first rotatable component and a second actuator interface is provided at an end of the second rotatable component, and the first and second interfaces are positioned to each other so that they will engage with one another in a manner to translate rotary motion between the first and second rotatable components.

5. The deadbolt assembly of claim 4, wherein the first-side assembly comprises an entry control device to be located on the outside of the first door that is operatively connected with the first rotatable component.

6. The deadbolt assembly of claim 5, further comprising a clutch device operatively located between a key cylinder and the first actuator interface that allows a range of rotary motion under predetermined circumstances during which the key cylinder rotates relative to the first interface actuator.

7. The deadbolt assembly of claim 4, wherein at least one of the first and second retention components comprises a rotatable retention component that is operatively connected with both the first and second rotatable components so that the rotatable retention component can be driven from either of the first and second rotatable components, and wherein the other of the first and second retention components comprises a feature fixed in position relative to a respective one of the first and second coupling assemblies of the other of the first and second retention components to be engaged by rotation of the rotatable retention component to create the interference in the axial direction.

8. The deadbolt assembly of claim 7, wherein the rotatable retention component comprises a retention arm or tab that extends radially to swing as the rotatable retention component is rotated to engage with the fixed feature of the other retention component.

9. The deadbolt assembly of claim 8, wherein the fixed feature comprises at least one wall portion connected with the respective other coupling assembly for defining an edge, and the retention tab can be rotated from a position beside the edge and to a position behind the wall portion inside of the edge to create the interference.

10. The deadbolt assembly of claim 7, wherein the rotatable retention component includes a retention tab that includes plural portions that extend radially to swing as the rotatable retention component is rotated to engage with the fixed feature of the other retention component.

11. The deadbolt assembly of claim 10, wherein plural fixed features are provided as plural wall portions connected with the respective other coupling assembly for defining plural edges that are positioned so that the plural portions of the tab can each be rotated from a position beside an edge of one wall portion to a position behind one wall portion to create the interference.

12. The deadbolt assembly of claim 4, wherein at least one of the first and second retention components comprises a rotatable retention component that is operatively connected with both the first and second rotatable components so that the rotatable retention component can be driven from either of the first and second rotatable components, and wherein the rotatable retention component includes a radially varying portion to rotate therewith that is in engagement with a radially sliding element of one of the first and second coupling assemblies to move the sliding element radially by rotation of the radially varying portion to a position of interference with a structural feature of the other of the first and second coupling assemblies to provide an axial interference of the first and second retention components.

13. The deadbolt assembly of claim 12, wherein the radially varying portion is operatively supported to the same coupling assembly as the structural feature and the radially sliding element is supported to the other coupling assembly.

14. The deadbolt assembly of claim 12, wherein the radially varying portion is operatively supported to the same coupling assembly as the sliding element and the structural feature is supported to the other coupling assembly.

15. The deadbolt assembly of claim 12, wherein the rotatable retention component includes plural radially varying elements and plural sliding elements so that rotation of the rotatable retention component moves plural pins at the same time to provide an axial interference of the first and second retention components.

16. The deadbolt assembly of claim 4, wherein one actuator interface of the first and second actuator interfaces includes a pin offset from the axis of rotation thereof and the other actuator interface of the first and second actuator interfaces cooperates with the one actuator interface for supporting a radially extending component rotatable relative to the other actuator interface that includes a portion operatively to be movable along with the pin upon rotation of the one actuator interface for rotating the radially extending component to create an axial interference of the first and second retention components.

17. The deadbolt assembly of claim 16, wherein the pin is positioned relative to the radially extending component so that the pin engages with an edge of the radially extending component after a predetermined angle of rotation of the pin relative to the radially extending component.

18. The deadbolt assembly of claim 16, wherein the pin rotates the radially extending component into a position behind a structural feature of one of the first and second coupling assemblies to provide the axial interference.

19. The deadbolt assembly of claim 18, wherein the pin rotates the radially extending component into a position within a slot of one of the first and second coupling assemblies.

20. The deadbolt assembly of claim 16, wherein the radially extending component when rotated causes a rotation of an axially extending component having a tab that when rotated can be positioned behind a structural element of a respective one of the first and second coupling assemblies provided about the one actuator interface.

21. The deadbolt assembly of claim 16, wherein the radially extending component includes an axially extending element radially offset from the other actuator interface that when rotated can be moved within a shaped slot of the respective one of the first and second coupling assemblies provided about the other actuator interface from a wide portion of the shaped slot providing a non-interference position to a narrow portion of the shaped slope providing an interference position.

22. The deadbolt assembly of claim 4, wherein one retention component of the first and second retention components comprises an actuator portion of one of the first and second rotatable components providing at least a partially circumferentially extending groove and an axial slot from an end of the actuator portion to the groove that can be aligned with a radially extending tab of the other retention component of the first and second retention components that is fixed in position relative to one of the first and second coupling assemblies, so that when in alignment, the tab can be axially moved along the axial slot to a position within the groove and thereafter rotated within the groove so that at least a portion of the tab can be positioned in an axial interference position.

23. The deadbolt assembly of claim 22, wherein the actuator portion is provided at one actuator interface of the first and second actuator interfaces.

24. The deadbolt assembly of claim 23, further comprising a plurality of axial slots leading to the groove of the actuator portion that can be aligned with a similar plurality of tabs of the other retention component of the first and second retention components.

25. The deadbolt assembly of claim 23, wherein the actuator portion includes an axial opening extending from the end of the axial portion to an extent within the actuator portion for receiving the other actuator interface of the first and second actuator interfaces so that the first and second rotatable components can be rotated together when in engagement.

26. The deadbolt assembly of claim 25, wherein the transverse shape of the axial opening provides for limited range of rotational movement of the other actuator interface relative to the one actuator interface.

27. The deadbolt assembly of claim 26, wherein the other actuator interface comprises a flat extension that can be received by the axial opening having a radial portion within which the flat extension can rotate without rotating the one actuator interface over the limited range, after which the flat extension will contact an axial edge defining the radial portion of the axial opening so that continued rotation of the flat extension rotates the one actuator interface along with the other actuator interface.

28. The deadbolt assembly of claim 25, wherein the one actuator interface is tapered in the axial extension thereof to facilitate alignment of the one actuator interface to the other actuator interface.

29. The deadbolt assembly of claim 28, wherein the tab of the other retention component is provided as extending radially inward from an opening provided through a coupling component of one of the first and second coupling assemblies.

30. The deadbolt assembly of claim 29, wherein the coupling component includes a portion that is tapered in the axial direction similarly to the taper of the one actuator interface to further facilitate alignment of the one actuator interface to the other actuator interface.

31. The deadbolt assembly of claim 30, wherein one of the tab and groove is sloped so as to create a camming action between the tab and the groove during relative rotation, which camming action causes the first and second coupling assemblies to move relatively to one another in the axial direction during relative rotation between the tab and groove.

32. The deadbolt assembly of claim 4, wherein the first rotatable component comprises a first spindle and the second rotatable component comprises a second spindle.

33. The deadbolt assembly of claim 4, wherein the first actuator interface comprises a key extension having features to act as a key and the second actuator interface comprises a key cylinder for receiving the key extension so that depending on the rotational orientation of the key extension and the key cylinder, the first and second actuator interfaces can be locked together to provide an axial interference an of the first and second rotatable components.

34. The deadbolt assembly of claim 1, wherein the second-side assembly comprises a user interface rotatable component for manipulation by a user and that is operatively rotatable with the second rotatable component.

35. The deadbolt assembly of claim 34, further comprising a clutch device operatively located between the user interface rotatable component and the second actuator interface that allows a range of rotary motion under predetermined circumstances during which the user interface rotatable component rotates relative to the second interface actuator.

36. A door assembly for selectively interlocking first and second co-mounted doors each pivotably mounted at a hinge side thereof to a door frame so as to both open and close in the same rotary direction, the door assembly comprising:

a door jamb, the door jamb including a hinge-side jamb spaced apart from a latch-side jamb;

the first door, the first door having a hinge side and a latch side opposite the hinge side thereof;

the second door, the second door having a hinge side and a latch side opposite the hinge side thereof, the hinge sides of the first and second doors both pivotably mounted to the hinge-side jamb such that the first and second doors pivot individually or together in the same rotary direction relative to the hinge-side jamb between open and closed positions; and a deadbolt assembly for securing the first and second co-mounted doors together and activating at least one deadbolt, the assembly comprising:

a first-side assembly to be mounted to the first door of the co-mounted doors, the first-side assembly including a first coupling assembly to be mounted to a side of the first door facing the second door of the co-mounted doors, the first coupling assembly including a first rotatable component that is rotatable about an axis of rotation and a first retention component;

a second-side assembly to be mounted to the second door including a second coupling assembly to be mounted to the second door facing the first coupling assembly so as to interact with one another upon bringing the first and second coupling assemblies toward and proximate to one another, the second coupling assembly including a second rotatable component that is rotatable about the axis of rotation and a second retention component;

at least one of the first-side assembly and the second-side assembly further including the deadbolt that is operatively connected with at least one of the first and second rotatable components such that rotation of the first or second rotatable component can extend and retract a deadbolt, wherein the first and second rotatable components are operatively connectable with one another and the first and second retention components create an interference in an axial direction of the axis of rotation of the first and second rotatable components upon bringing the first and second coupling assemblies proximate to one another along with rotation of at least one of the first and second rotatable components so as to restrict movement of the first and second coupling assemblies away from one another while the interference is created.

* * * * *